(12) United States Patent
Dultz et al.

(10) Patent No.: US 6,331,910 B1
(45) Date of Patent: Dec. 18, 2001

(54) ARRANGEMENT AND METHOD FOR ELECTRICALLY CONTROLLING THE INTENSITY OF UNPOLARIZED LIGHT

(75) Inventors: Wolfgang Dultz, Frankfurt am Main (DE); Leonid Beresnev; Galina Patrusheva, both of Columbia, MD (US); Wolfgang Haase, Reinheim (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/463,108

(22) PCT Filed: Jul. 15, 1998

(86) PCT No.: PCT/DE98/02017

§ 371 Date: Jan. 19, 2000

§ 102(e) Date: Jan. 19, 2000

(87) PCT Pub. No.: WO99/04310

PCT Pub. Date: Jan. 28, 1999

(30) Foreign Application Priority Data

Jul. 19, 1997 (DE) .............................................. 197 31 135
Jul. 19, 1997 (DE) .............................................. 197 31 134

(51) Int. Cl.⁷ ....................................................... G02F 1/03
(52) U.S. Cl. .......................... 359/246; 359/245; 359/256; 359/629; 385/16; 385/24; 372/26; 349/116
(58) Field of Search .................................. 359/245, 246, 359/251, 252, 253, 256, 618, 629, 322; 385/8, 16, 18, 11, 24; 372/26, 22, 105; 349/116, 117

(56) References Cited

U.S. PATENT DOCUMENTS

| | | |
|---|---|---|
| 4,563,059 | 1/1986 | Clark et al. ............................ 349/123 |
| 4,838,663 | 6/1989 | Lagerwall et al. .................... 349/117 |
| 4,948,229 | 8/1990 | Soref ...................................... 385/16 |
| 5,321,774 | 6/1994 | Barnard et al. ......................... 385/16 |
| 5,796,510 | * 8/1998 | Yao ...................................... 359/256 |
| 5,978,125 | * 11/1999 | Yao ...................................... 359/256 |

FOREIGN PATENT DOCUMENTS

| | | |
|---|---|---|
| 30 13 498 | 10/1980 | (DE) . |
| 196 24 769 | 1/1998 | (DE) . |
| 0 335 056 | 10/1989 | (EP) . |
| 2 046 937 A | 11/1980 | (GB) . |
| 61151612 | 7/1986 | (JP) . |
| 61261725 | 11/1986 | (JP) . |
| 09146041 | 6/1997 | (JP) . |
| WO 98/06002 | 2/1998 | (WO) . |

* cited by examiner

*Primary Examiner*—Loha Ben
(74) *Attorney, Agent, or Firm*—Kenyon & Kenyon

(57) ABSTRACT

In an arrangement and a method for electrically controlling the intensity of non-polarized light, a polarizing beam splitter is acted upon by the light to be controlled via an input face such that the light is split into two polarized light bundles that are orthogonal with respect to each other. Provision is made that a first reflecting device is configured for the reflection of at least one of the polarized light bundles, so that both polarized light bundles run in parallel. At least one electro-optical element is provided in a path of the parallel running polarized light bundles. The polarization is changed as a function of the supplied control voltage. Also provided is a second reflecting device for reflecting the light bundles in the opposite direction. The light bundles pass through the at least one electro-optical element twice and are directed by the first reflecting device to the polarizing beam splitter, and the controlled light can be extracted from at least one output face of the polarizing beam splitter.

50 Claims, 44 Drawing Sheets

ARRANGEMENT AND METHOD FOR ELECTRICALLY CONTROLLING THE INTENSITY OF UNPOLARIZED LIGHT

BACKGROUND INFORMATION

The present invention concerns an arrangement and a method for the electrical control of the intensity of non-polarized light, a polarizing beam splitter being acted upon by the light to be controlled via an input face such that the light is split into two polarized light bundles that are orthogonal with respect to each other.

For a multiplicity of applications in the area of optics, for example in information-processing, in laser technology, and for many geodetic, astronomical, and navigational applications, arrangements are required which can switch light, carry out switchovers between optical channels, or modulate.

In known electro-optical switches and modulators of this type, either optically effective solid-body crystals or liquid crystals are used. Transparent crystals, such as can be manufactured from LiNbO3, require high working voltages, permit only small apertures, and are cost intensive. On account of the small permissible light bundle diameters, they are little suited for switching light bundles that contain images. As a consequence of the high dispersion that is inherent in them, the use of monochromatic light sources (lasers) is also necessary. The optical and electrical parameters change during use and thus impair the properties of the electro-optical switch or modulator. In addition, half of the light is lost, since these switches and modulators are employed in connection with polarizers.

In optical modulators that are improved with respect to these properties, modulators that have become known through German Published Patent Application No. 30 13 498 and British Patent No. 2046937 both polarization directions are used in connection with a polarizing beam splitter. However, the other cited disadvantages remain. Furthermore, it is disadvantageous in the known modulator that they require a working voltage of over 100 volts. In addition, significant costs arise as a result of a necessary cascading of the modulator.

In a further known arrangement, which was described by Hirabayashi, T. Kurokawa in "Liquid Crystal Devices for Optical Communication and Information-processing Systems," Liquid Crystals, Volume 14, pp. 307–317 (1993), a nematic liquid crystal is used in a so-called twist arrangement. In this context, larger apertures can be achieved. However, in nematic liquid crystals, their great switching times of, for example, several 100 milliseconds and problems in the representation of intermediate values are disadvantageous. Through Chiung-Shevy Wu, Shine Tsou Wu: "New Liquid Crystal Operation Modes," Volume 2949 SPIE, Image Sciences and Display Technologies, Proceedings Berlin Conference, FRG, 7–10 (1996), a modulator has become known in which the two polarization states s and p, generated by a polarizing beam splitter, are conveyed in the reverse direction by electro-optical liquid crystal cell. This leads to high rotation angles. However, the cells having a switching frequency of roughly 10 Hz are too slow.

From German Published Patent Application No. 196 31 644 (corresponding to PCT Publication No. WO 98/06002), an arrangement is known for switching optical patterns, which has a high switching efficiency and using which non-polarized, polychromatic light can be switched sufficiently rapidly. The arrangement, however, is very complicated and expensive, since it requires a multiplicity of liquid crystal cells in order to reduce the switching times. It is too expensive for wide use.

SUMMARY OF THE INVENTION

The objective of the present invention is to indicate an arrangement and a method for the electrical control of the intensity of non-polarized light, which at a low control voltage such as is available in conventional transistor circuits and integrated circuits, make possible rapid controlling. In this context, a high switching efficiency should also be achieved, i.e., a high transparency in the on-state and the highest possible damping capacity of the supplied light in the off-state. It should be possible to carry out the switchover of the light at equally high efficiencies between different channels.

This objective is achieved in the arrangement according to the present invention as a result of the fact that a first reflecting device is configured for reflecting at least one of the polarized light bundles, so that the polarized light bundles proceed in parallel, that in the path of the polarized light bundles at least one electro-optical element, that changes the polarization as a function of a supplied control voltage, and a second reflecting device for reflecting the light bundles in the reverse direction are arranged such that the light bundles pass through the at least one electro-optical element twice and are directed by the first reflecting device at the polarizing beam splitter, and that the controlled light can be extracted from at least one face of the polarizing beam splitter. In this context, provision is advantageously made that the light bundles are reunited in the beam splitter after passing through the remaining arrangement.

The arrangement according to the present invention can be used for the rapid processing of gray-scale values and as a rapid optical switch at a low switching voltage and also as an active element for the automatic control of light intensities in feedback loops having appropriate light sources. It can be used in fiber-optic superstructures as well as in optical parallel processors for processing messages.

The arrangement according to the present invention can also be used as an optical limiter in glasses, video cameras, or in optical message transmission. As a consequence of the small losses and high efficiency, applications are also possible for high-power laser light.

In contrast to the known electro-optical switches and modulators, the arrangement according to the present invention has many advantages. The switching efficiency for non-polarized light is more than 99% between the two switching states. Losses, already in themselves minimal, can through anti-reflection layers be further reduced by the reflections in the optical surfaces of the individual components in the arrangement according to the present invention.

In the arrangement according to the present invention, depending on the specific embodiment, small angles of rotation of the optical indicator of the liquid crystal are specifically required in the electrical field. As a result of this, an abundance of possibilities for the application of various electro-optical effects of liquid crystals is generated by the arrangement according to the present invention. In particular, in the application of liquid crystals having the SSFLC effect, switching times can be achieved in the range of $\mu s$. The SSFLC effect is described, for example, in N. Clark et al., Appl. Phys. Lett. 36899 (1980); U.S. Pat. No. 4,563,059.

Using the arrangement according to the present invention, intermediate values can be arrived at in an advantageous manner between the on- and off-state, so that a gray-scale value modulation having time constants in the microsecond and submicrosecond range is possible through the application of the electroclinic effect.

Through the application of the DHF effect (deformed helix ferroelectric effect) in the helix-shaped smectic C-phase, working voltage is of roughly 1 V and time constants of roughly 10 µs can be achieved.

In addition, the arrangement according to the present invention has the advantage that the switching efficiency is dependent on the color of the light to only an extremely small degree. Therefore, the arrangement according to the present invention is also superbly suited for color pictures. Finally, as a further advantage, the design of the arrangement according to the present invention is simple and cost-effective.

Most of the advantages of the arrangement according to the present invention rest on the fact that, as a result of the double passage through the electro-optical element, the electrical rotation of the indicator of the liquid crystal can be much smaller, even in connection with the delay plate, than in the case of a single passage, in order to achieve a desired rotational angle.

An advantageous specific embodiment of the arrangement according to the present invention consists in the fact that the electro-optical element and the second reflecting device are separate components, provision advantageously being made that the at least one electro-optical element is a liquid crystal cell having a liquid crystal layer between transparent electrodes, to which the control voltage can be supplied.

A further advantageous specific embodiment involving even less technical expense, consists in the fact that the electro-optical element is a liquid crystal cell having a liquid crystal layer between a transparent and a reflecting electrode, which form the second reflecting device, and that the control voltage can be supplied to the electrodes.

In an advantageous refinement of the arrangement according to the invention, provision is made that in the path of the parallel- running polarized light bundles, a delay plate is also arranged, the delay plate having an optical intensity of one quarter of the wavelength of the light or, in the case of broadband light, of the effective wavelength.

A further reduction of the rotational angle required for control is possible in a refinement of the arrangement according to the present invention as a result of the fact that two electro-optical elements are arranged behind one another in the path of the parallel running polarized light bundles.

Depending on the specific preconditions and requirements, in the arrangement according to the present invention the first reflecting device can be configured in different ways. It should be noted that in the use of two planar reflecting surfaces, which form a right angle, the line of intersection of the two surfaces is always parallel to a polarization plane of the polarized light bundles.

A further refinement of the arrangement according to the present invention consists in the fact that the at least one liquid crystal cell contains a nematic liquid crystal. In this context, provision is preferably made that the nematic liquid crystal has a positive dielectrical anisotropy and, in the electrical field, passes over into a homeotropic orientation in a generally familiar manner.

This refinement can be configured such that thickness d of the liquid crystal, without impingement by an electrical field, fulfills the condition $\delta n \cdot d = \text{lambda}/4 + N \cdot \text{lambda}$ with respect to its phase delay, N being a whole number and $\delta n$ being the birefringence of the liquid crystal. However, it is also possible that thickness d of the liquid crystal satisfies the condition $\delta n \cdot d = \tfrac{3}{8} \cdot \text{lambda} + N \cdot \text{lambda}$ or the condition $\delta n \cdot d = \text{lambda}/2 + N \cdot \text{lambda}$.

A further advantageous refinement of the arrangement according to the present invention consists in the fact that the least one liquid crystal cell contains a ferroelectric liquid crystal, thickness d of the ferroelectric liquid crystal satisfying the condition $\delta n \cdot d = \text{lambda}/4 + N \cdot \text{lambda}$, the condition $\delta n \cdot d = (\tfrac{3}{8}) \text{lambda} + (N \cdot \text{lambda})$, or the condition $\delta n \cdot d = (\text{lambda}/2) + (N \cdot \text{lambda})$.

The ferroelectric effect has the advantage that as a result of the small rotational angles and of the rapid rotation of the slow axis, very short switching times can be achieved.

As already mentioned, the arrangement according to the present invention is advantageously suited for the modulation or for the switching of light. A switchover or a crossfading between two output light bundles is additionally possible in a further refinement through the fact that the first reflecting device, the electro-optical element, and the second reflecting device are arranged such that light, that is controlled inversely to the light that can be extracted from the second face of the beam splitter, emerges on the surface offset with respect to the light to be controlled. Provision is also made that light bundles, that pass through at the same surface of the beam splitter, have the same preselected distance from each other in order to prevent reactions of the light bundles on the devices that are connected.

In the method according to the present invention, the objective is achieved through the fact that a first reflecting device for the reflection of at least one of the polarized light bundles is configured so that the polarized light bundles run in parallel, that at least one electro-optical element is arranged in the path of the polarized light bundles, the electro-optical element being penetrated by the beams of the light bundles and the polarization of the light bundles changing as a function of a supplied control voltage, that a second reflecting device changes the direction of the light bundles after they leave the electro-optical element so as to run into themselves or to run in parallel and sends them once again to the electro-optical element, that the polarization of the light bundles is once again changed in the electro-optical element, so that the sum of the changes of the polarization of the light bundles, in the passage through the first reflecting element, the subsequent passage through the electro-optical element, the subsequent reflection at the second reflecting element, the second passage through the electro-optical element, and the second passage through the first reflecting element, generates in the reverse direction an overall change of the polarization of the light bundles, the polarization depending on the control voltage at the electro-optical element, directing the light of the light bundles at the polarizing beam splitter either to the input face—which corresponds to the polarization state that is in each case unchanged—or to the output face—which corresponds to the polarization state that is, in each case, orthogonal.

BRIEF DESCRIPTION OF THE DRAWINGS

FIG. 1(*b*) shows a second schematic diagram of the arrangement according to the present invention.

FIG. 1(*c*) shows a third schematic diagram of the arrangement according to the present invention.

FIG. 1(*d*) shows a fourth schematic diagram of the arrangement according to the present invention.

Figure 1A:
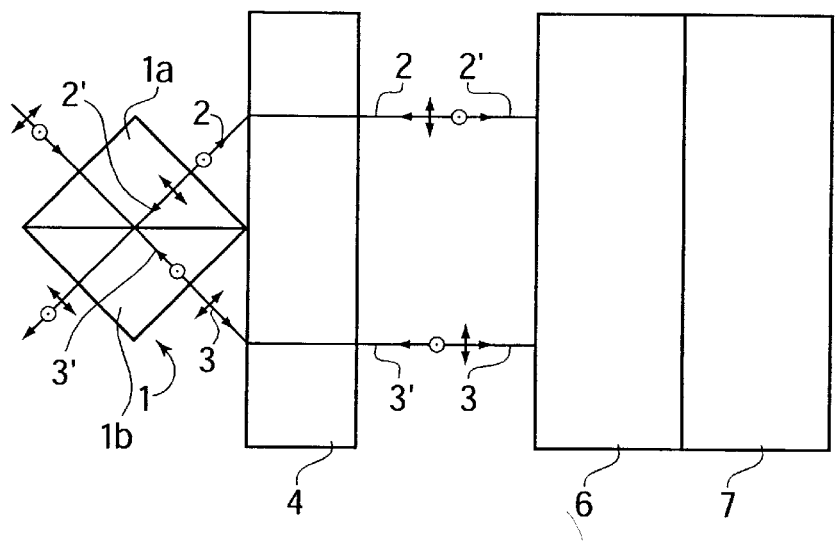
FIG. 1(*a*) shows a first schematic diagram of the arrangement according to the present invention.
FIG. 1(e) shows a fifth schematic diagram of the arrangement according to the present invention.
FIG. 1(f) shows a sixth schematic diagram of the arrangement according to the present invention.
FIG. 1(g) shows a seventh schematic diagram of the arrangement according to the present invention.
FIG. 1(h) shows an eighth schematic diagram of the arrangement according to the present invention.
FIG. 1(i) shows a ninth schematic diagram of the arrangement according to the present invention.
FIG. 1(j) shows a tenth schematic diagram of the arrangement according to the present invention.

In the Figures, the same parts are given the same reference numerals. In the Figures, the light bundles are represented as straight lines having arrows pointing in the longitudinal direction, the arrows indicating the direction of propagation of the specific light bundle. Double arrows transverse to the longitudinal direction indicate a polarization in the drawing plane (p), whereas circles having a period represent a polarization perpendicular to drawing plane (s).

Figure 2A:
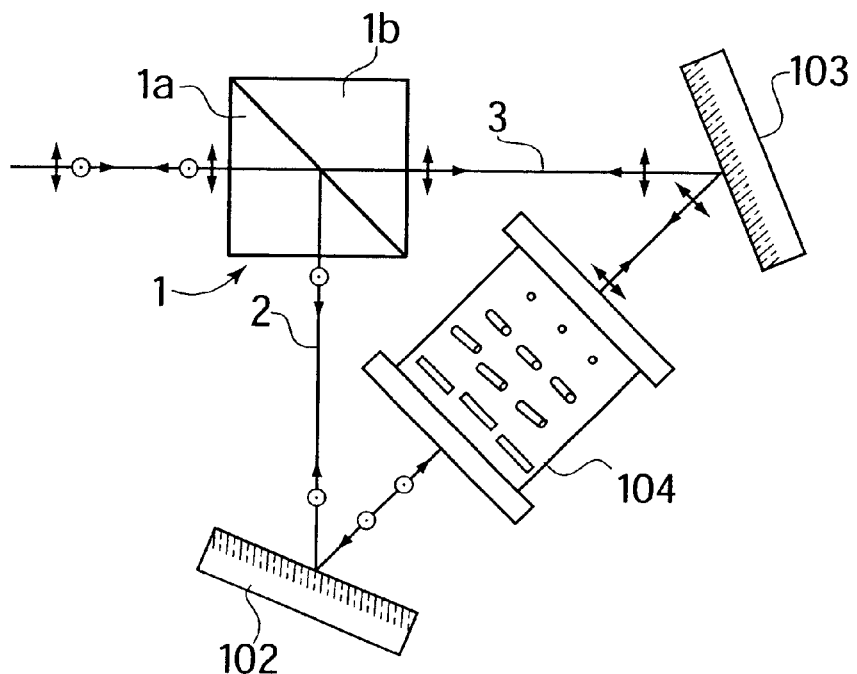
FIG. 2(a) shows a first arrangement of two electro-optical switches according to the related art in different operating states.
Figure 2B:
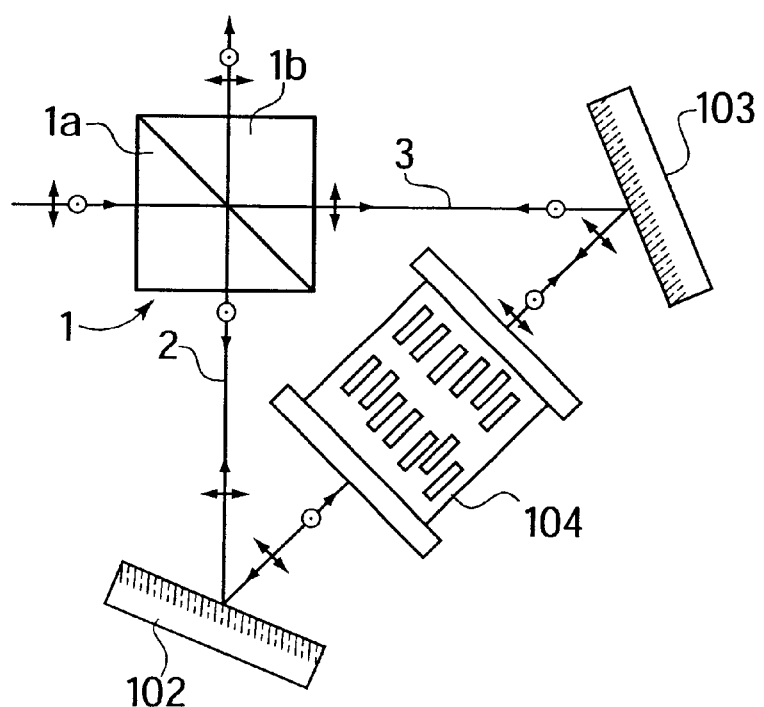
FIG. 2(b) shows a second arrangement of two electro-optical switches according to the related art in different operating states.
Figure 2C:
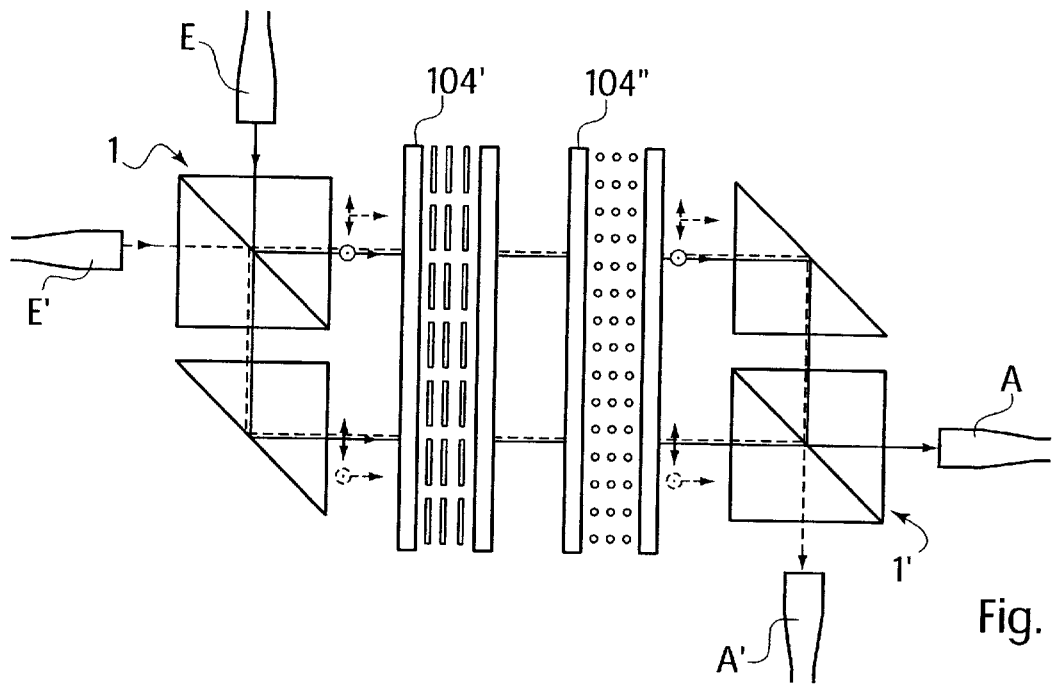
FIG. 2(c) shows a first arrangement of an electro-optical switch that operates according to a similar principle to that of FIGS. 2(a) and 2(b).
Figure 2D:
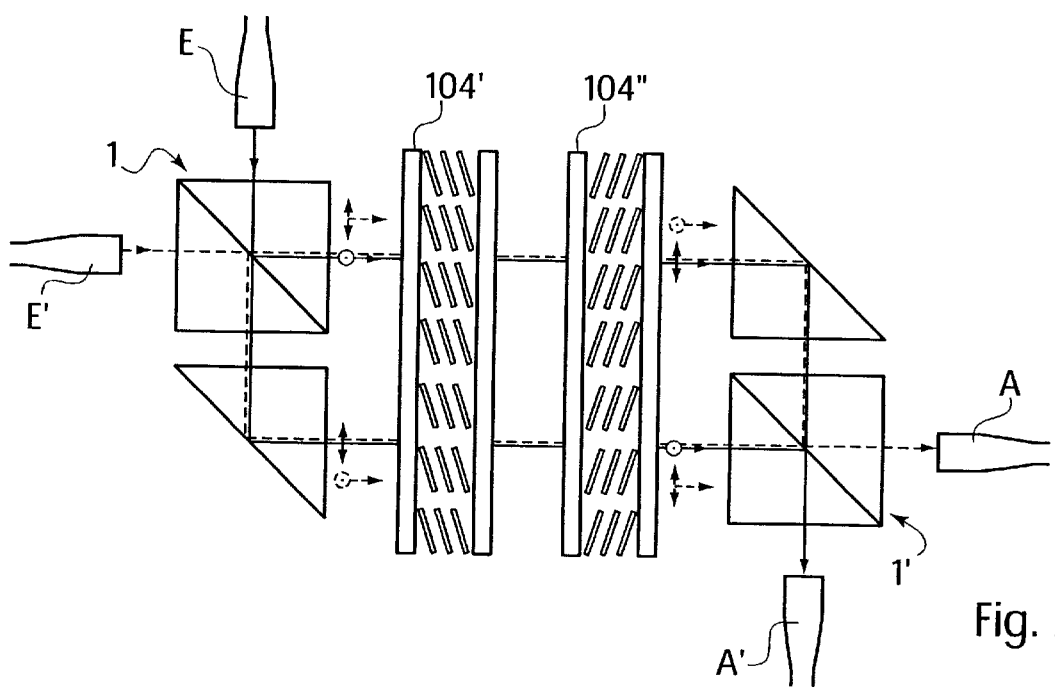
FIG. 2(d) shows a second arrangement of an electro-optical switch that operates according to a similar principle to that of FIGS. 2(a) and 2(b).
Figure 3A:
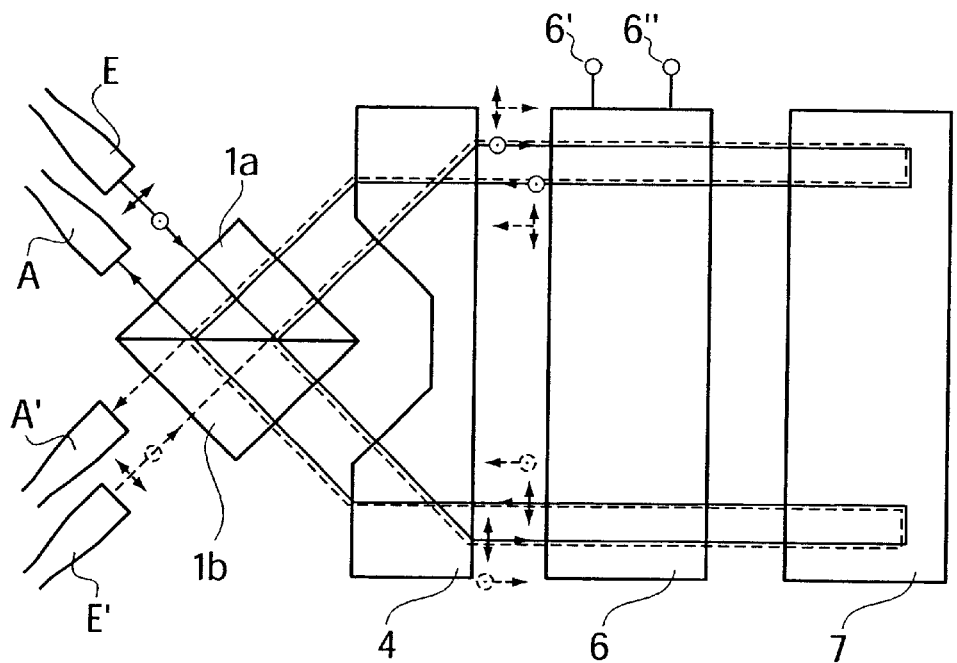
FIG. 3(a) shows an exemplary embodiment of a device according to the present invention executed as an intermediate switch.
Figure 3B:
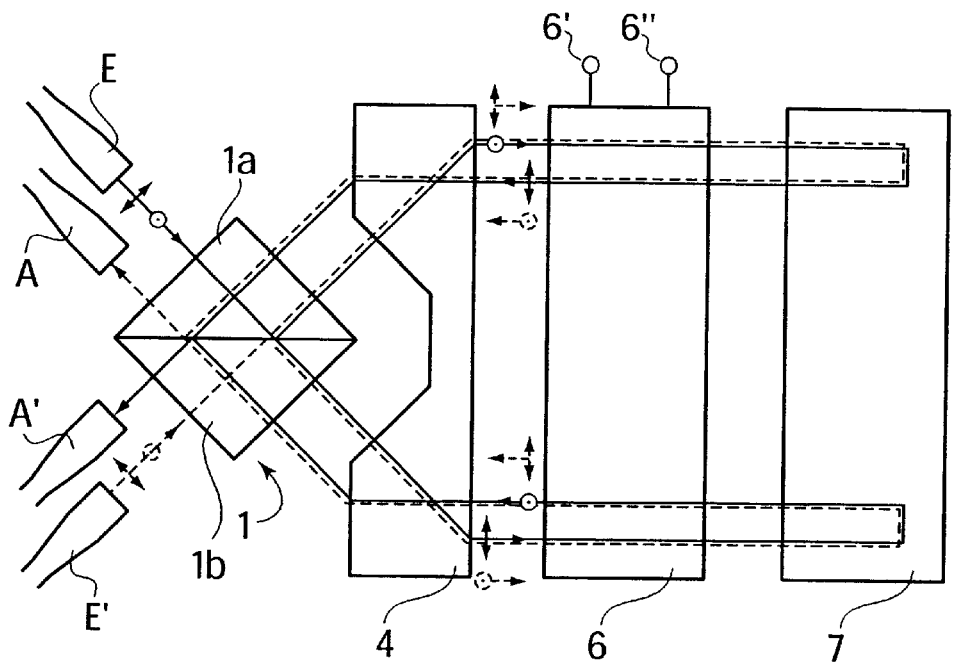
FIG. 3(b) shows a second exemplary embodiment of a device according to the present invention executed as an intermediate switch.
Figure 3C:
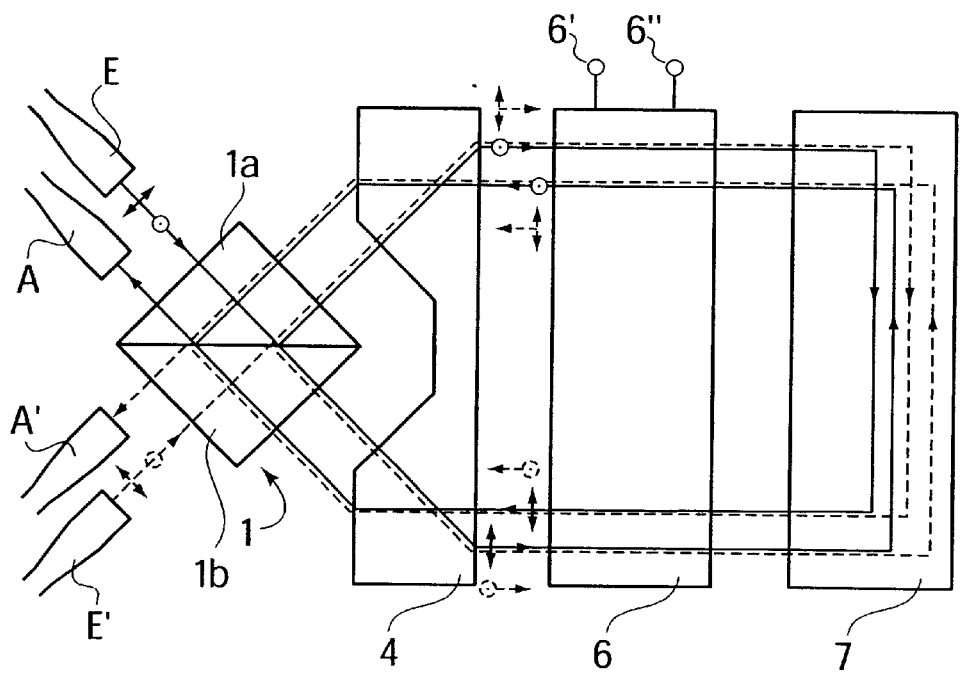
FIG. 3(c) shows a third exemplary embodiment of a device according to the present invention executed as an intermediate switch.
Figure 3D:
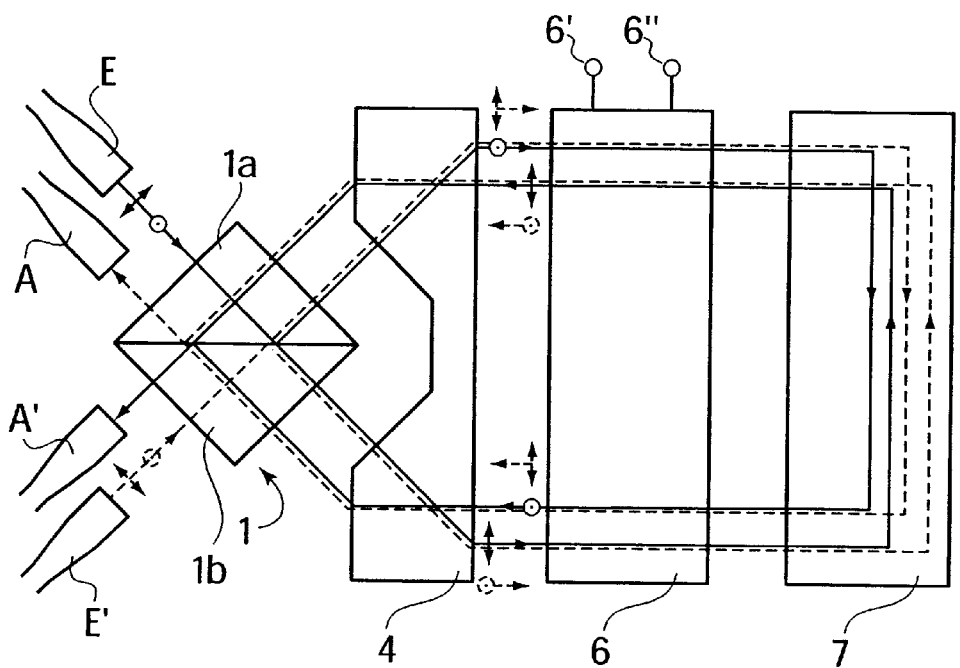
FIG. 3(d) shows a fourth exemplary embodiment of a device according to the present invention executed as an intermediate switch.

FIG. 2 represents a known electro-optical switch in a closed position (FIGS. 2 (a) and 2(c)) and in an open position (FIGS. 2(b) and 2(d)).

In FIGS. 2(a) and 2(b), the non-polarized light bundle to be switched is fed to a polarizing beam splitter 1 via an input face 1a. Beam splitter 1 switches the non-polarized collimated light at the input face into its polarized components s and p, which leave the polarizing beam splitter as light bundles 2, 3. Polarized light bundles 2, 3 are directed in the direction of a TN liquid crystal cell 104 by a mirror 102, 103, respectively. The reflected light bundles pass through liquid crystal cell 104 in the opposite direction and are reflected back to the polarizing beam splitter by the respective other mirror 103, 102.

If no voltage is applied to the electrodes of the liquid crystal cell, the latter rotates the polarization plane of the light bundles in each case by 90°. This is represented in FIG. 2(a). Light bundle 2, which is initially polarized perpendicular to the drawing plane, thus receives a polarization in the drawing plane and is thus directed via mirror 103 to the polarizing beam splitter. Due to this polarization, this beam bundle is not reflected in the beam splitter, but rather is permitted to pass straight through in the direction of the entrance beam.

Light which is initially polarized in the drawing plane is rotated perpendicular to the drawing plane and arrives at beam splitter 1 via mirror 103, where it is reflected in the direction of the light bundle that has been sent. At an output face 1b, no light emerges.

In the case represented in FIG. 2(b), liquid crystal cell 104 is acted upon by voltage and does not rotate the polarization plane. Thus polarized light bundles 2,3 arrive at beam splitter 1, in each case, having a polarization that is rotated with respect to the arrow in FIG. 2(a). There, returning light bundle 2 is reflected, and returning light bundle 3 is not reflected, so that both light bundles emerge from output face 1b.

FIGS. 2(c) and 2(d) depict an electro-optical switch that operates according to a similar principle, sending light that strikes beam splitter 1 from the various channels E, E' to various outputs A, A'. Since the angle of inclination of liquid crystal cells 104', 104" used is limited given the high switching frequencies, a plurality of cells is necessary in order to make possible a complete rotation of the polarization planes of the light bundles. In the closed position according to FIG. 2(c), the light bundle of channel E is conveyed to channel A via a second beam splitter 1'. The light from channel E' arrives at channel A. In the open position according to FIG. 2(d), on the other hand, the light bundles are switched via a cross, so that channels E and A' as well as E' and A are connected to each other.

Figure 1B:
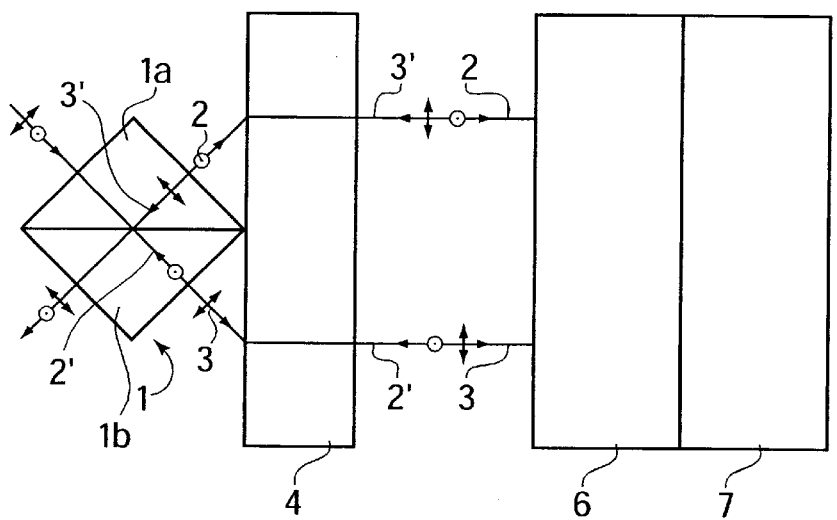
Figure 1C:
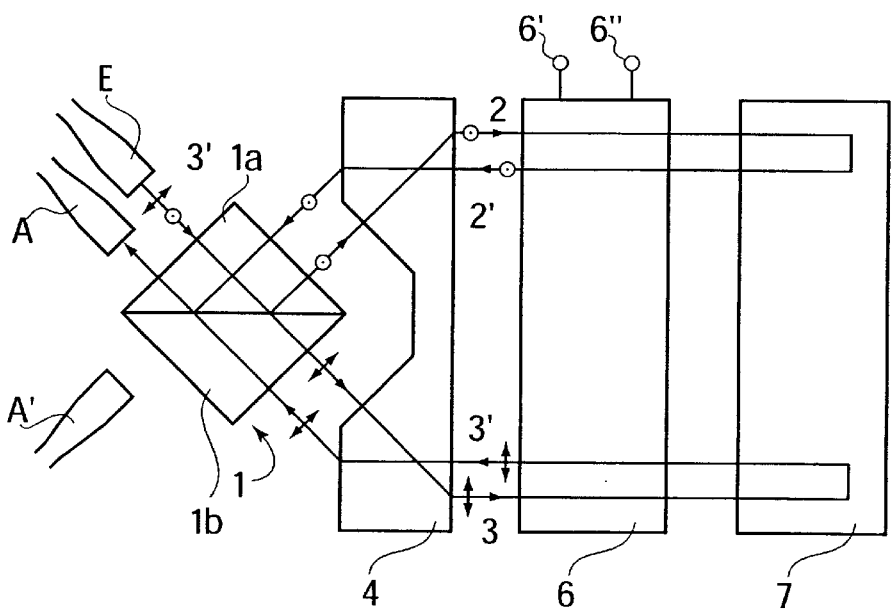
Figure 1D:
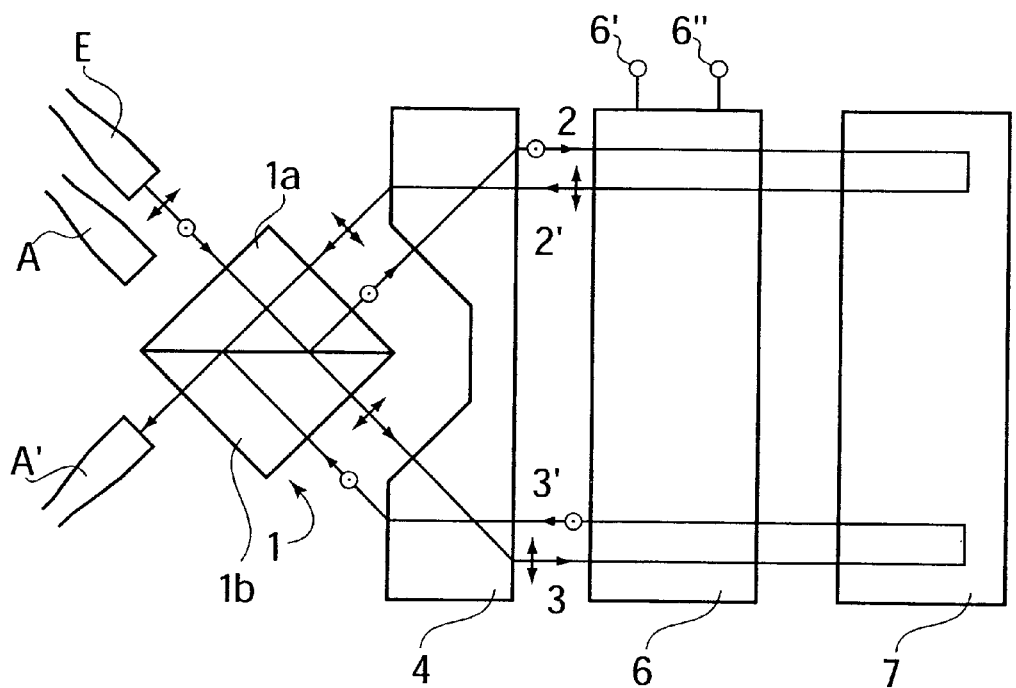
Figure 1E:
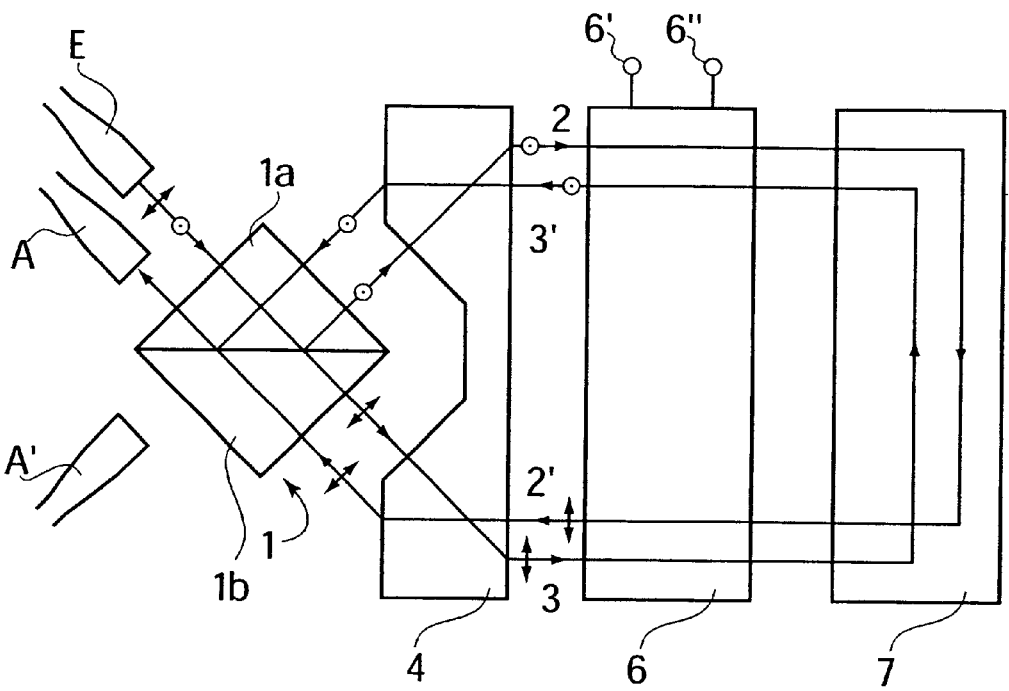
Figure 1F:
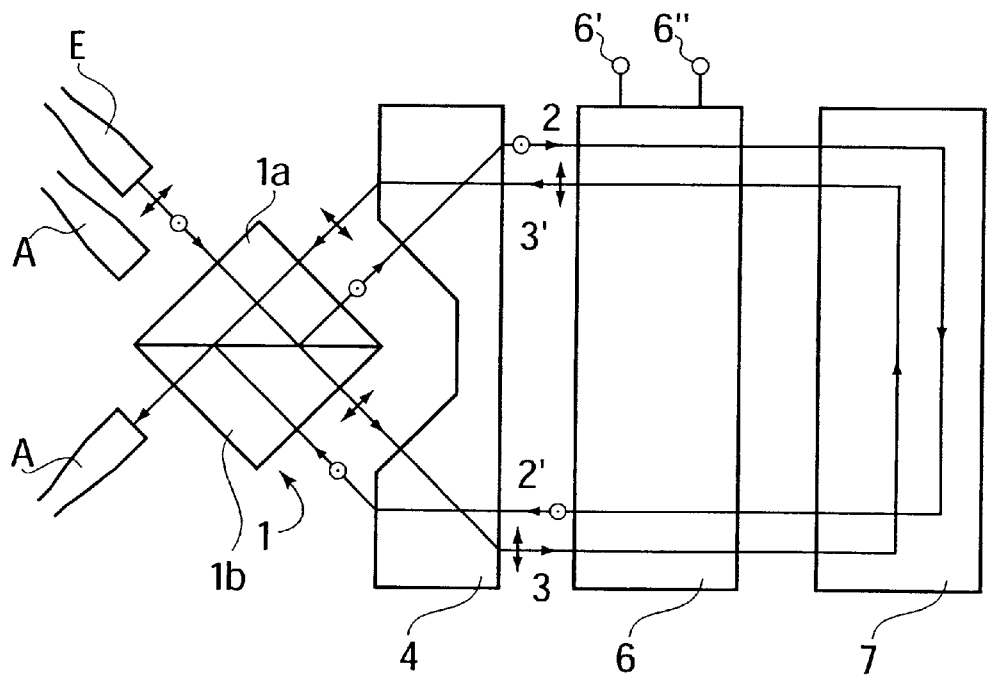
Figure 1G:
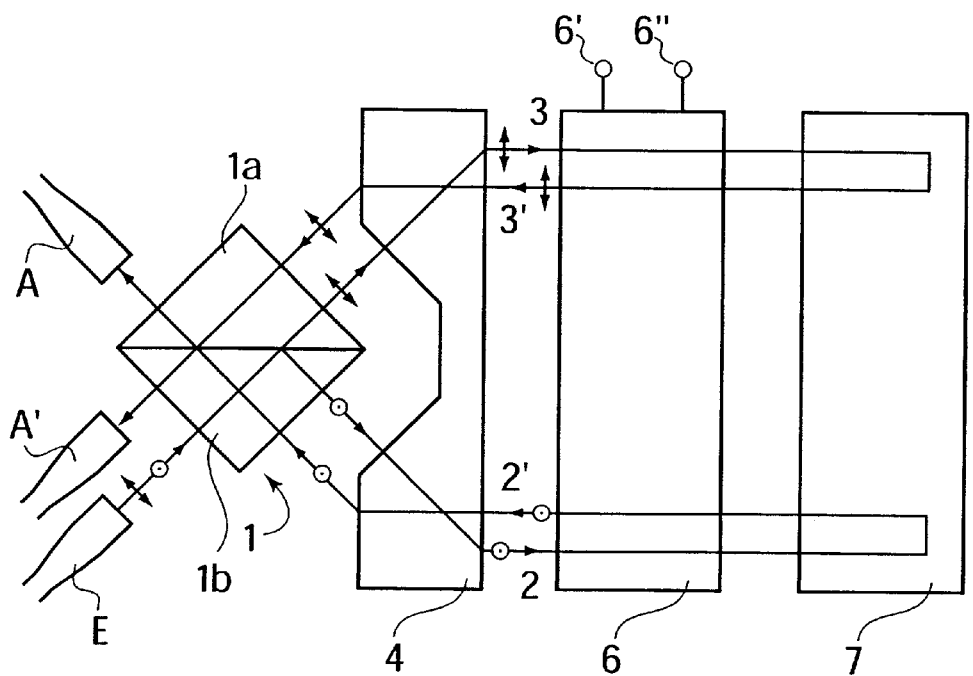
Figure 1H:
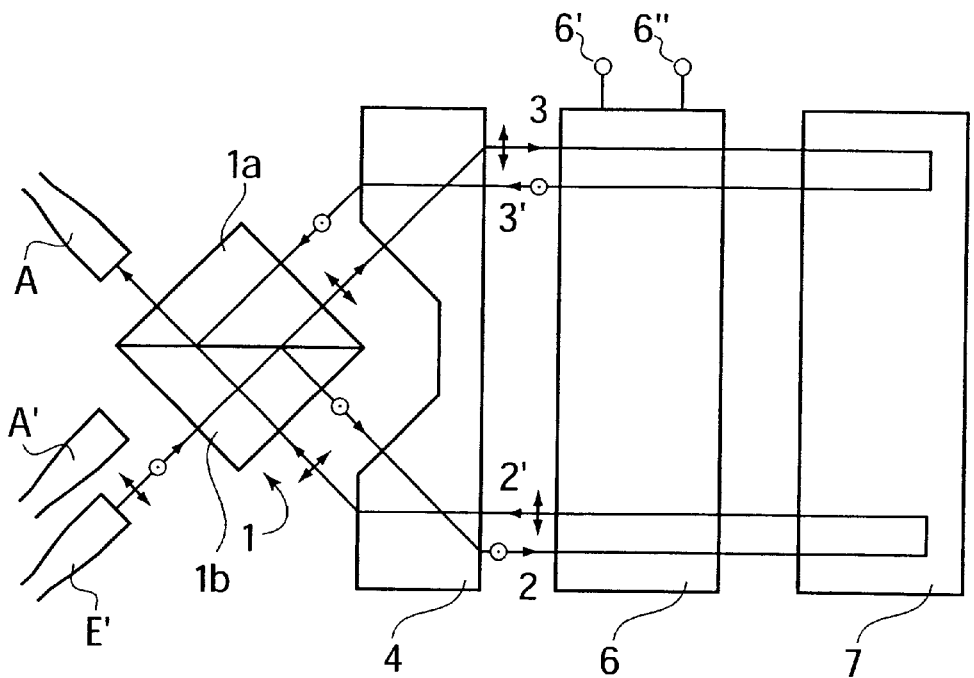
Figure 1I:
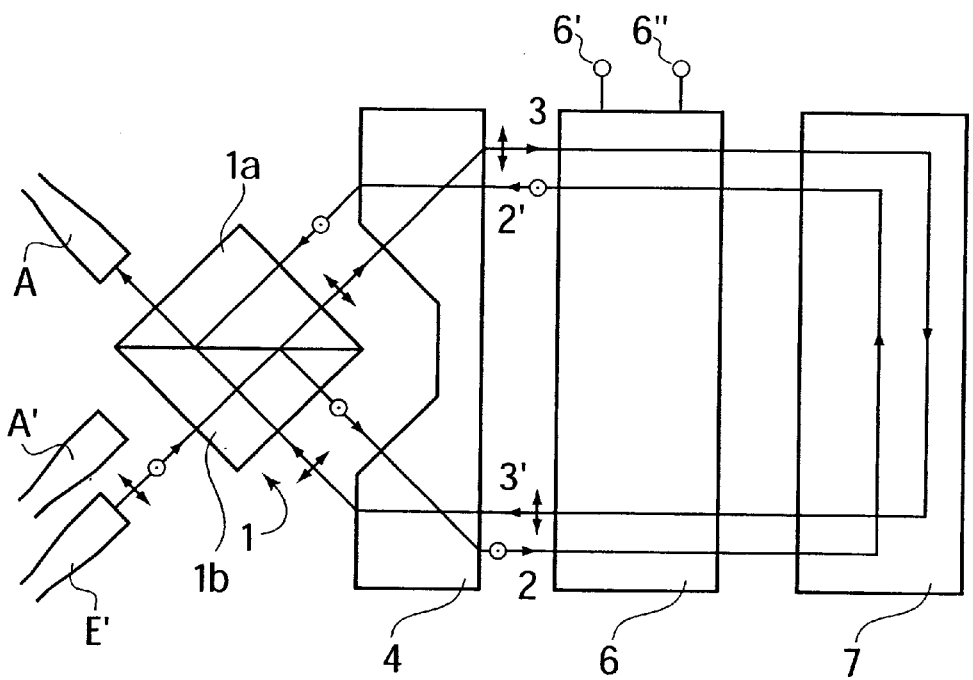
Figure 1J:
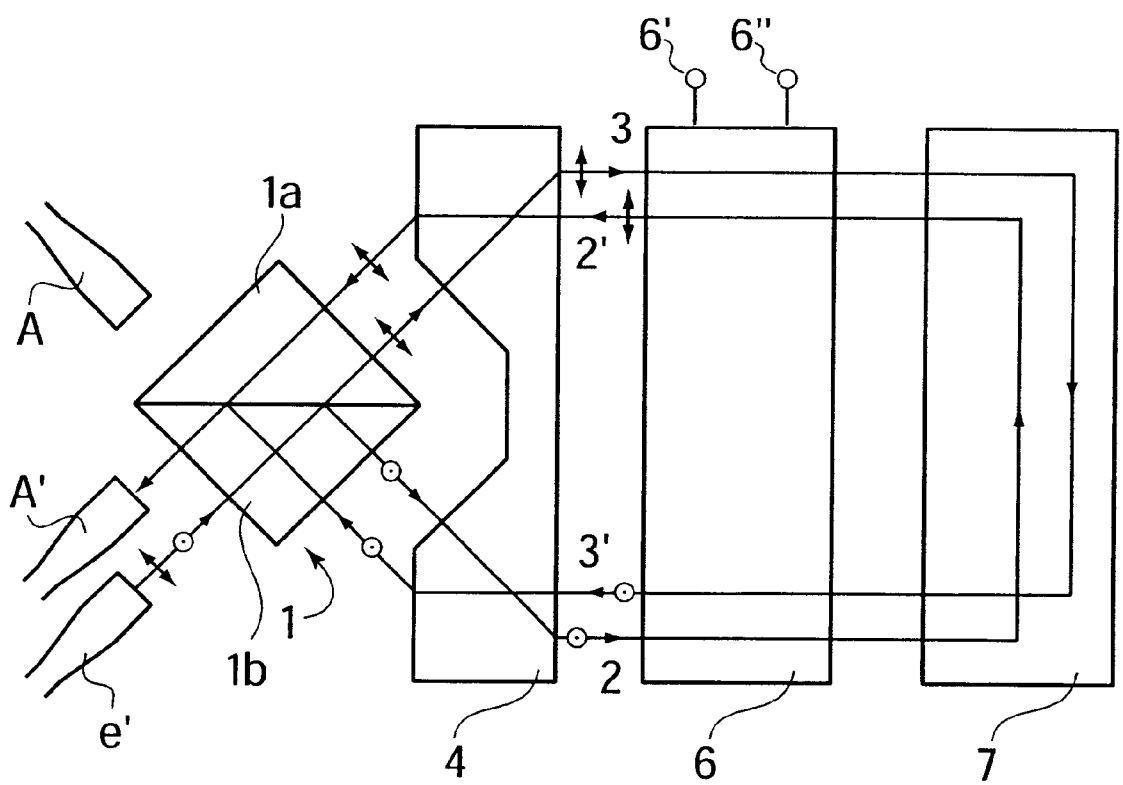

FIGS. 1(a) and 1(b) show two variants of a first exemplary embodiment, in which the light bundle to be controlled is fed via input face 1a of polarizing beam splitter 1 and is first split into two polarized light bundles 2 and 3 as in the known arrangement according to FIGS. 2(a) and 2(b). In a first reflecting device 4, polarized light bundles 2, 3 are then deflected such that they run in parallel. From there they arrive at a device 5, which contains an electro-optical element 6, which rotates the polarization as a function of a supplied control voltage. A second reflecting device is configured in various ways in FIGS. 1(a) and 1(b), namely such that, in the case of FIG. 1(a), each of parallel-running polarized light bundles 2, 3 is reflected back into itself, whereas, in the case of FIG. 1(b), light bundle 2 is reflected as light bundle 2' opposite to light bundle 3, and light bundle 3 is reflected as light bundle 3' opposite to light bundle 2. Both variants are depicted in the on-state.

FIGS. 1(c) through 1(j) show the same arrangement as a changeover switch from an input channel E or E' to two output channels A, A', respectively, in different switching states and having different configurations of schematically represented second reflecting device 7. In this context, the light bundle is introduced somewhat offset from the center of beam splitter 1, so that the beam path no longer runs symmetrically, and controlled light bundles 2' and 3' are sent from beam splitter 1 to the one output A or to the other output A' depending on the polarization direction. The deflection of the beam path in reflecting devices 4, 7 can be realized in the most various ways; the particular ways may be selected for this purpose depending on the concrete requirement. In FIGS. 5 and 6, examples are given. Electro-optical element 6, in the examples, is acted upon by a control voltage via connection terminals 6' and 6".

A further application case for the arrangement according to the present invention in accordance with the FIGS. 1(c) through 1(j) is depicted in FIGS. 3(a) through 3(d) in two specific configurations, each in two switching states. The arrangement is used as a cross switch among four channels. In accordance with the switching state, each input E, E' is connected to one output A, A', respectively.

Figure 4A:
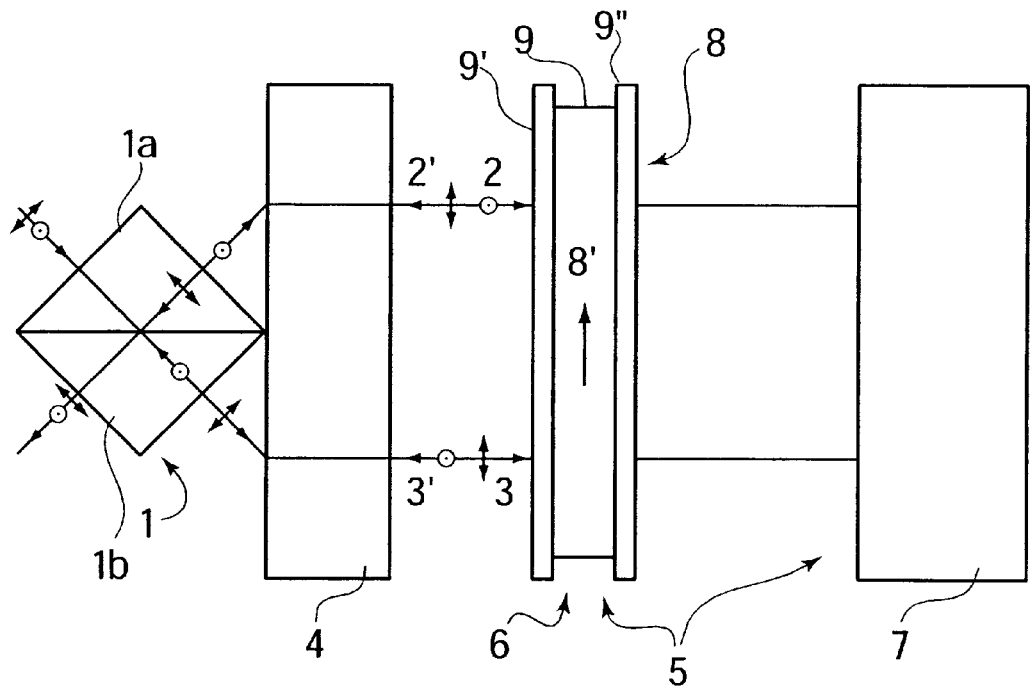
FIG. 4(a) shows a first simplified arrangement sketch of a device according to the present invention for one channel.
Figure 4B:
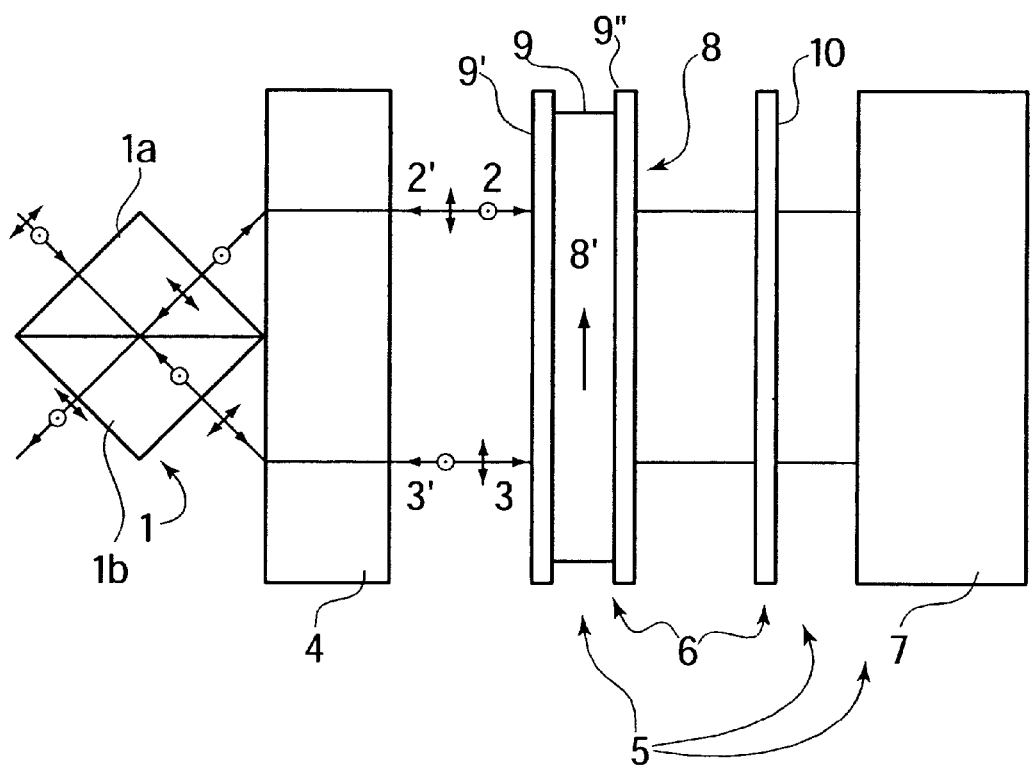
FIG. 4(b) shows a second simplified arrangement sketch of a device according to the present invention for one channel.

In FIG. 4(a), electro-optical element 6 is depicted in somewhat greater detail than liquid crystal cell 8 having a liquid crystal 9 between transparent electrodes 9', 9" and a narrow 8', which designates the slow axis. On the other hand, the exemplary embodiment according to FIG. 4(b) contains a delay plate 10.

Figure 4C:
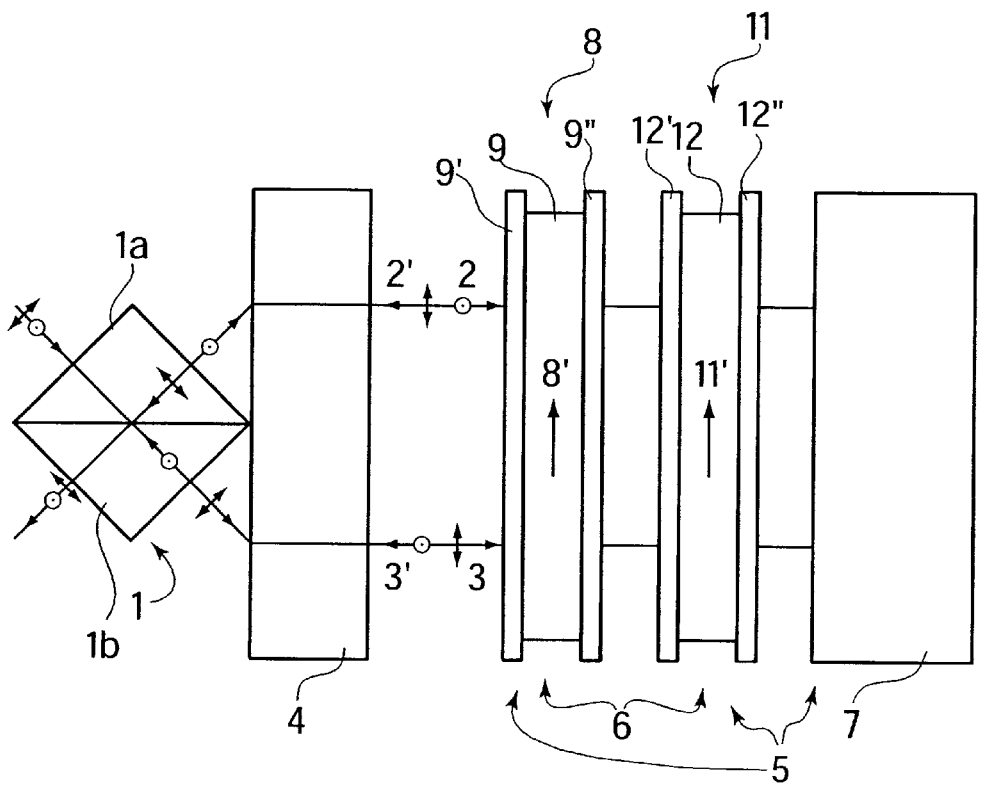
FIG. 4(c) shows a third simplified arrangement sketch of a device according to the present invention for one channel.

In the exemplary embodiment depicted in FIG. 4(c), provision is made for a further liquid crystal cell 11 having a liquid crystal 12 and transparent electrodes 12' and 12". By placing behind one another two liquid crystal cells 8, 11, in contrast to the exemplary embodiments in accordance with FIGS. 4(a) and 4(b), only half of the rotation is required for achieving the same intensity differential in the controlled light bundle. As will be explained in detail below, under certain preconditions, an angle of +/−5.625° is sufficient for fully advanced control.

Figure 4D:
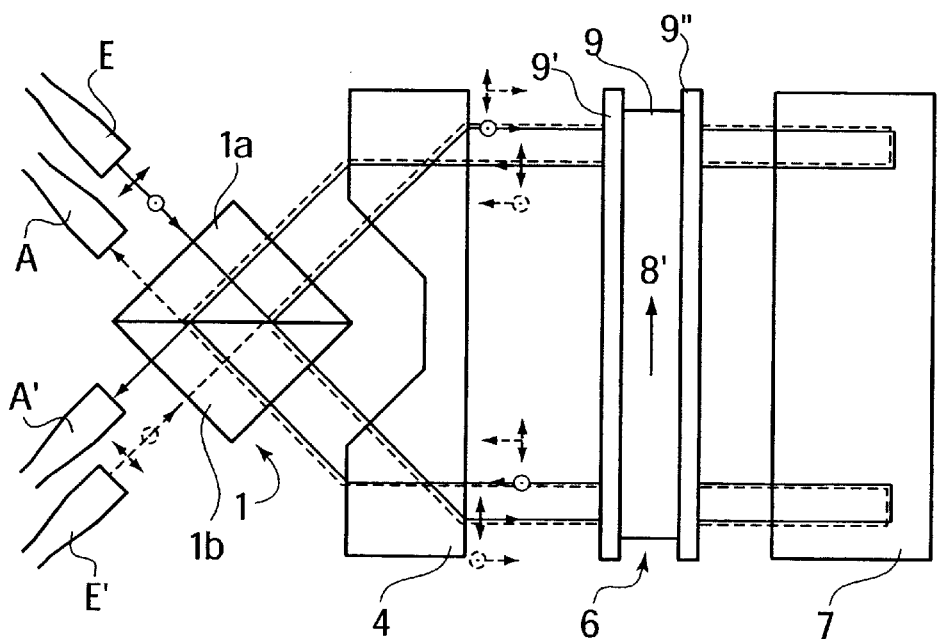
FIG. 4(d) shows a fourth simplified arrangement sketch of a device according to the present invention for one channel.
Figure 4E:
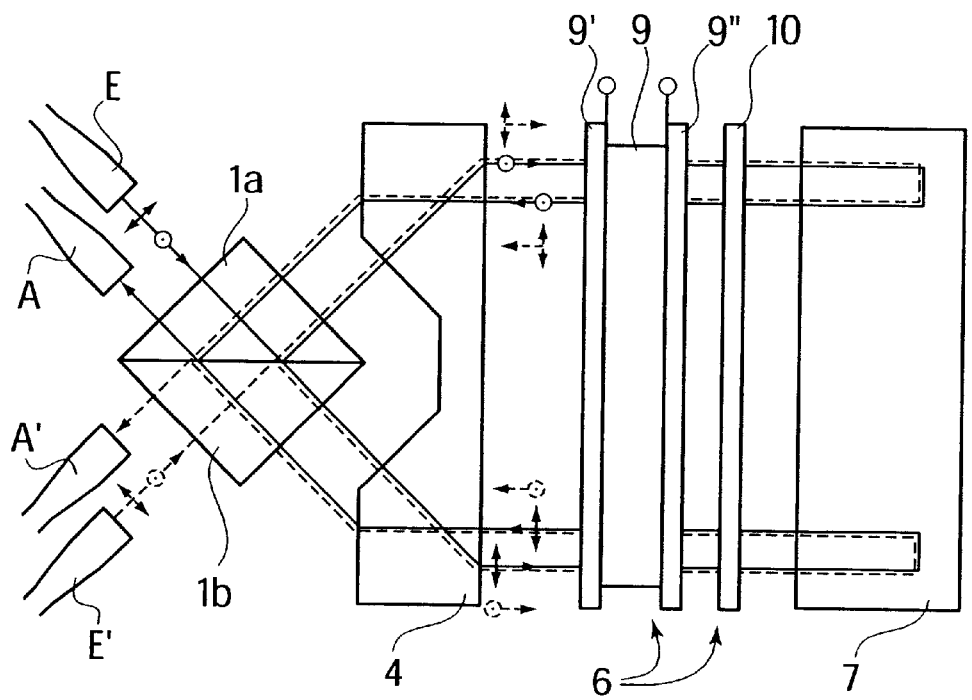
FIG. 4(e) shows a first simplified arrangement sketch of a device according to the present invention for two channels.
Figure 4F:
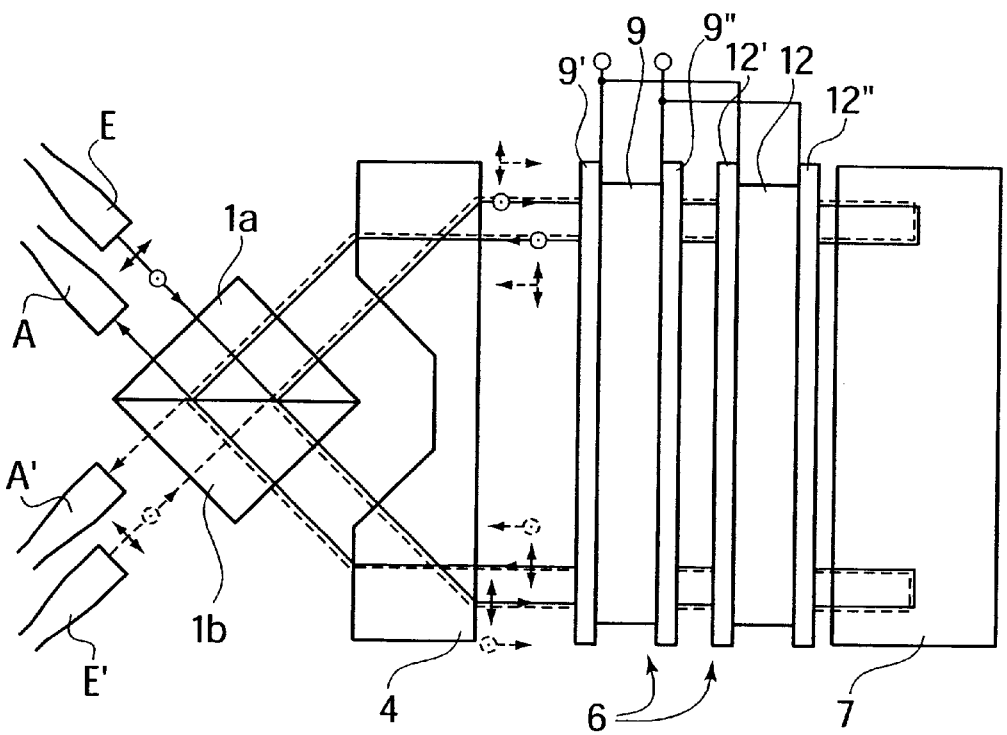
FIG. 4(f) shows a second simplified arrangement sketch of a device according to the present invention for two channels.

FIGS. 4(d) through 4(f) show embodiments of the same arrangement as the cross changeover switch.

Figure 5A:
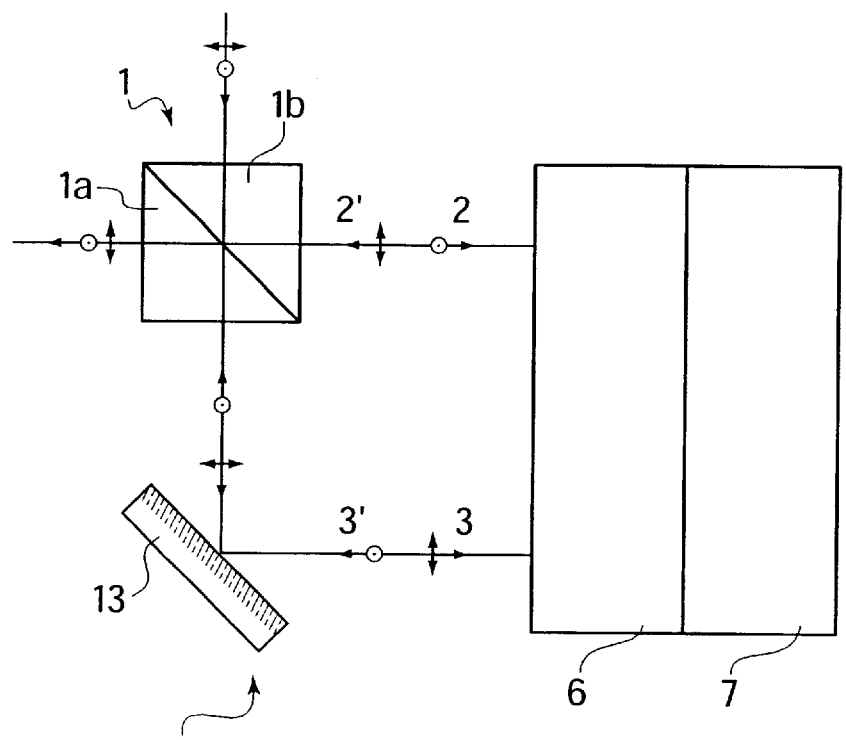
FIG. 5(a) shows a first exemplary embodiment of the first reflecting device in a solely schematic representation of the electro-optical element and of the second reflecting device for one channel.
Figure 5B:
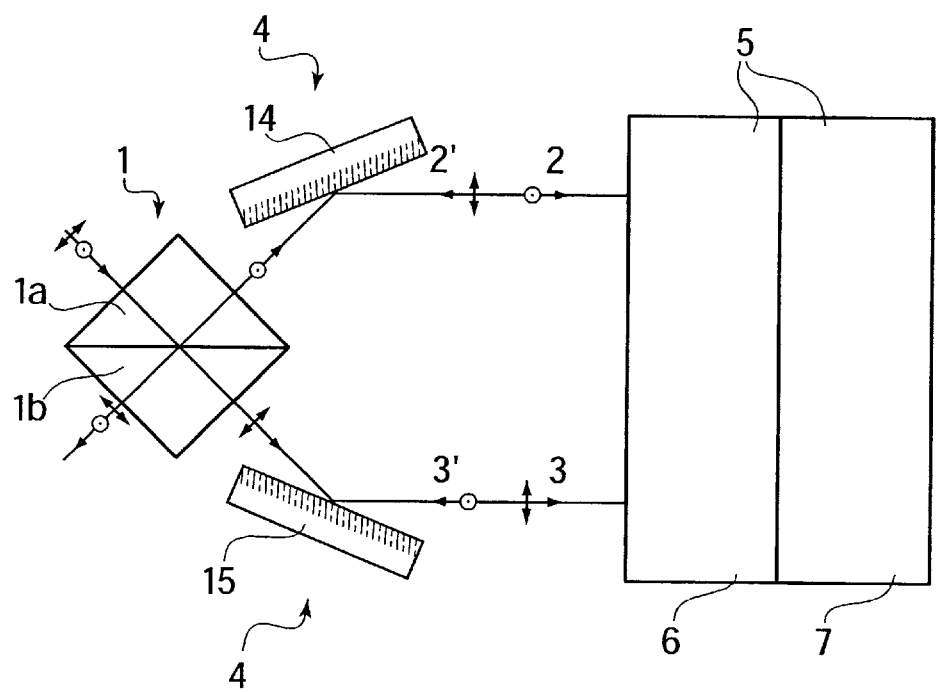
FIG. 5(b) shows a second exemplary embodiment of the first reflecting device in a solely schematic representation of the electro-optical element and of the second reflecting device for one channel.
Figure 5C:
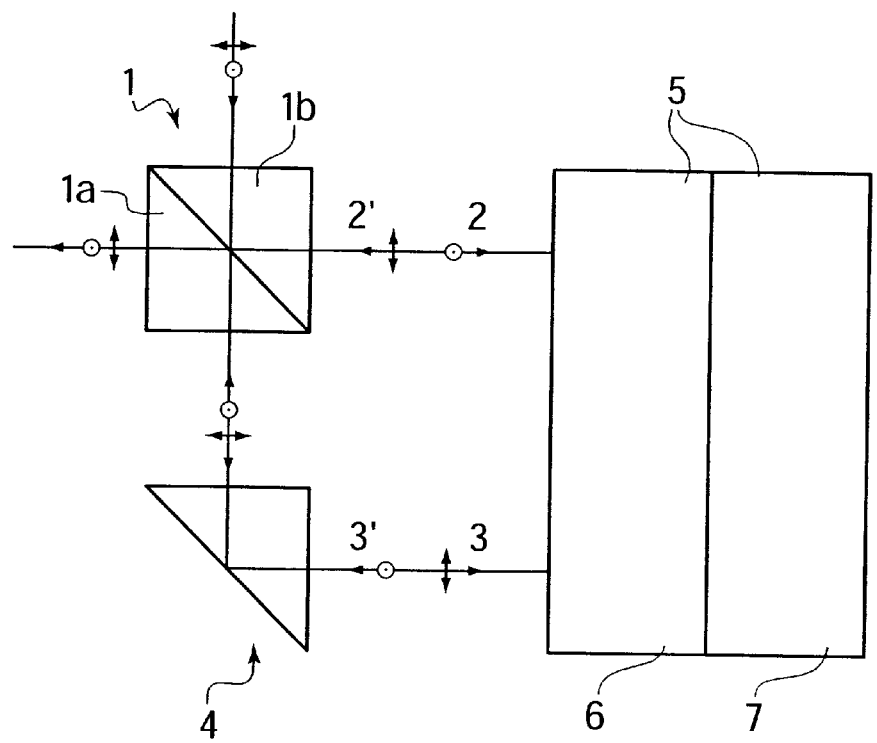
FIG. 5(c) shows a third exemplary embodiment of the first reflecting device in a solely schematic representation of the electro-optical element and of the second reflecting device for one channel.
Figure 5D:
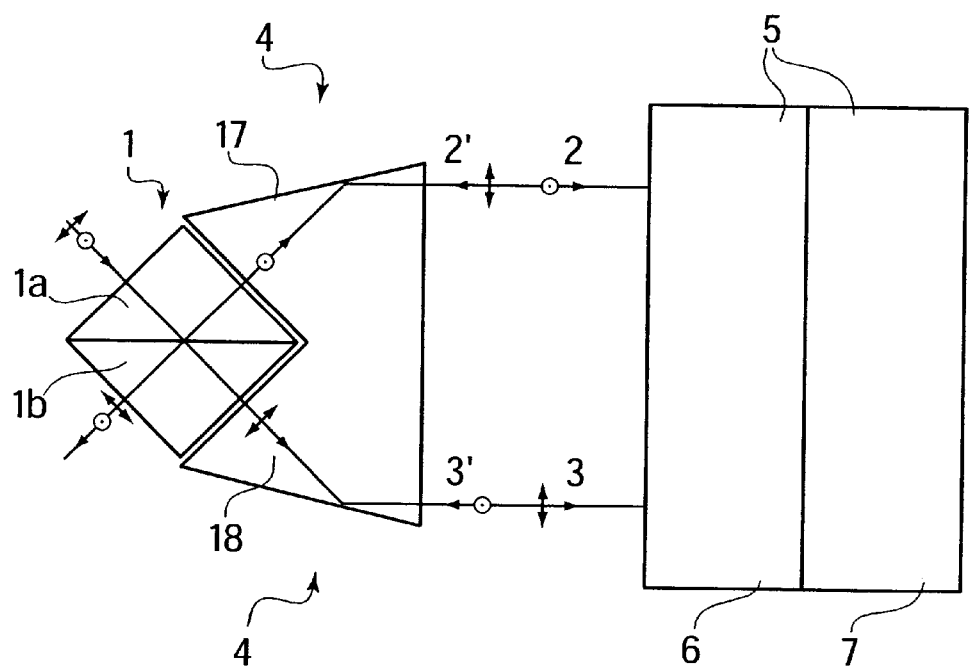
FIG. 5(d) shows a fourth exemplary embodiment of the first reflecting device in a solely schematic representation of the electro-optical element and of the second reflecting device for one channel.
Figure 5E:
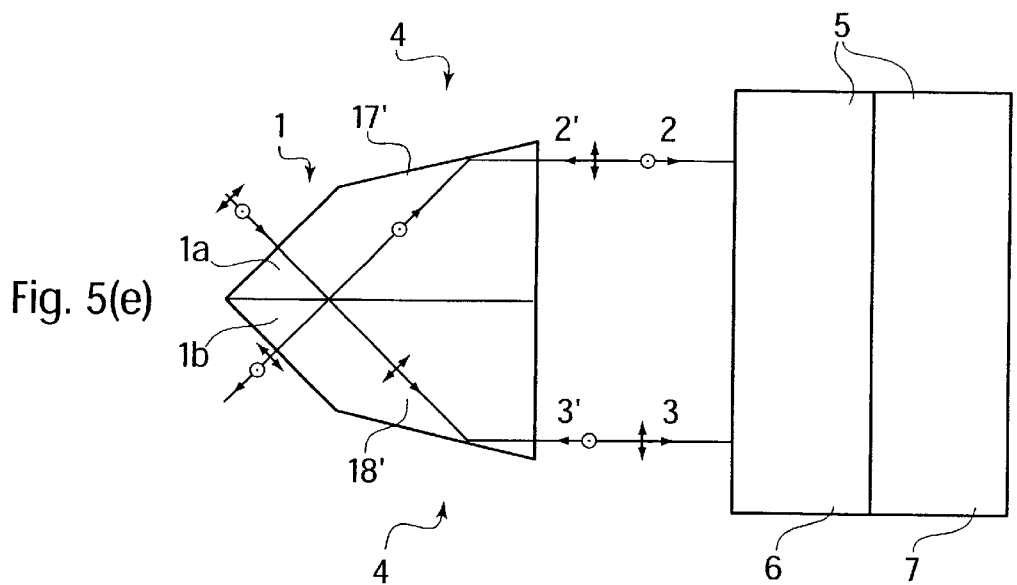
FIG. 5(e) shows a fifth exemplary embodiment of the first reflecting device in a solely schematic representation of the electro-optical element and of the second reflecting device for one channel.
Figure 5F:
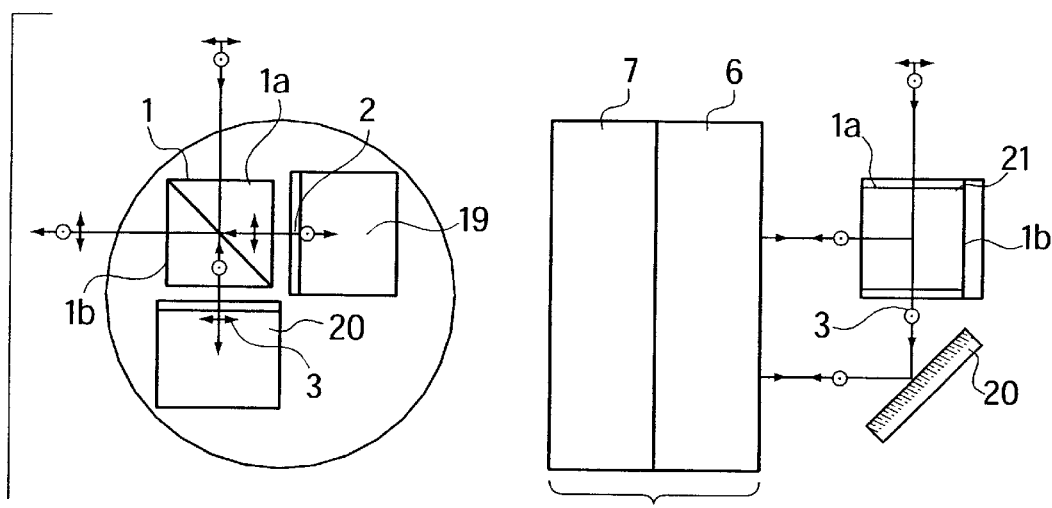
FIG. 5(f) shows a sixth exemplary embodiment of the first reflecting device in a solely schematic representation of the electro-optical element and of the second reflecting device for one channel.
Figure 5F:
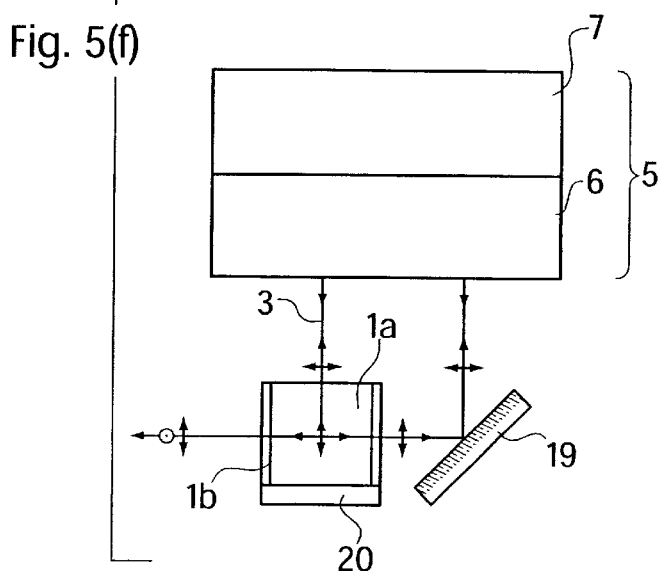
Figure 5G:
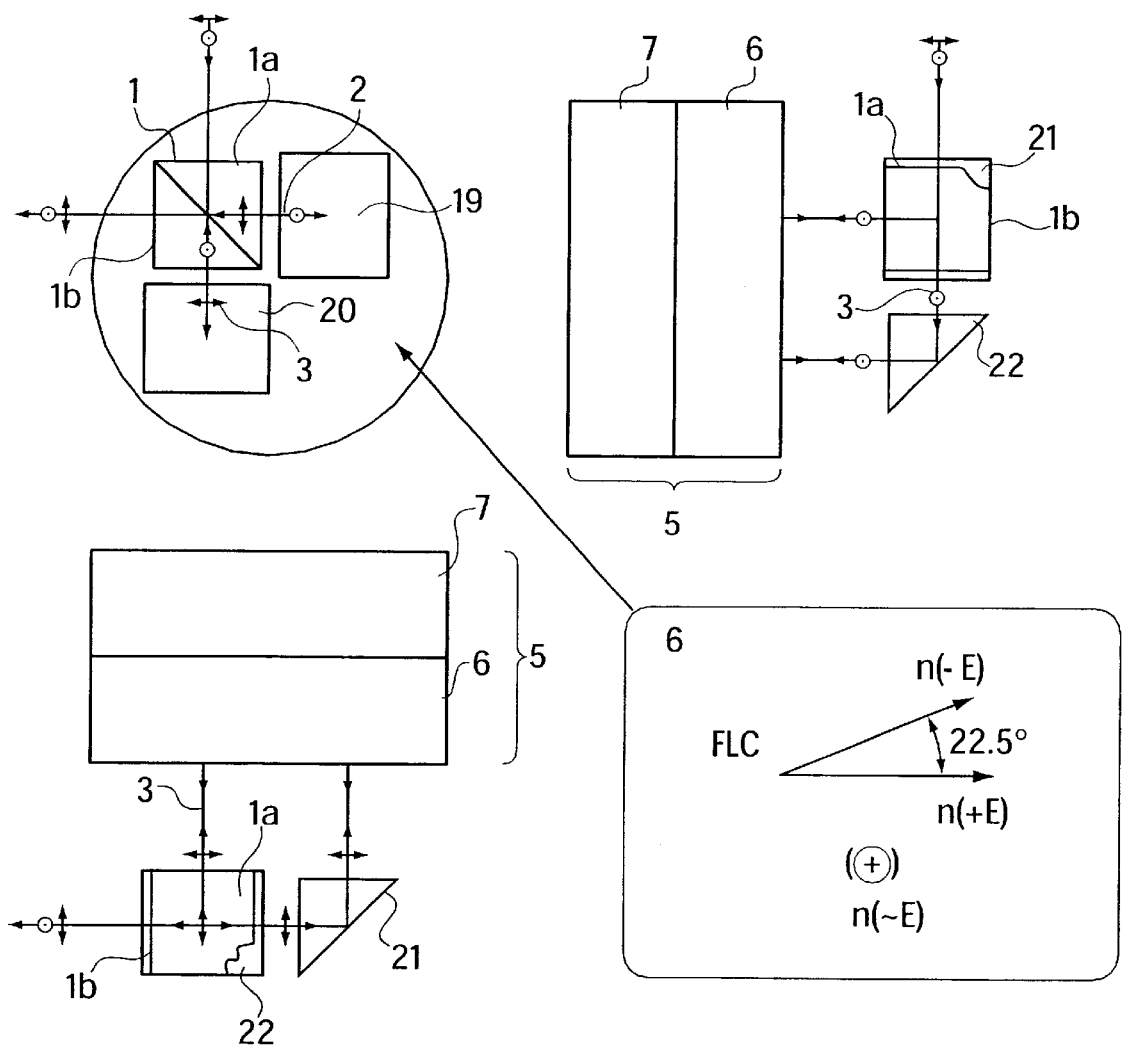
FIG. 5(g) shows a seventh exemplary embodiment of the first reflecting device in a solely schematic representation of the electro-optical element and of the second reflecting device for one channel.
Figure 5H:
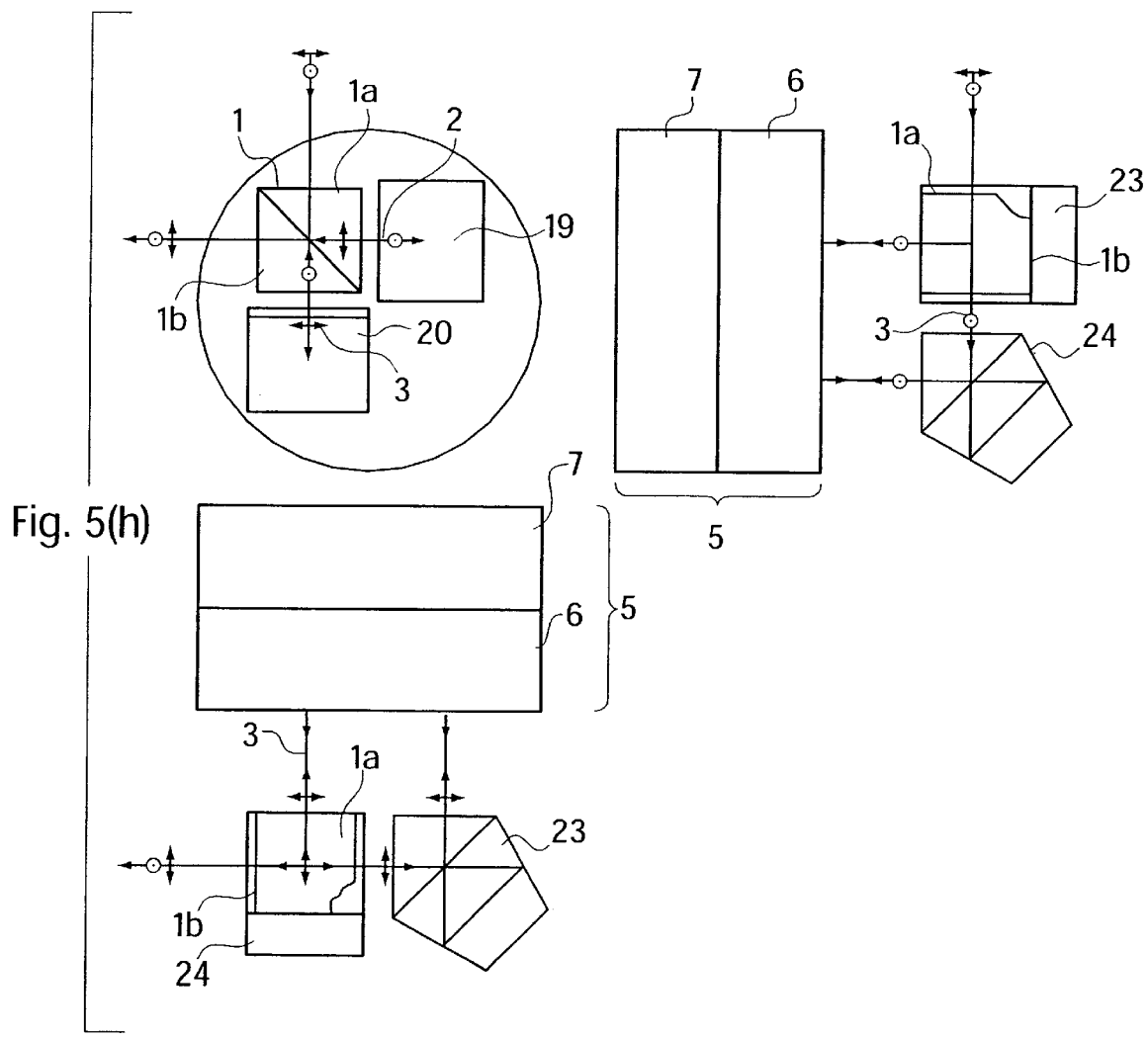
FIG. 5(h) shows an eighth exemplary embodiment of the first reflecting device in a solely schematic representation of the electro-optical element and of the second reflecting device for one channel.
Figure 5I:
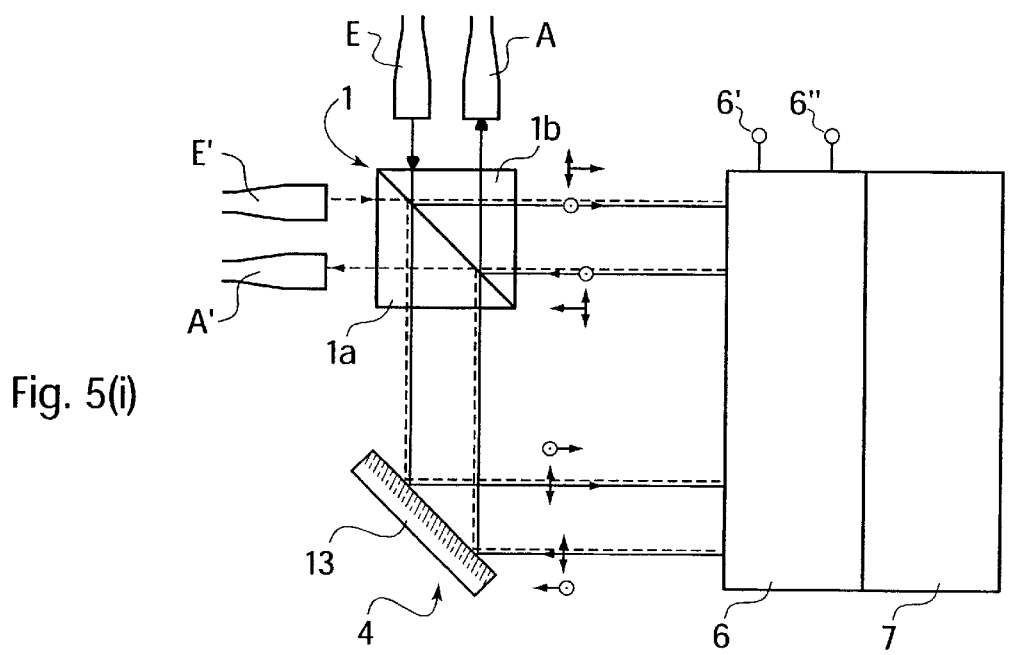
FIG. 5(i) shows a first exemplary embodiment of the first reflecting device in a solely schematic representation of the electro-optical element and of the second reflecting device for two channels.
Figure 5J:
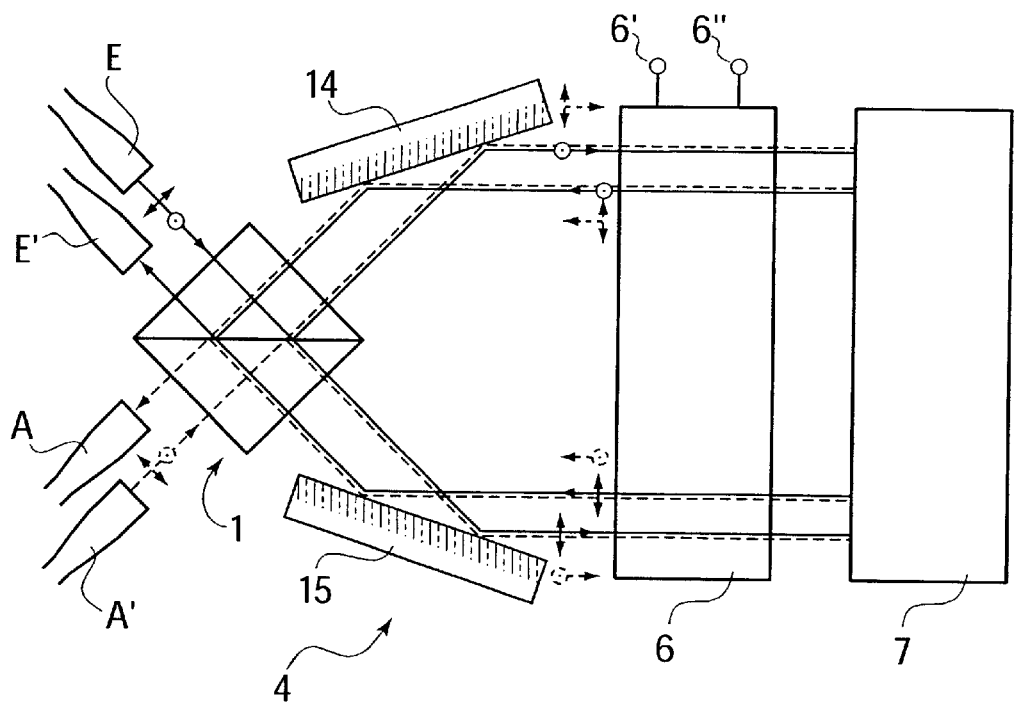
FIG. 5(j) shows a second exemplary embodiment of the first reflecting device in a solely schematic representation of the electro-optical element and of the second reflecting device for two channels.
Figure 5K:
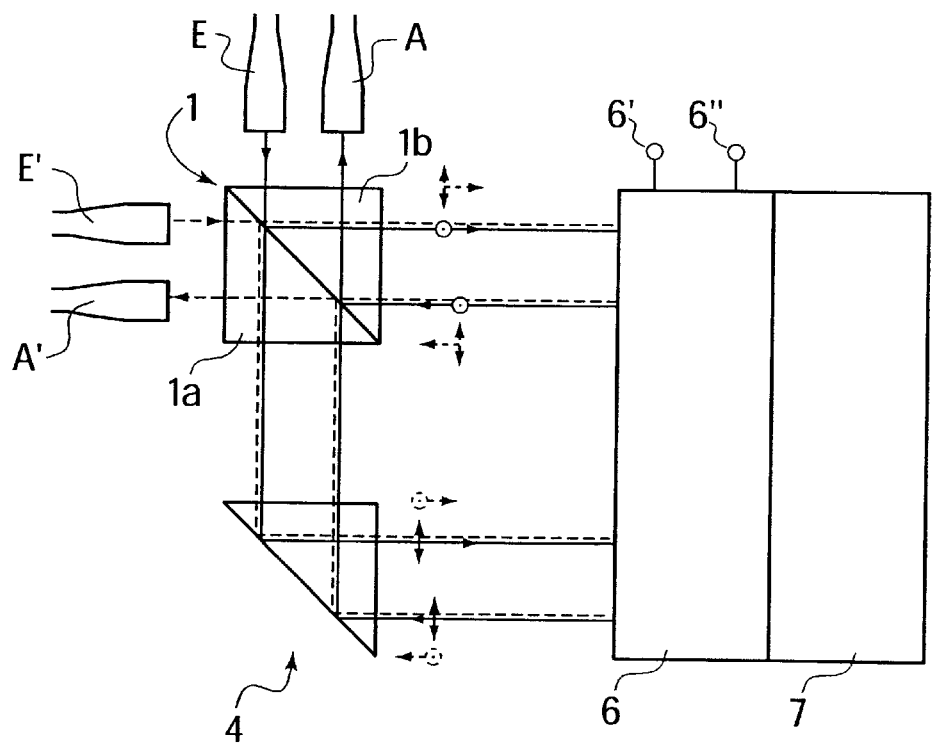
FIG. 5(k) shows a third exemplary embodiment of the first reflecting device in a solely schematic representation of the electro-optical element and of the second reflecting device for two channels.
Figure 5L:
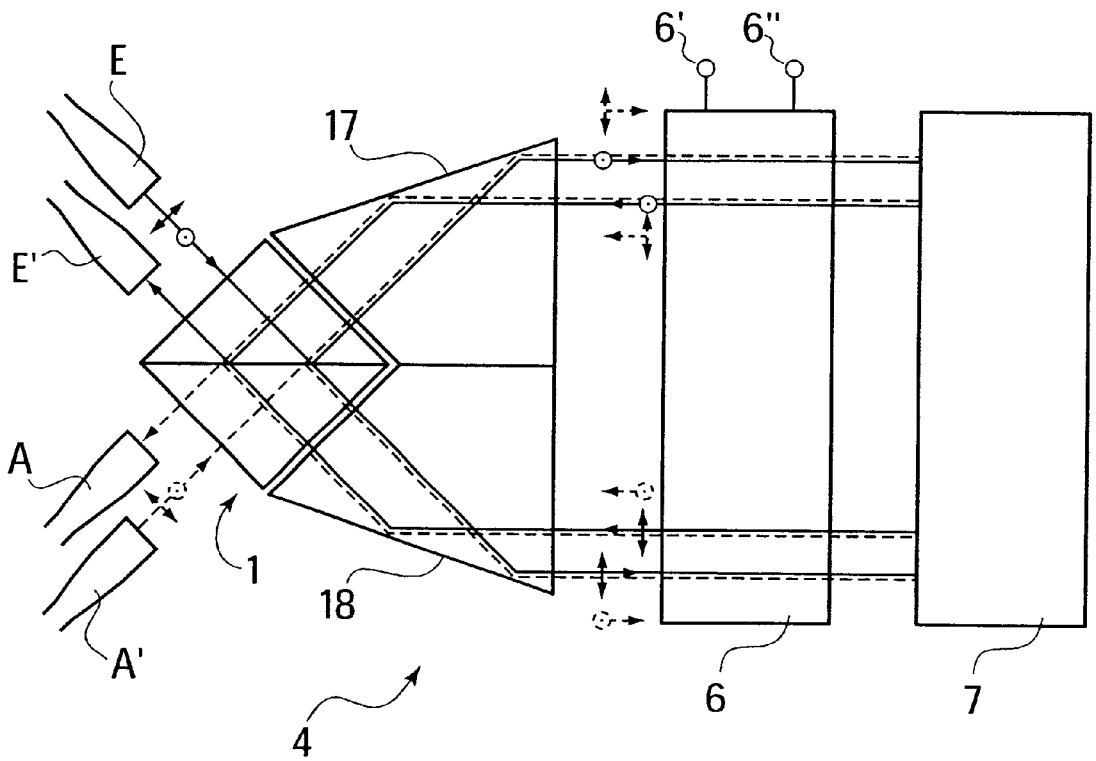
FIG. 5(l) shows a fourth exemplary embodiment of the first reflecting device in a solely schematic representation of the electro-optical element and of the second reflecting device for two channels.
Figure 5M:
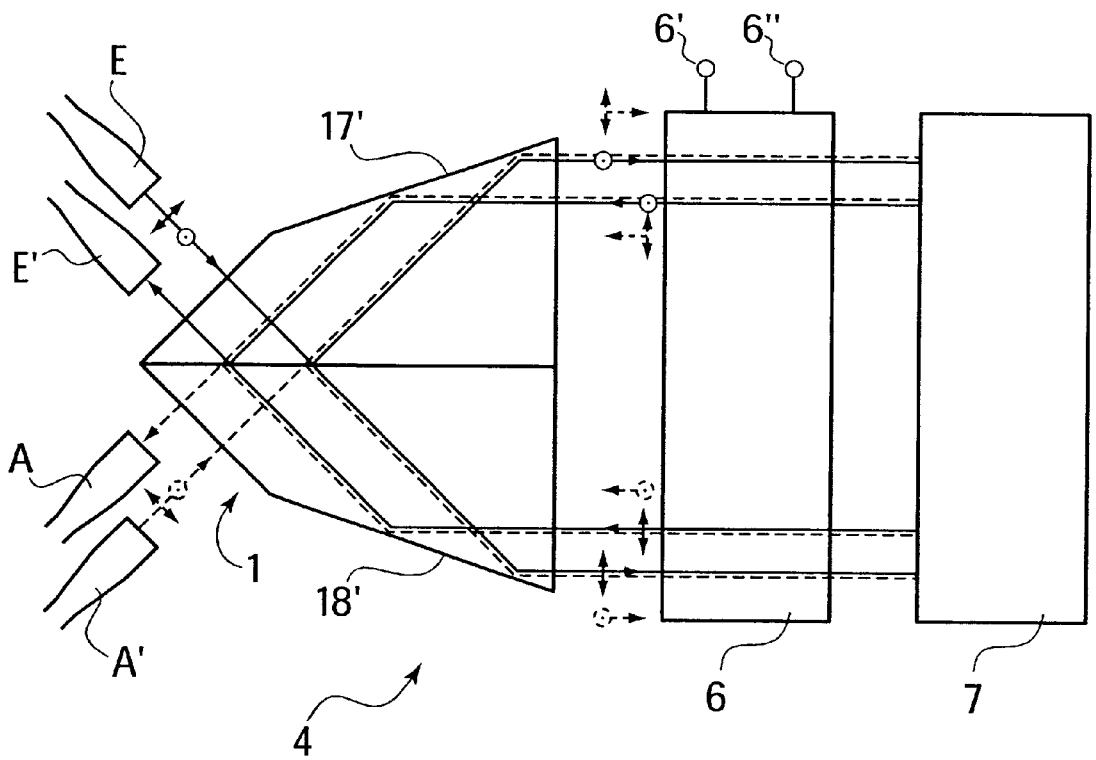
FIG. 5(m) shows a fifth exemplary embodiment of the first reflecting device in a solely schematic representation of the electro-optical element and of the second reflecting device for two channels.
Figure 5N:
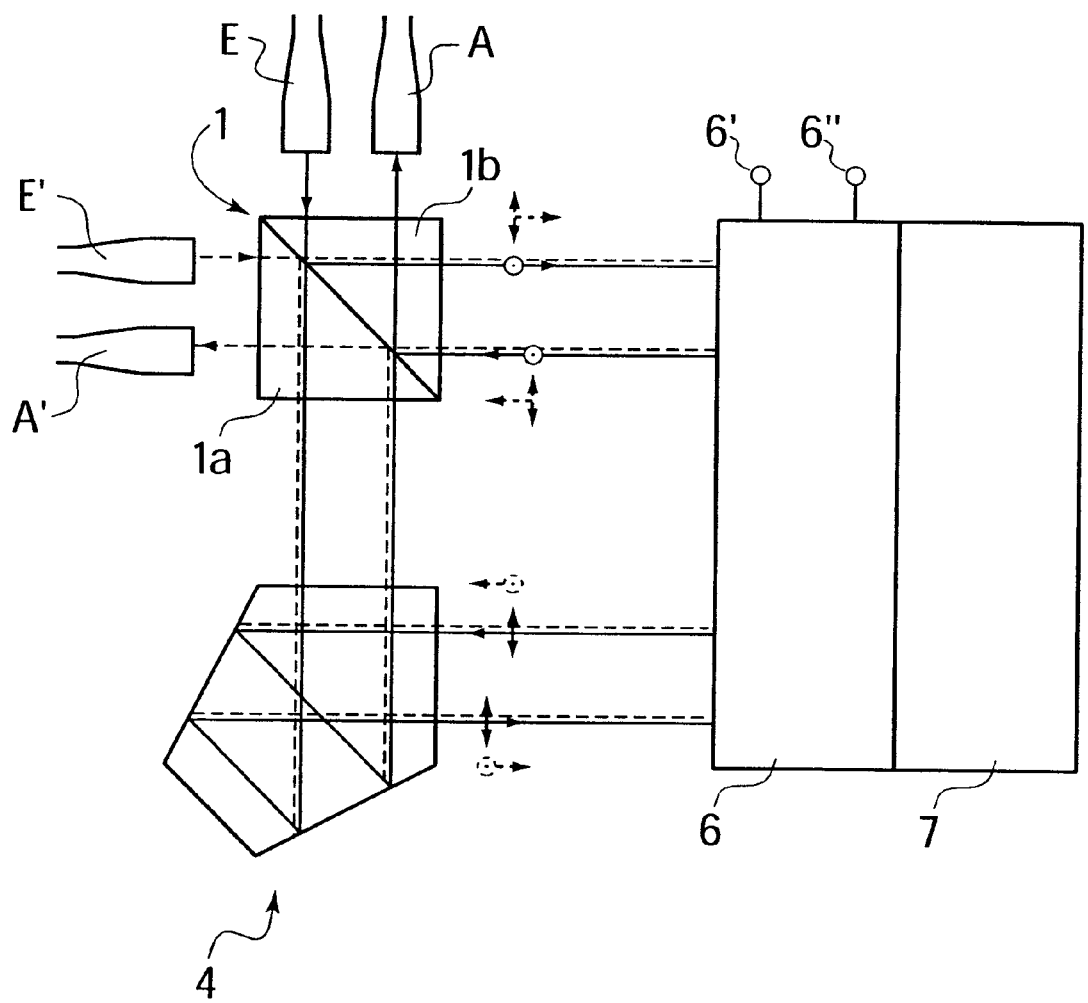
FIG. 5(n) shows a sixth exemplary embodiment of the first reflecting device in a solely schematic representation of the electro-optical element and of the second reflecting device for two channels.

FIGS. 5(a) through 5(h) show exemplary embodiments having different variants of first reflecting device 4, which is executed in FIG. 5(a) as a mirror. In the exemplary embodiment according to FIG. 5(b), for deflecting the polarized light bundles in parallel directions, two mirrors 14, 15 are used. In the exemplary embodiment according to FIG. 5(c), one polarized light bundle 3 is deflected in the direction of other light bundle 2 with the assistance of a prism 16, whereas, for this purpose, in the exemplary embodiment according to FIG. 5(d), two prisms 17, 18 are used. These prisms in the exemplary embodiment according to FIG. 5(e)

are each joined to a partial prism of the polarizing beam splitter to make one body. This has the advantage that no losses can occur through reflections on the border surfaces that otherwise exist between beam splitter 1 and prisms 17, 18. In addition, in the exemplary embodiment according to FIG. 5(*e*), assembly costs are saved.

In the exemplary embodiments according to FIGS. 5(*f*) through, 5(*h*), which each depict three views, the supplied light bundle as well as the controlled light bundle each lie in a plane parallel to liquid crystal cell 6 and to second reflecting device 7. Both polarized light bundles emerging from the polarized beam splitter are deflected (FIG. 5(*f*)) in the direction of electro-optical element 6 with the assistance of mirrors 19, 20. This takes place in the exemplary embodiment according to FIG. 5(*g*) with the assistance of two prisms 21, 22. In addition, in FIG. 5(*g*), the angle of rotation of 22.5° between the negative and a positive voltage is depicted with respect to liquid crystal cell 6, which in this case contains a ferroelectric liquid crystal. In the exemplary embodiment according to FIG. 5(*h*), pentaprisms 23, 24 are used for deflection in polarized light bundles 2, 3.

FIGS. 5(*i*) through 5(*n*) each depict the beam paths of the same arrangements, if they are acted upon, in each case, by two inputs E, E' and two outputs A, A'. In this configuration, the arrangements can again be used as changeover switches.

FIGS. 6(*a*) through 6(*g*) depict exemplary embodiments for second reflecting device 7, whereas first reflecting device 4 and electro-optical element 6 are not indicated in greater detail. FIG. 6(*a*) depicts a mirror 25 as a second reflecting device, whereas second reflecting device in FIG. 6(*b*) is formed by a hollow triple mirror 26, which is composed of three planar mirrors 27, 28, 29.

The exemplary embodiment according to FIG. 6(*c*) includes two such triple mirrors 30, 31, which are composed of three planar mirrors 32, 33, 34 and 35, 36, 37, respectively. In FIG. 6(*c*), it is also indicated that in the arrangement according to the present invention is not absolutely necessary to reflect the parallel polarized light bundles in themselves or in the respective other light bundle.

The exemplary embodiment according to FIG. 6(*d*) contains a massive triple mirror as the second reflecting device, and the exemplary embodiment according to FIG. 6(*e*) contains two massive triple mirrors 39, 40.

The exemplary embodiment according to FIG. 6(*d*) contains a pyramid prism as the second reflecting device; the exemplary embodiment according to FIG. 6(*e*) contains two pyramid prisms 39, 40.

FIG. 6(*f*) depicts two mirrors 41, 42, which form an angle of 90° and which reflect each of the parallel polarized light bundles into the other one. In the exemplary embodiment according to FIG. 6(*g*), provision is made for two pairs of mirrors 43, 44, which are composed of two individual mirrors 45, 46 and 47, 48, respectively.

FIG. 6(*h*) depicts an example for measures to obtain the same optical path lengths for polarized light bundles 2, 2', 3, 3'. Supplemental path length 49 of light bundle 3, 3' is compensated for through the fact that mirror pair 44 is arranged so as to be closer to electro-optical element 6 than mirror pair 43. Distance 50 corresponds exactly to path length differential 49.

The optical path lengths of both light bundles are the same in the exemplary embodiment according to FIG. 6(*i*) on account of the symmetrical design. As a second reflecting device, a 90° prism 51 is used. In the otherwise identical design, the exemplary embodiment according to FIG. 6(*j*) includes two 90° prisms 52, 53 as the second reflecting device.

The exemplary embodiment according to FIG. 6(*k*) contains as the first reflecting device a prism 16, a path length differential 54, in turn, resulting between the two polarized light bundles. This is compensated for by an offset shift 55 of prisms 52, 53 that function as the second reflecting device.

In the case of the arrangement according to FIG. 6(*l*), provision is made for two pentaprisms 56, 57 as the second reflecting device in a symmetrical design of the entire arrangement. In this context, first reflecting device 4, which is only schematically represented in FIG. 6(*l*), is formed, for example, by two mirrors and prisms corresponding to the exemplary embodiment according to FIGS. 5(*b*), 5(*d*), or 5(*e*).

In the exemplary embodiment according to FIG. 6(*m*), provision is made for two ridge prisms 58, 59 as second reflecting device 7, which for illustrative purposes are depicted a second time in a different view. The exemplary embodiment according to FIG. 6(*n*) contains two ridge mirror systems 60, 61, which are composed of two individual mirrors 62, 63 and 64, 65, respectively.

The corresponding application forms as changeover switches can be found in FIGS. 6(*o*) through 6(*za*), the exceptional feature arising in FIGS. 6(*p*) and 6(*r*), that mirrors 66, 67 and prism 68 are arranged vertically and, as a result, cause a transverse offset of the light bundles. This can present advantages in the spatial disposition of the device in a concrete application.

FIG. 7(*a*) depicts a three-dimensional representation of an exemplary embodiments in the form of an exploded view. A prism 16 functions as a first reflecting device, a mirror 25 as a second. Angle α is the angle between slow axis 8' of liquid crystal 9 and the s-polarization of bundle 2. Angle β is the angle between rapid axis 10' of delay plate 10 (on a lambda/4 plate) and the s-polarization of light bundle 2.

In the exemplary embodiment of FIG. 7(*b*) designed so as to otherwise correspond to FIG. 7(*a*), provision is made for a triple mirror 38 as the second reflecting device. In this way, the polarized light bundles that are reflected so as to run in parallel are reversed with respect to the non-reflected light bundles, so that altogether for both light bundles the same optical path results. This also applies to the exemplary embodiment according to FIG. 7(*c*), in which a 90° prism 51 is arranged as the second reflecting device.

FIG. 7(*d*) depicts the arrangement according to FIG. 7(*c*) for the application case as changeover switch.

FIGS. 8(*a*) and 8(*b*) depict an exemplary embodiment having a 90° prism 16 as a first reflecting device, a liquid crystal cell, and a lambda/4 plate 10 as an electro-optical element 6. In addition, a 90° prism 51 is provided as a second reflecting device. FIG. 8(*a*) represents the arrangement in the off-state, i.e., closed, whereas FIG. 8(*b*) depicts the device in the on-state, or open.

The exemplary embodiment according to FIGS. 8(*a*) and (*b*) contains a nematic liquid crystal cell having a positive dielectrical anisotropy. n is the pneumatic director, which corresponds to switchable optical axis 8'. Light bundles 2" and 3" at this angle have a polarization of 45° and −45° In lambda/4 plate 10, this linear polarization is transformed into a right or left rotating circular polarization, which after the reflection in prism 51 obtains a different direction of rotation.

In the repeated passage through lambda/4 plate 10, a linear polarization again arises of −45° regarding light bundle 2''', and of +45° regarding light bundle 3'''. This polarization, in the repeated passage through the liquid crystal cell, is rotated by 45°, so that light bundle 2' is polarized in the drawing plane, whereas light bundle 3' is polarized perpendicular to the drawing plane. In this polarization, light bundle 2" is permitted to pass directly through polarizing beam splitter 1, whereas light bundle 3" after the deflection in prism 16 is reflected in polarizing beam splitter 1 and emerges through input face 1a. Thus no light arrives through output face 1b, so that in the described voltageless case according to FIG. 8(a), the switch is closed. Through a corresponding transmission of the light from input face 1a or through a corresponding arrangement of sensors, the arrangement according to FIGS. 8(a) and 8(b) can also be used as a changeover switch or, in the case of a gradual transition, as cross-fader.

Figure 8A:
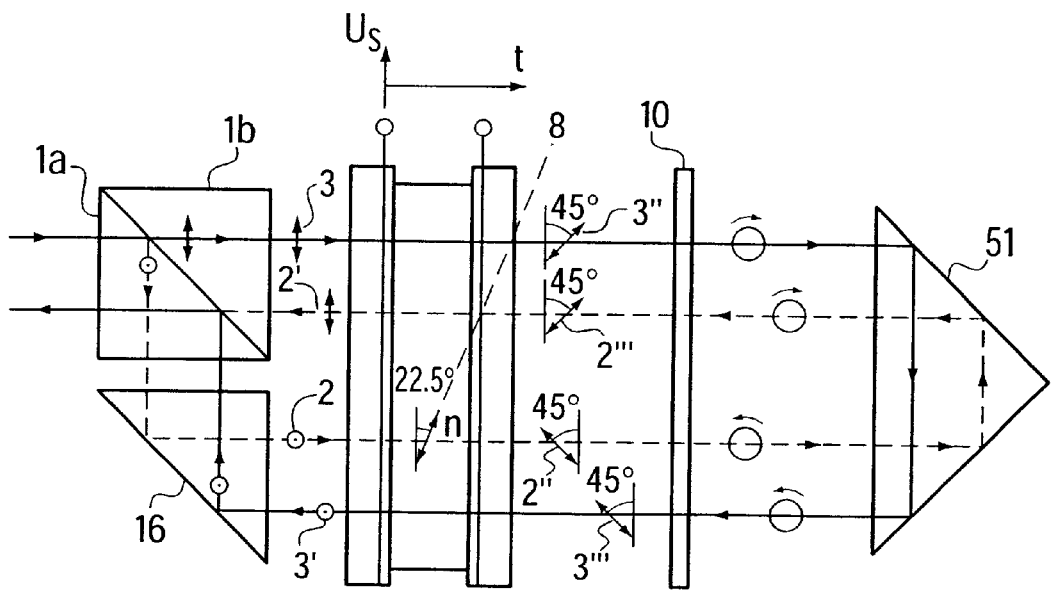
FIG. 8(a) shows a first exemplary embodiment for one channel having specifically one prism as a reflecting device, one nematic liquid crystal cell, and one delay plate in two operating states.
Figure 8B:
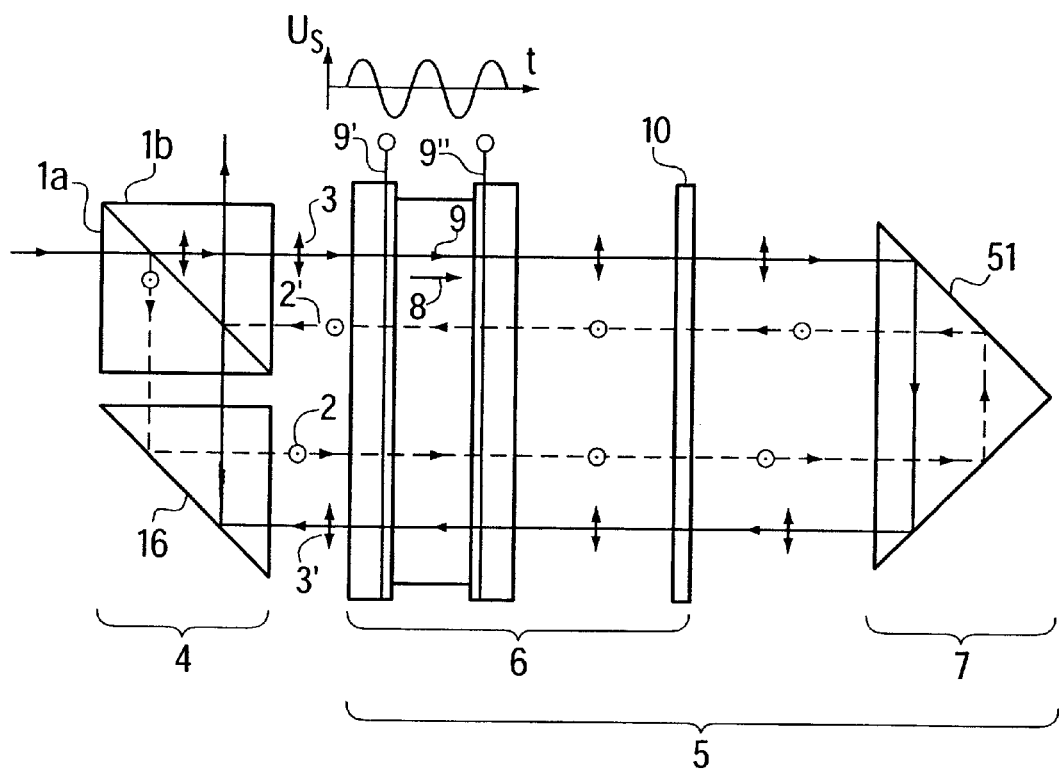
FIG. 8(b) shows a second exemplary embodiment for one channel having specifically one prism as a reflecting device, one nematic liquid crystal cell, and one delay plate in two operating states.

In the case depicted in FIG. 8(b), liquid crystal cell 8 is acted upon by a voltage, so that the nematic liquid crystal is placed into the homeotropic state. The non-polarized light at input face 1a is conveyed to output face 1b. Director 8" of nematic liquid crystal 9 is perpendicular to the surface of the electrodes.

Figure 8C:
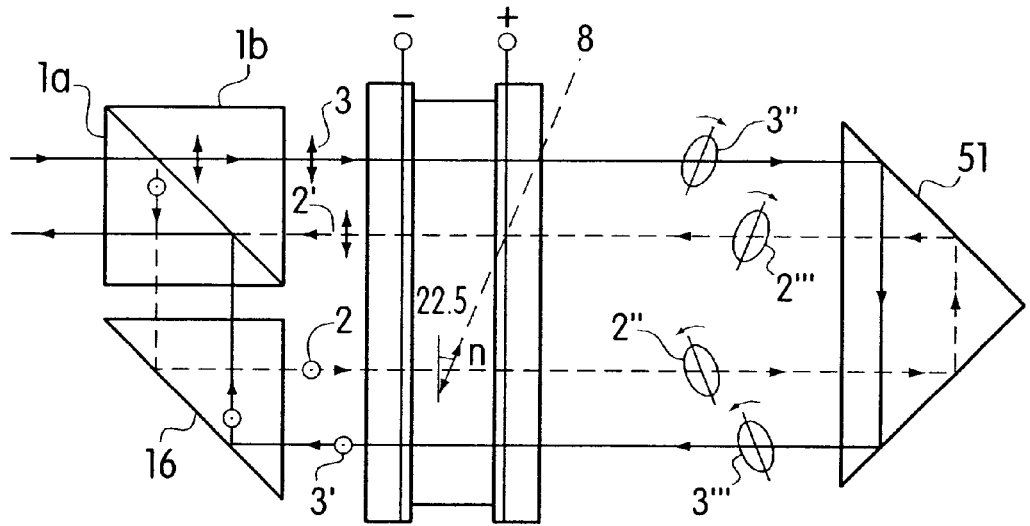
FIG. 8(c) shows a first exemplary embodiment as in FIGS. 8(a) and(b), however without a delay plate.
Figure 8D:
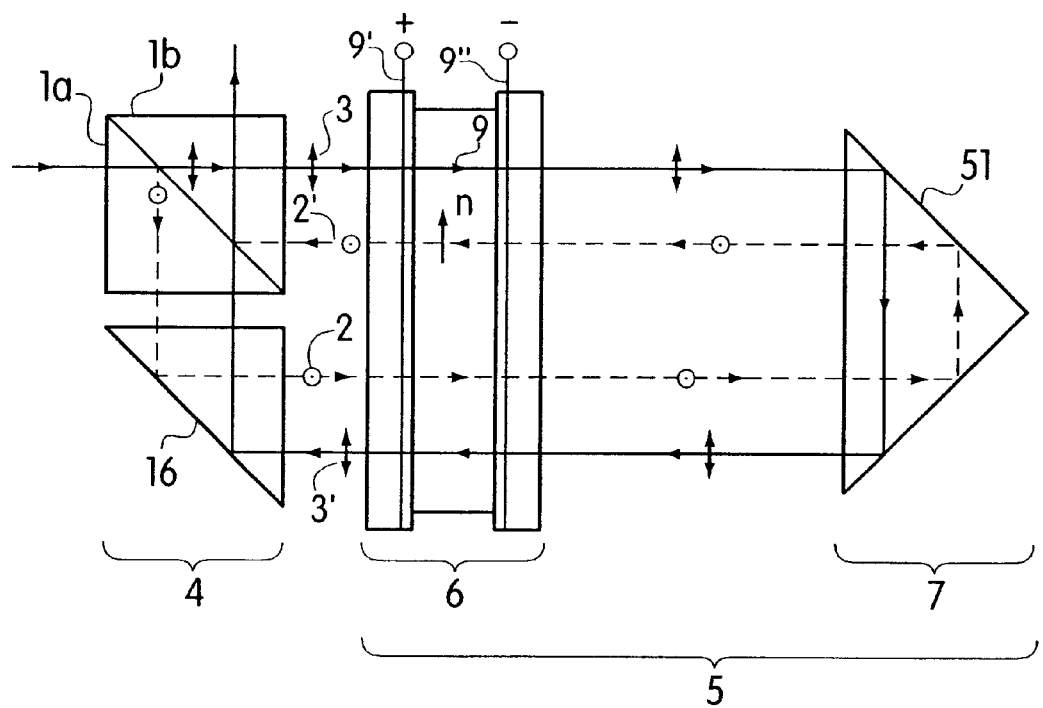
FIG. 8(d) shows a second exemplary embodiment as in FIGS. 8(a) and(b), however without a delay plate.

FIGS. 8(c) and 8(d) depict an exemplary embodiment having a ferroelectric liquid crystal cell 8 of a thickness of the liquid crystal layer, which effects an optical path differentiation of (⅜) lambda in the blocking state according to FIG. 8(c). Prism 16 is used as a first reflecting device, a 90° prism 51 as a second reflecting device. In order to switch from the off-state in the on-state, the polarity of the voltage at electrodes 9', 9" is reversed. In the off-state (closed), light bundles 2" and 3" emerging from liquid crystal cell 8 are elliptically polarized. Through the reflection in prism 51, the direction of rotation and the angle of the axes of ellipsis are changed. In the off-state in accordance with FIG. 8(d), no rotation of polarization takes place by liquid crystal cell 8.

Figure 8E:
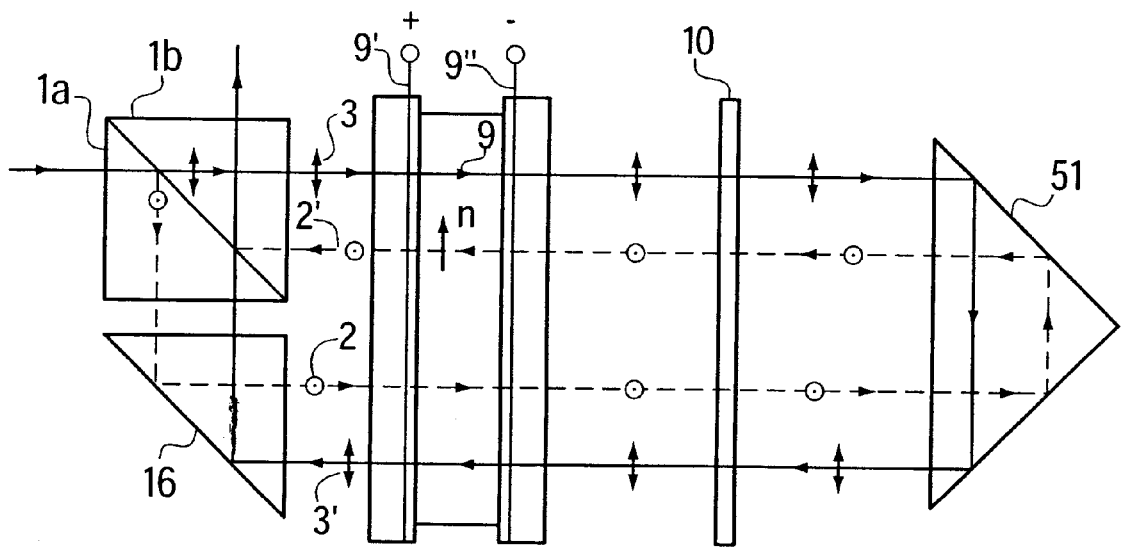
FIG. 8(e) shows a first exemplary embodiment as in FIGS. 8(a) and (b), however having a ferroelectric liquid crystal cell.
Figure 8F:
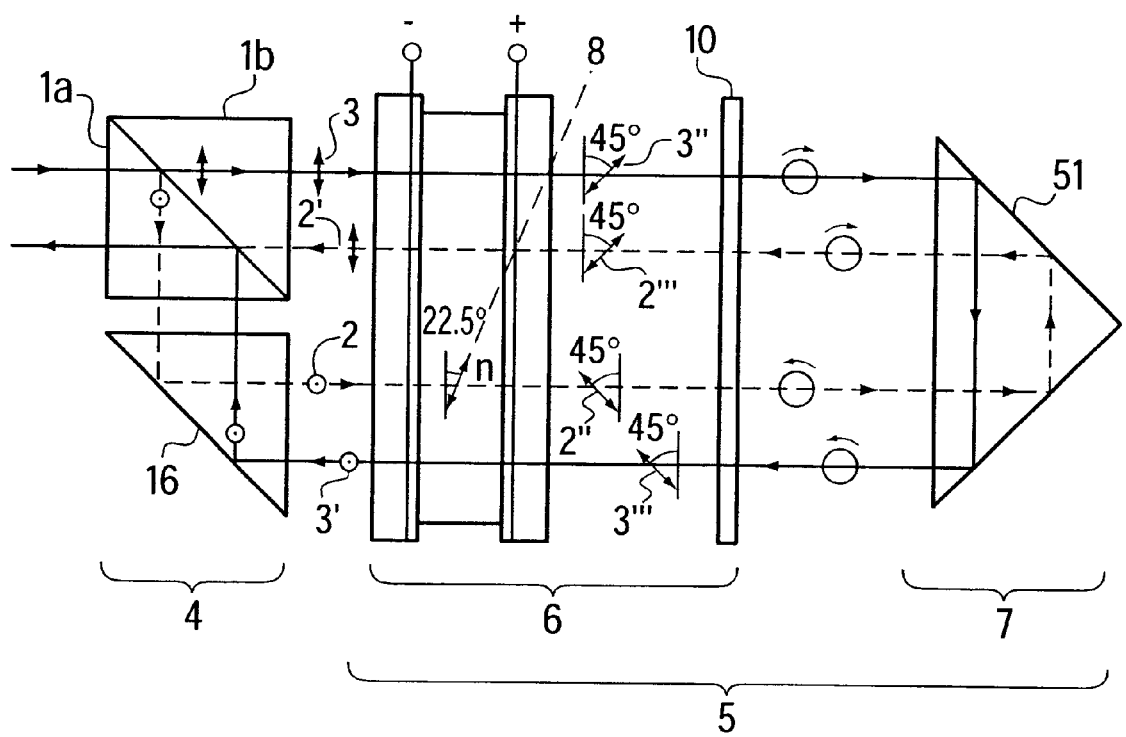
FIG. 8(f) shows a second exemplary embodiment as in FIGS. 8(a) and(b), however having a ferroelectric liquid crystal cell.
Figure 8G:
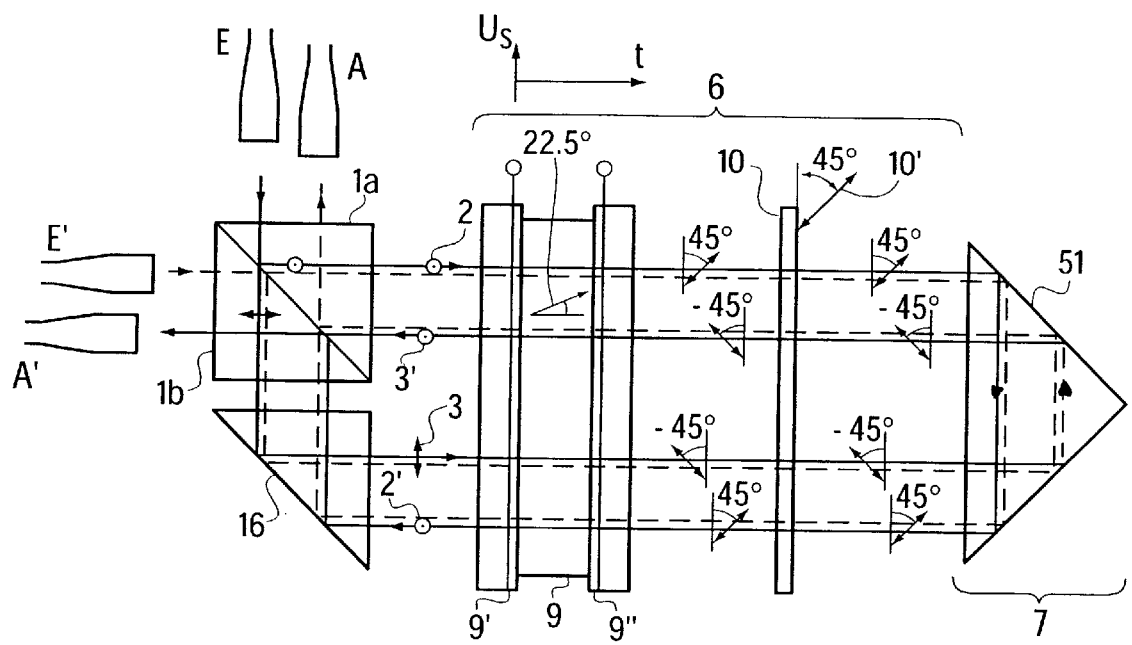
FIG. 8(g) shows a first embodiment for two channels having prisms as reflecting devices, one nematic liquid crystal cell, and one delay plate in two operating states.
Figure 8H:
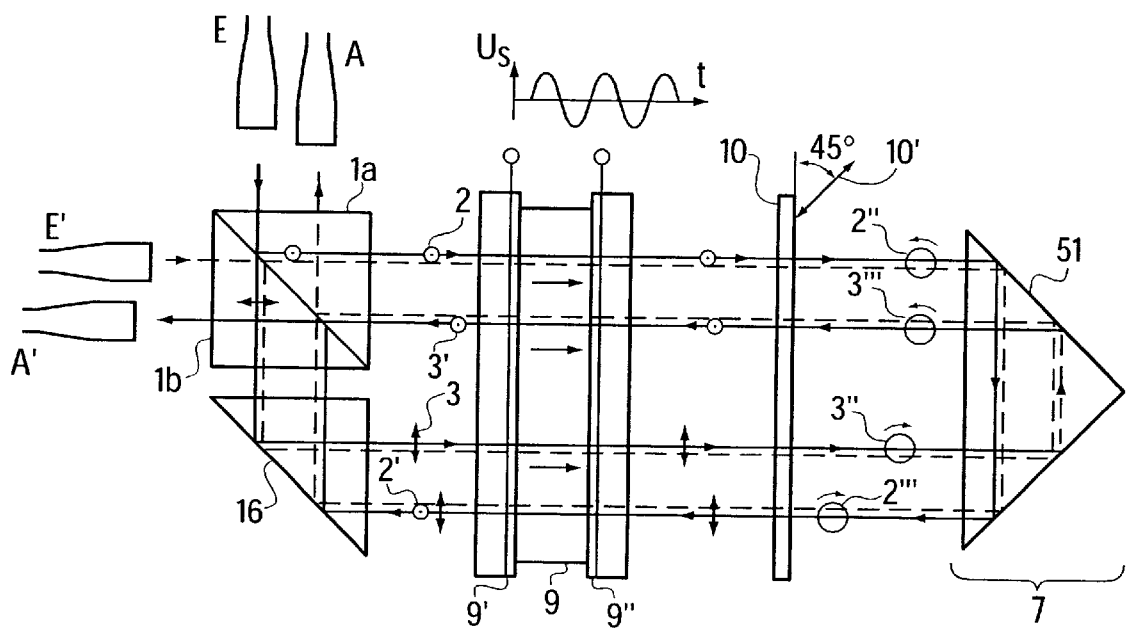
FIG. 8(h) shows a second embodiment for two channels having prisms as reflecting devices, one nematic liquid crystal cell, and one delay plate in two operating states.
Figure 8I:
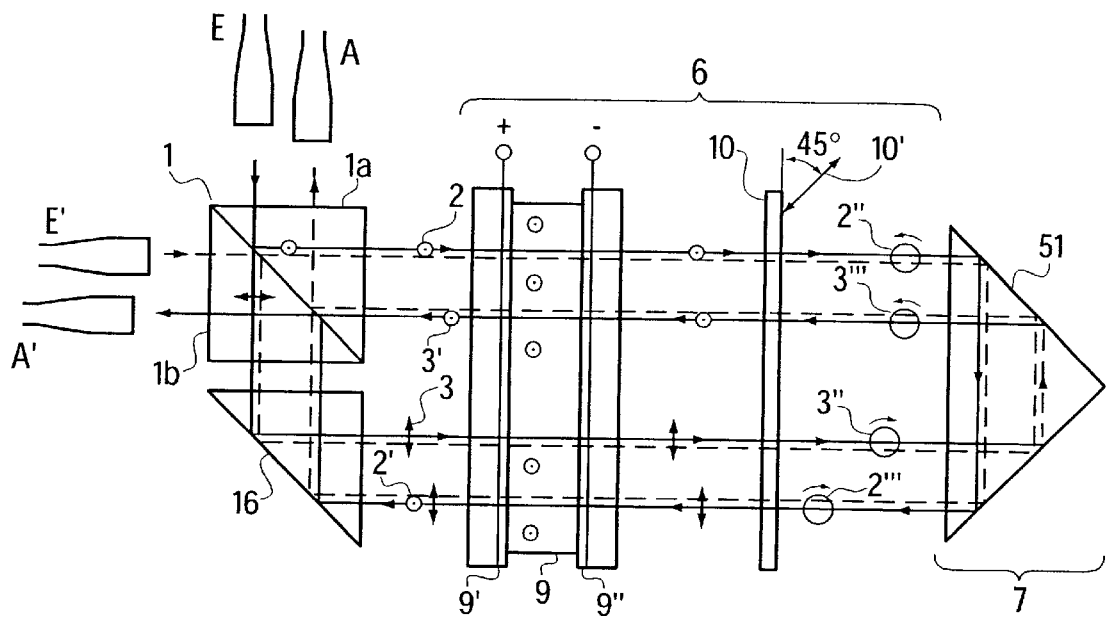
FIG. 8(i) shows a first exemplary embodiment as in FIGS. 8(g) and (h), however having a ferroelectric liquid crystal cell.
Figure 8J:
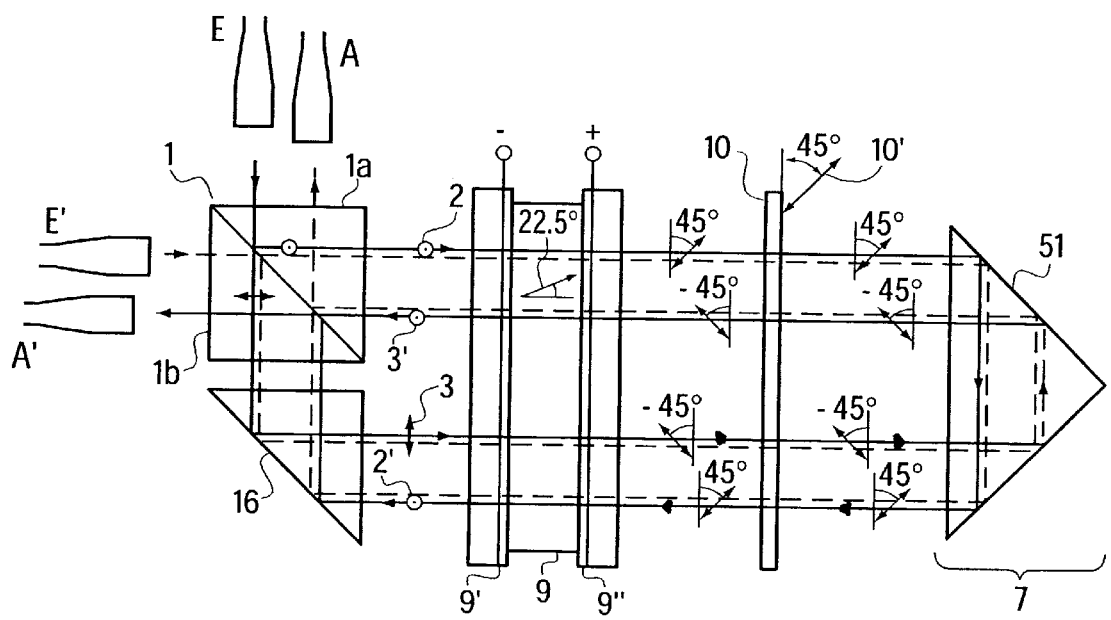
FIG. 8(j) shows a second exemplary embodiment as in FIGS. 8(g) and (h), however having a ferroelectric liquid crystal cell.

The exemplary embodiment according to FIGS. 8(e) and 8(f) contains a ferroelectric liquid crystal cell, whose liquid crystal layer 9 has a thickness d such that the optical path differential is lambda/2. In addition, a lambda/4 plate 10 is used. In the pass-through state according to FIG. 8(e), slow axis 8' is positioned as the polarization plane of light bundle 3. In the blocking state according to FIG. 8(f), slow axis 8' is offset by 22.5° from the polarization plane of light bundle 3. Prism 16 and prism 51 are employed as a first and second reflecting device is as in the exemplary embodiment according to FIG. 8(c) and 8(d).

FIGS. 8(g) through 8(j) depict the beam path of the arrangements, described above, in their use as changeover switches.

Figure 9A:
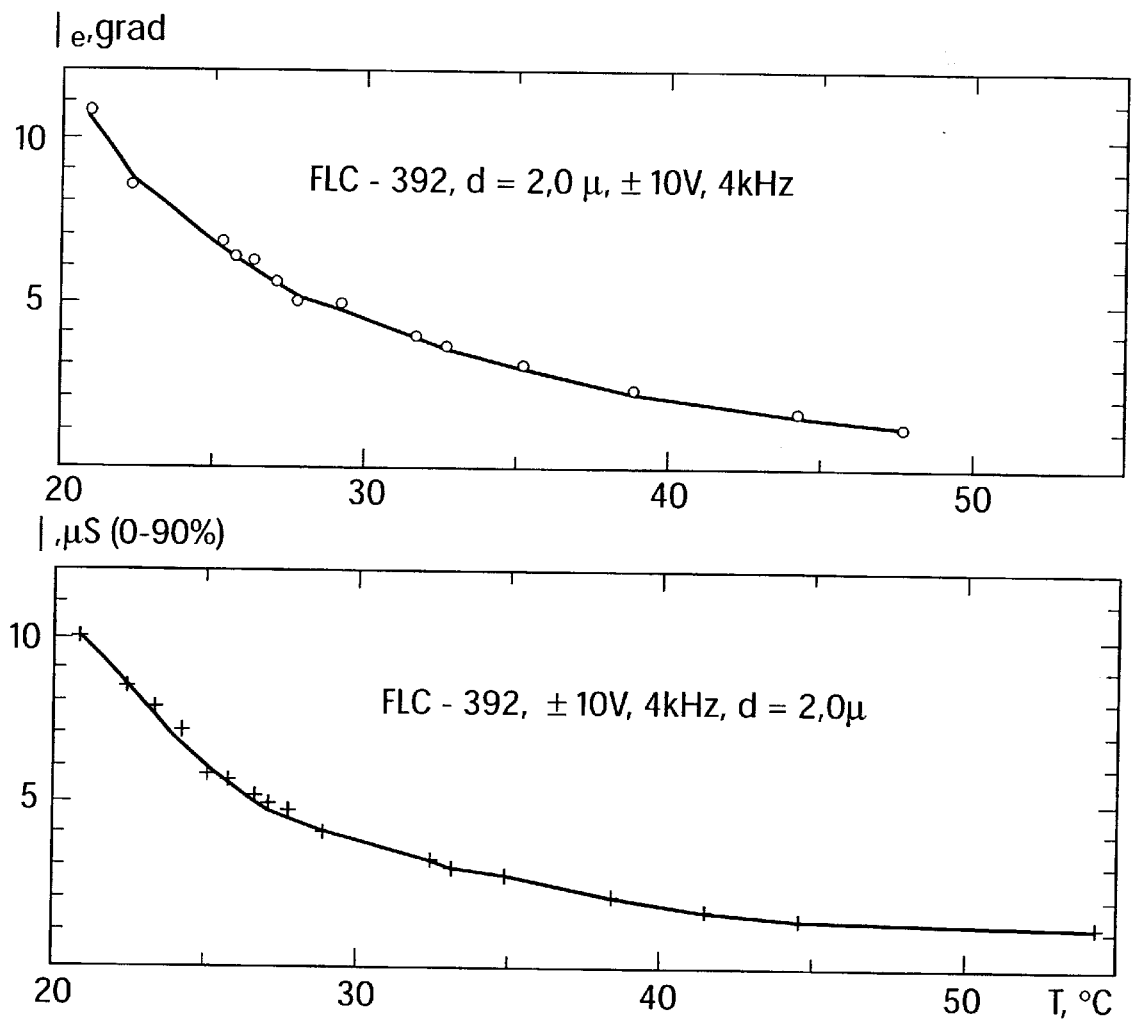
FIG. 9(a) shows the switching time and the angle of inclination of the electroclinic material as a function of temperature.
Figure 9B:
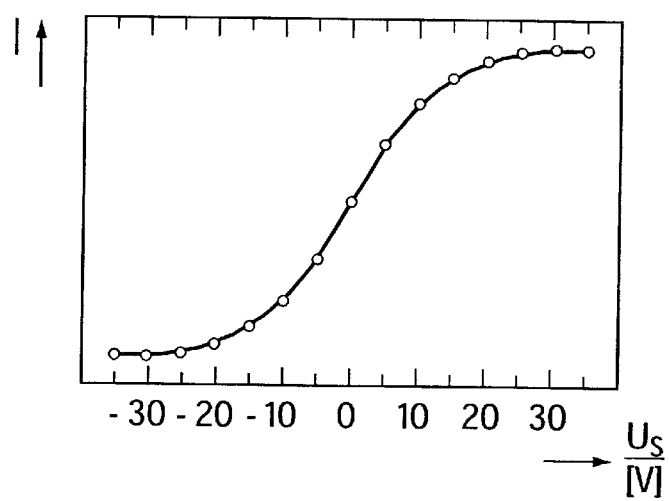
FIG. 9(b) shows the modulation loop of an arrangement for a channel as a function of the control voltage.

FIG. 9(a) depicts the temperature dependency of the induced angle of inclination +/−θ and of average switching time tau for electroclinic material FLC-392. The thickness of the liquid crystal cell is 1.6 μm, the control voltage is +/−10 V. FIG. 9(b) represents the modulation depth of an arrangement according to FIGS. 7(c) and 8(e/f) as a function of control voltage V. A liquid crystal cell having an electroclinic liquid crystal and a lambda/4 plate is based on the measurement.

Figure 9C:
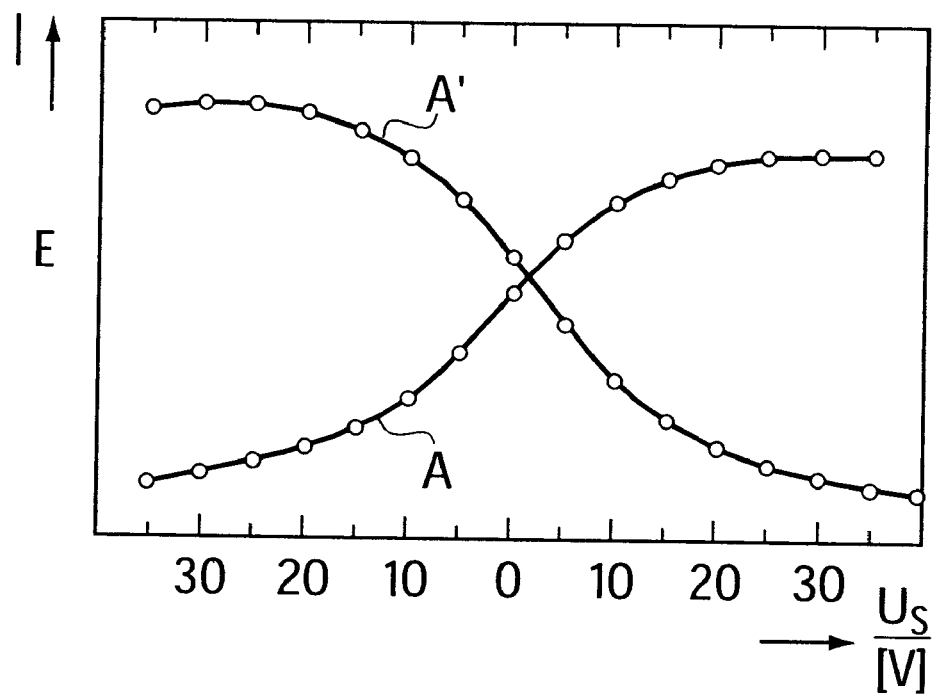
FIG. 9(c) shows the modulation loop of an arrangement for two channels as a function of the control voltage.
Figure 9C:
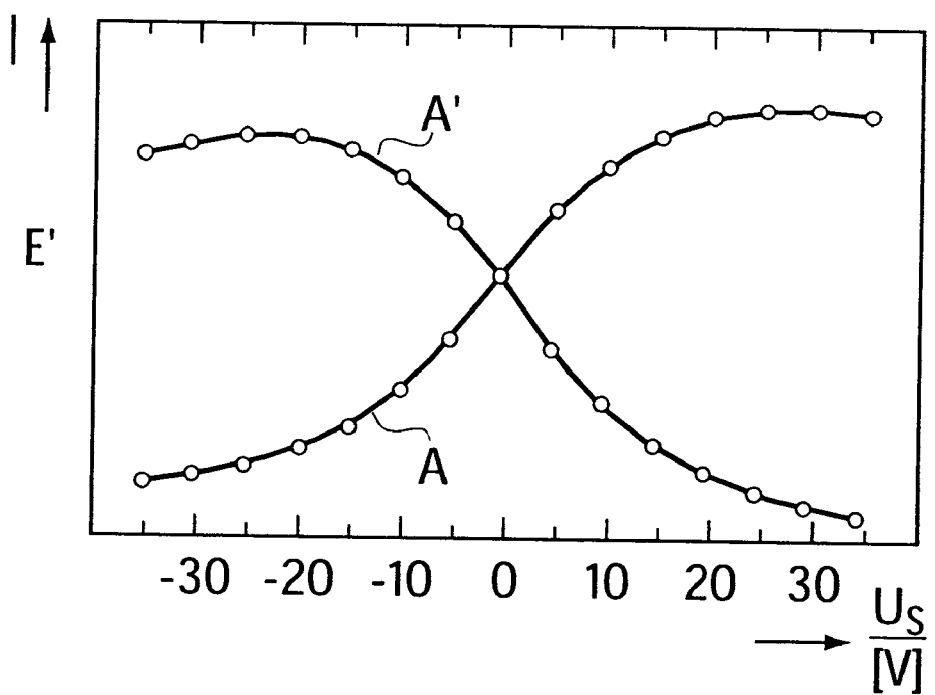

FIG. 9(c) depicts intensity I of the controlled light arriving at outputs A, A' as a function of control voltage $U_s$. The curves were included in the arrangement according to FIG. 7(d). In the upper diagram, the light comes from input E and in the lower diagram from input E'. It is clear that a complete switchover between outputs A and A' takes place using liquid crystal cell FLC 392 used here at a voltage differential of roughly 60 volts.

Through the type of liquid crystal and its drive, through the thickness of the liquid crystal, through the arrangement of a delay plate and further optical preconditions in the arrangement according to the present invention, a great many different combinations are possible. Some of them are described below.

If, for example, in the nematic liquid crystal the transformation is undertaken from planar to homeotropic, then a use in binary switching processes (on/off) is given. For this case, the orientation of slow axis 8' coincides with the director of the long molecular axis. It is to be below 45° with respect to the polarization directions of the polarizing beam splitter. In this context, thickness d of the liquid crystal layer is to satisfy the condition δn·d=lambda/4+N·lambda, where N=0, +/−1, +/−2, +/−3, . . . In this context, δn is the birefringence of the layer (δn=$n_L$−$n_S$), $n_L$ being the refractive index of the liquid crystal in the slow axis and $n_s$ in the rapid axis. Without an electrical field, the switch is in the off-state. With an electrical field, the liquid crystal is homeotropic and the light enters at face 1b (on-state). Examples for such arrangements are depicted in FIGS. 6(b) through 6(e) and 7(b).

In the designs according to FIGS. 6(f) through 6(n), the properties of the liquid crystal are different than in the preceding fields. First of all, thickness d of the liquid crystal cell is such that a delay of δn·d=(⅜) lambda+N·lambda results. In addition, the director of the layer of 22.5° is switched over to −22.5° in the electrical field with respect to the p-polarization plane. Without an electrical field, the arrangement is switched off. With an electrical field, a homeotropic orientation begins, the arrangement being switched on.

Liquid crystal cells combined with the use of the s-effect in nematic liquid crystals can be used for switches of a high aperture and having switching times in the order of magnitude of ms, i.e., in a frequency range of 0 Hz to 100 Hz, preferably using a lambda/4 plate.

Figure 6A:
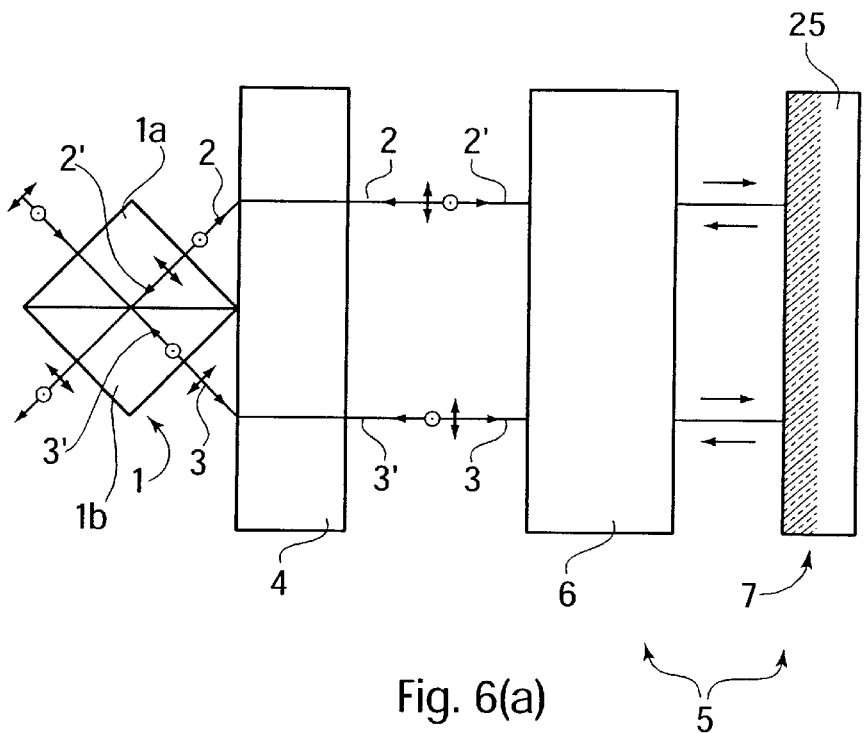
FIG. 6(a) shows a first exemplary embodiment for the second reflecting device in a solely schematic representation of the electro-optical element and of the first reflecting device for one channel.
Figure 6B:
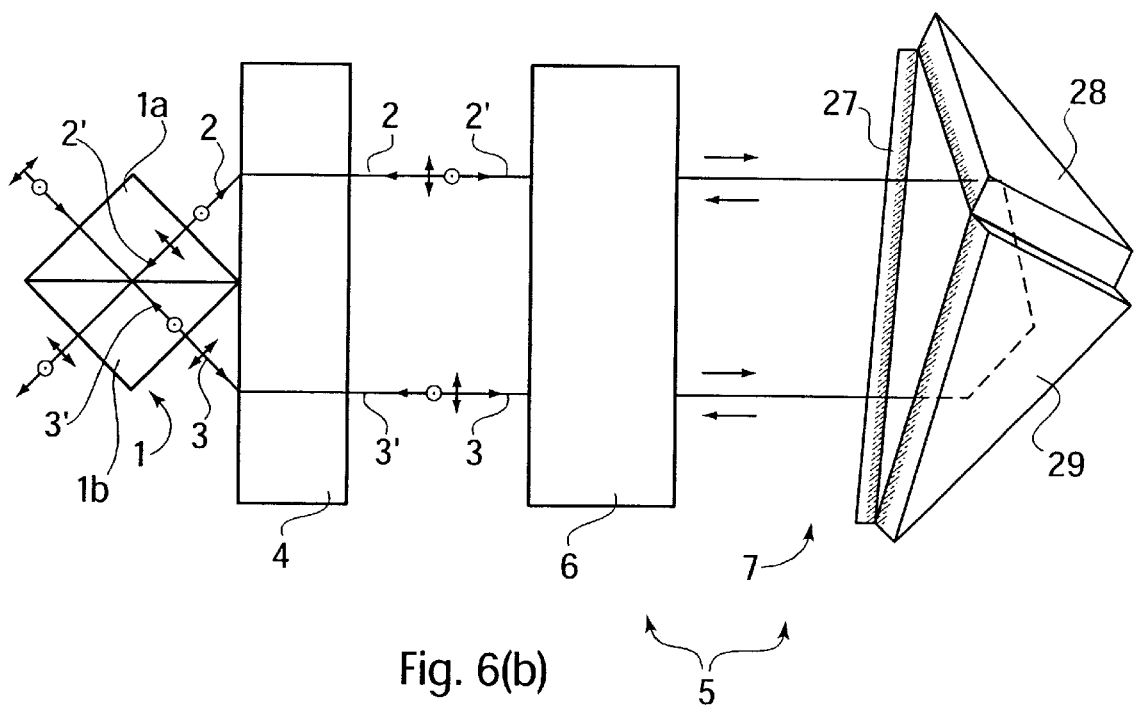
FIG. 6(b) shows a second exemplary embodiment for the second reflecting device in a solely schematic representation of the electro-optical element and of the first reflecting device for one channel.
Figure 6C:
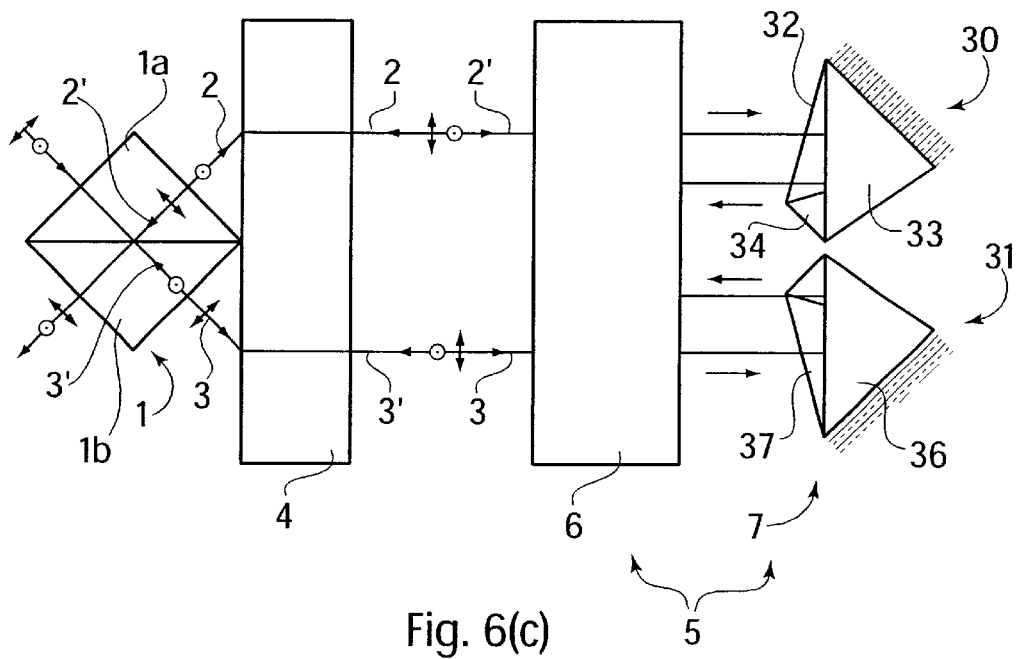
FIG. 6(c) shows a third exemplary embodiment for the second reflecting device in a solely schematic representation of the electro-optical element and of the first reflecting device for one channel.
Figure 6D:
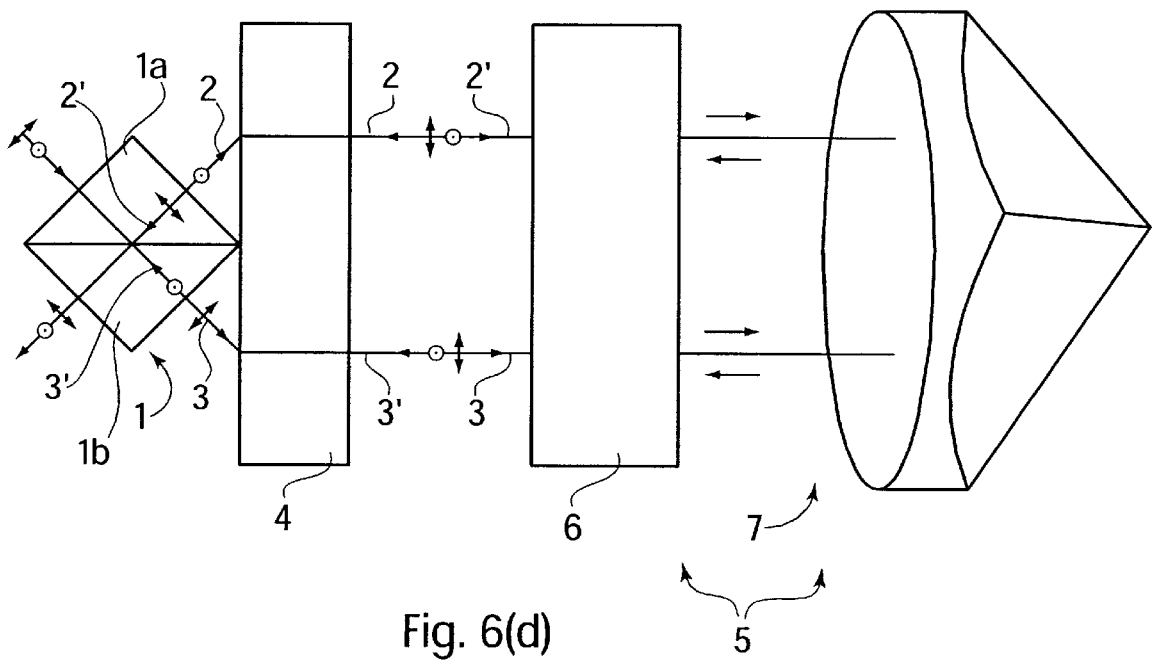
FIG. 6(d) shows a fourth exemplary embodiment for the second reflecting device in a solely schematic representation of the electro-optical element and of the first reflecting device for one channel.
Figure 6E:
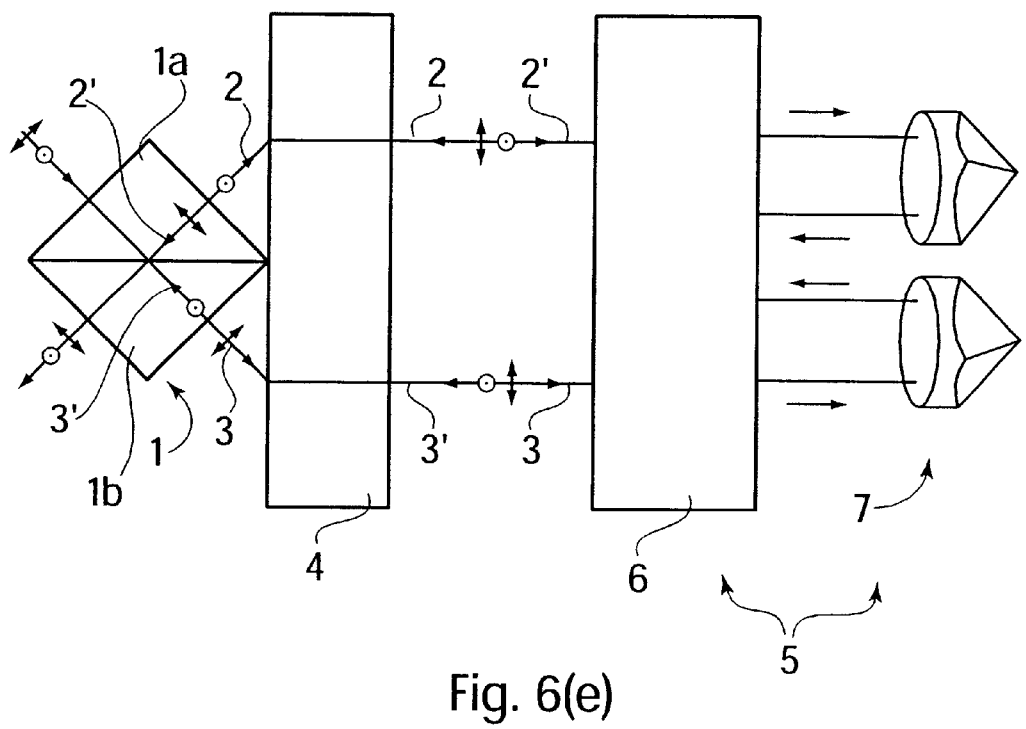
FIG. 6(e) shows a fifth exemplary embodiment for the second reflecting device in a solely schematic representation of the electro-optical element and of the first reflecting device for one channel.
Figure 6F:
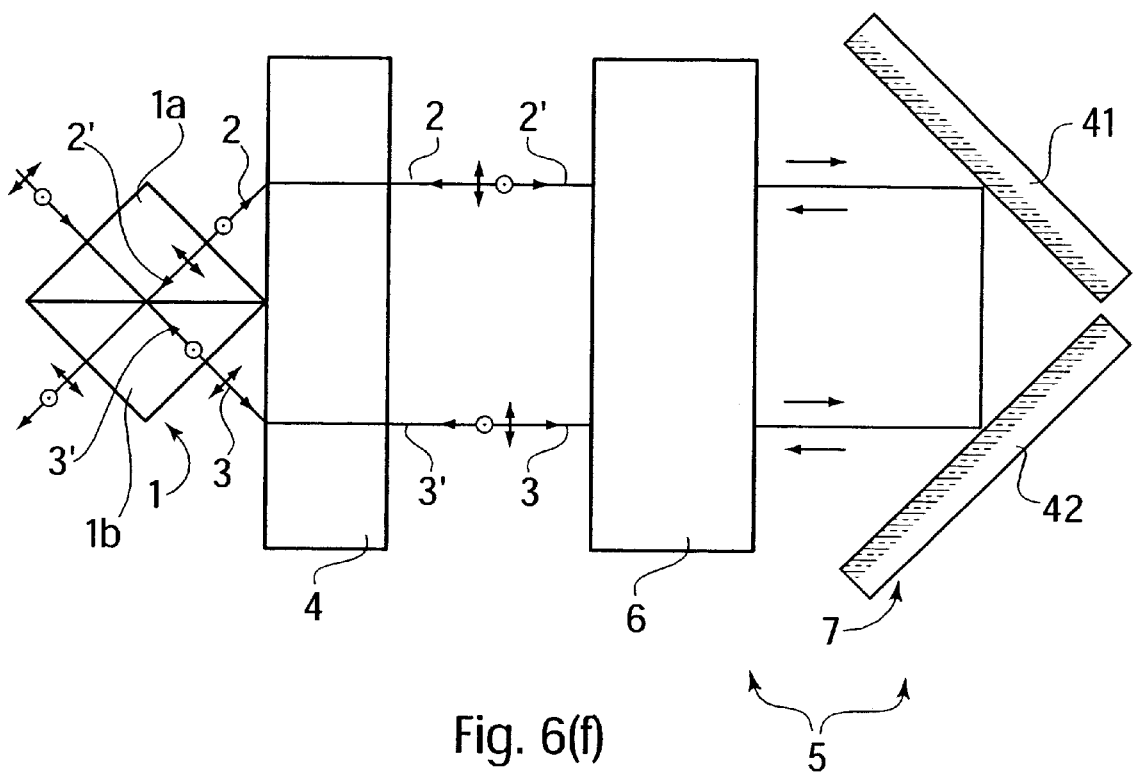
FIG. 6(f) shows a sixth exemplary embodiment for the second reflecting device in a solely schematic representation of the electro-optical element and of the first reflecting device for one channel.
Figure 6G:
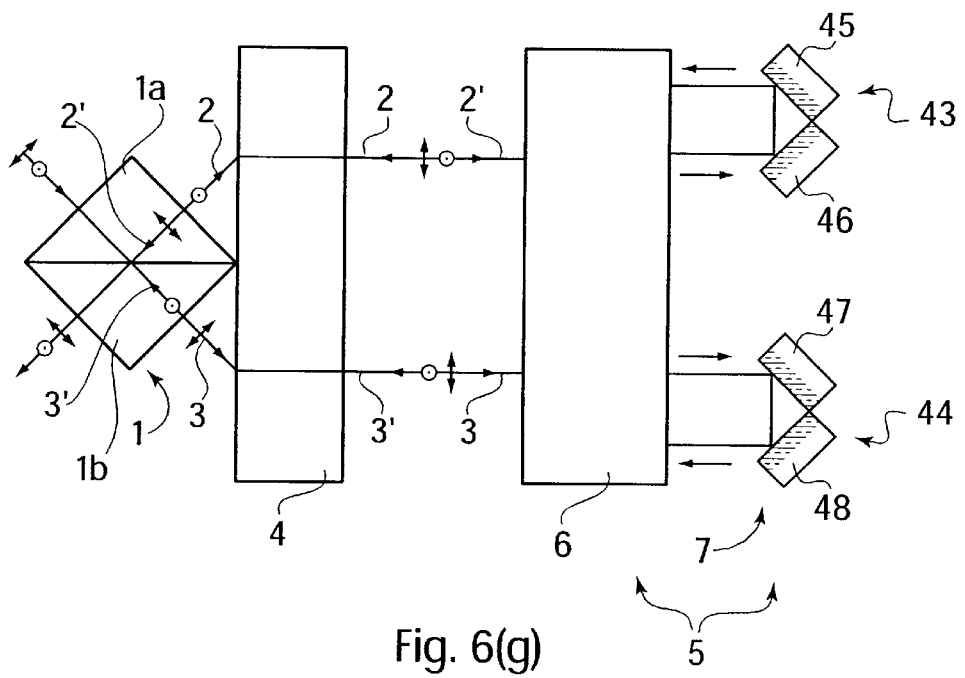
FIG. 6(g) shows a seventh exemplary embodiment for the second reflecting device in a solely schematic representation of the electro-optical element and of the first reflecting device for one channel.
Figure 6H:
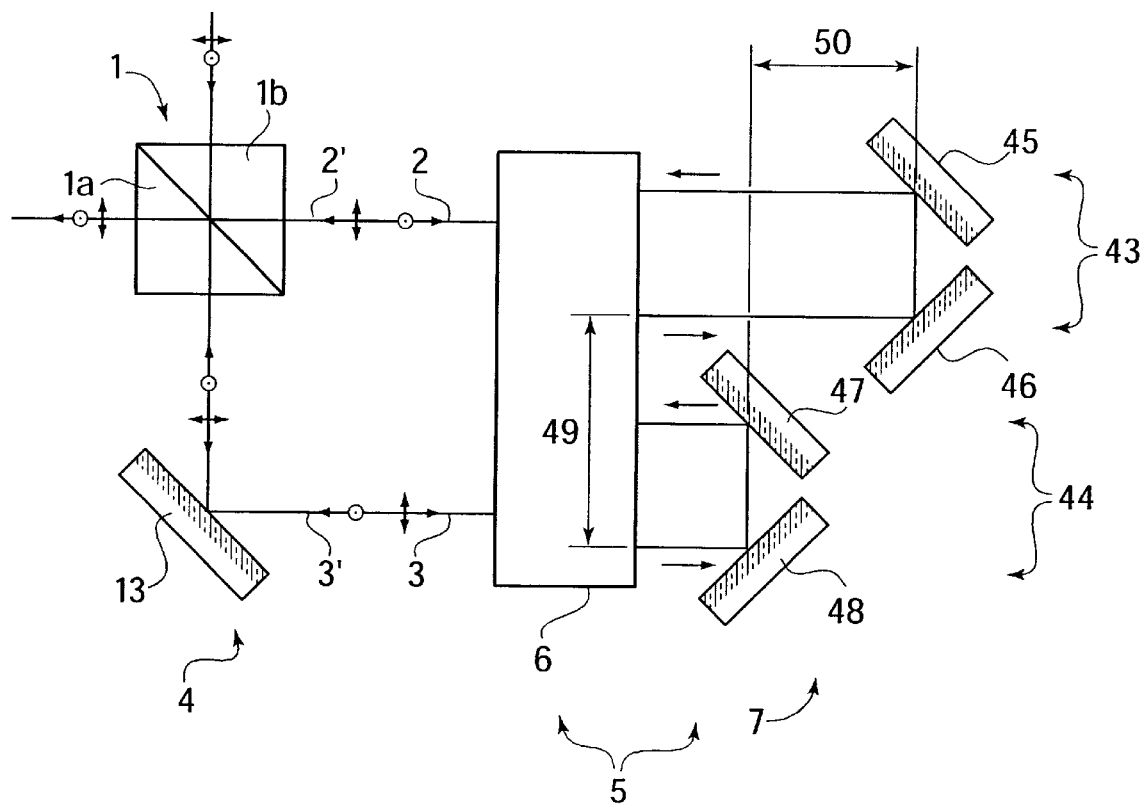
FIG. 6(h) shows an eighth exemplary embodiment for the second reflecting device in a solely schematic representation of the electro-optical element and of the first reflecting device for one channel.
Figure 6I:
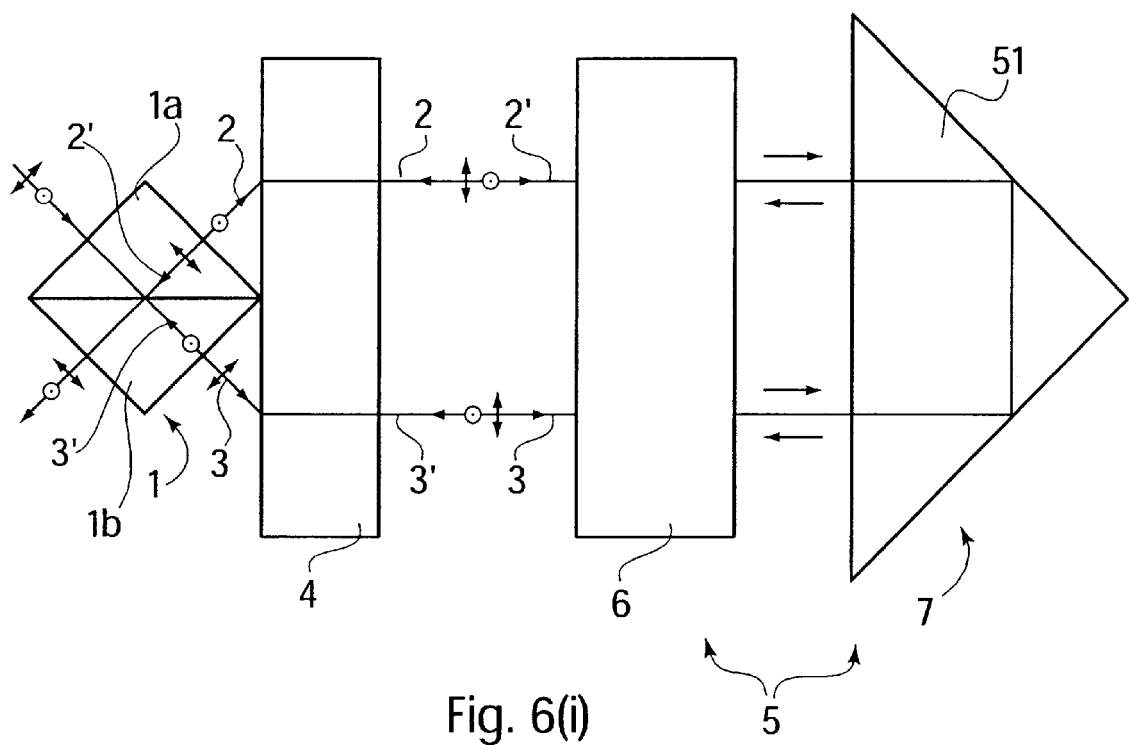
FIG. 6(i) shows a ninth exemplary embodiment for the second reflecting device in a solely schematic representation of the electro-optical element and of the first reflecting device for one channel.
Figure 6J:
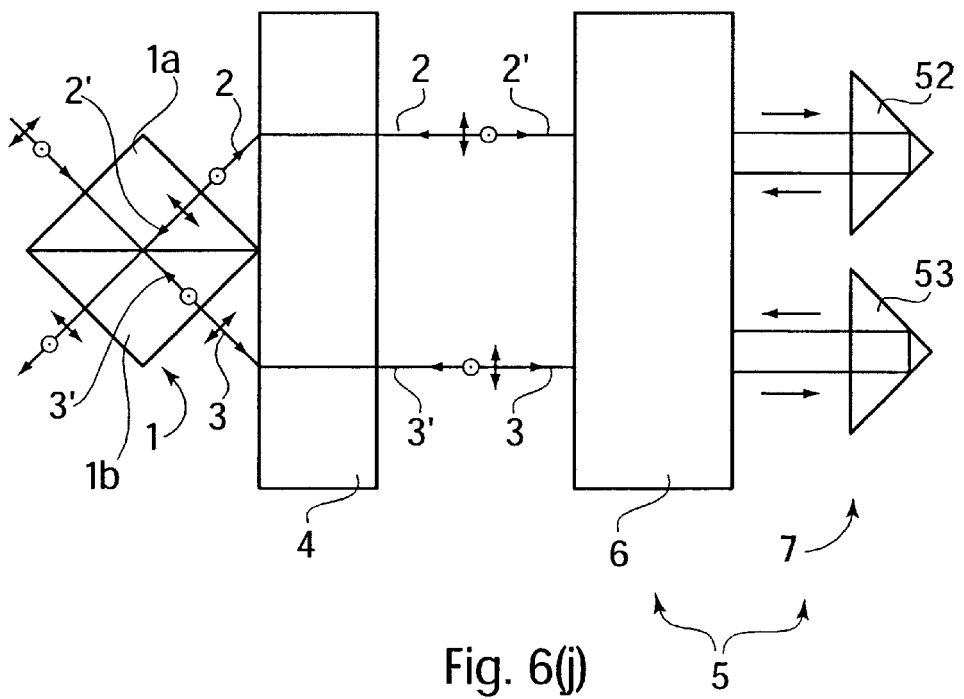
FIG. 6(j) shows a tenth exemplary embodiment for the second reflecting device in a solely schematic representation of the electro-optical element and of the first reflecting device for one channel.
Figure 6K:
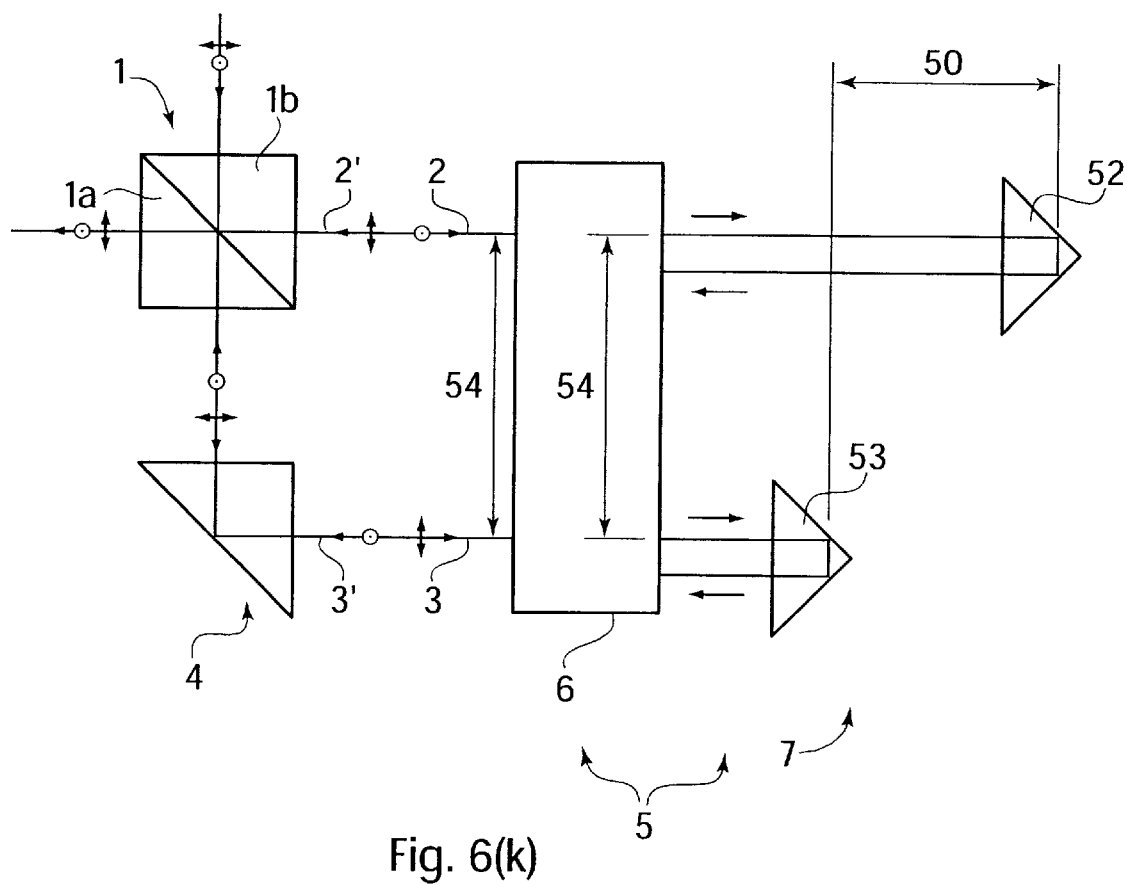
FIG. 6(k) shows an eleventh exemplary embodiment for the second reflecting device in a solely schematic representation of the electro-optical element and of the first reflecting device for one channel.
Figure 6L:
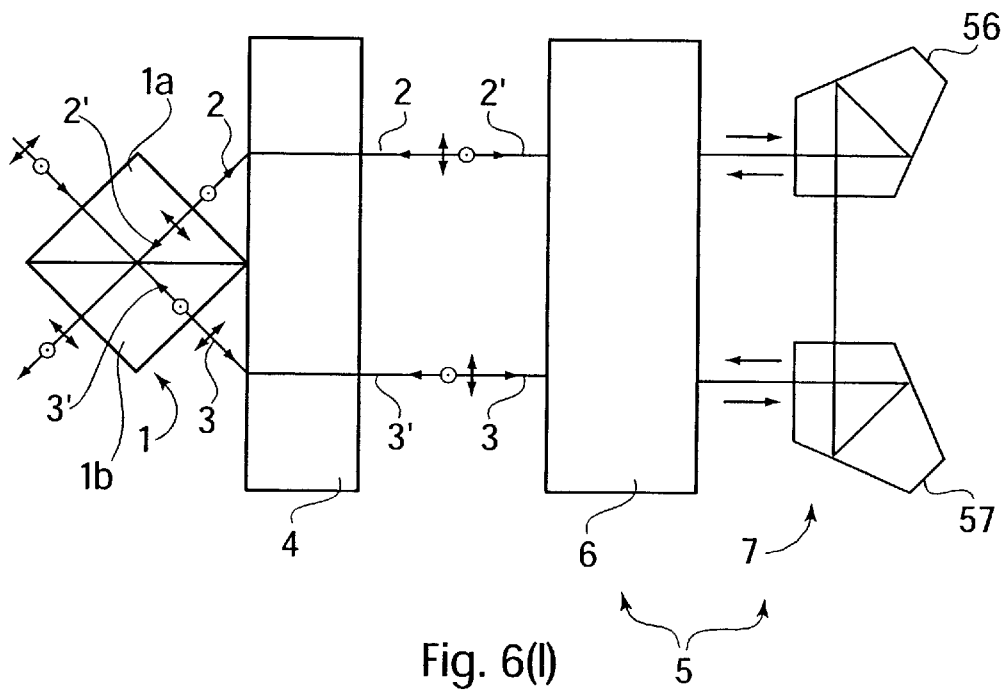
FIG. 6(l) shows a twelvth exemplary embodiment for the second reflecting device in a solely schematic representation of the electro-optical element and of the first reflecting device for one channel.
Figure 6M:
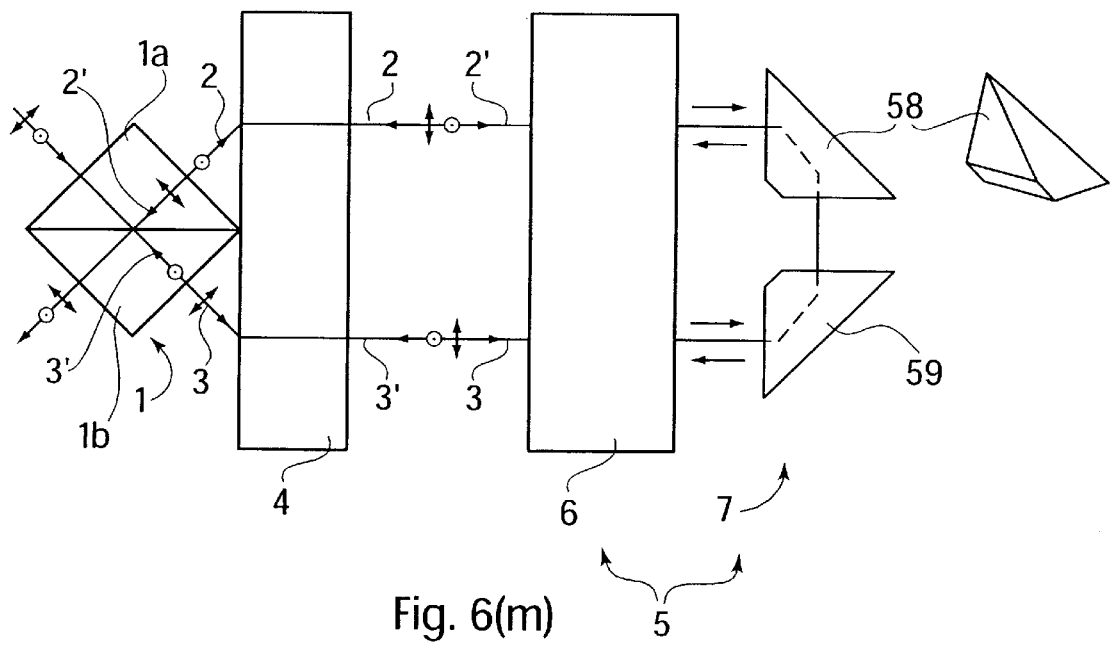
FIG. 6(m) shows a thirteenth exemplary embodiment for the second reflecting device in a solely schematic representation of the electro-optical element and of the first reflecting device for one channel.
Figure 6N:
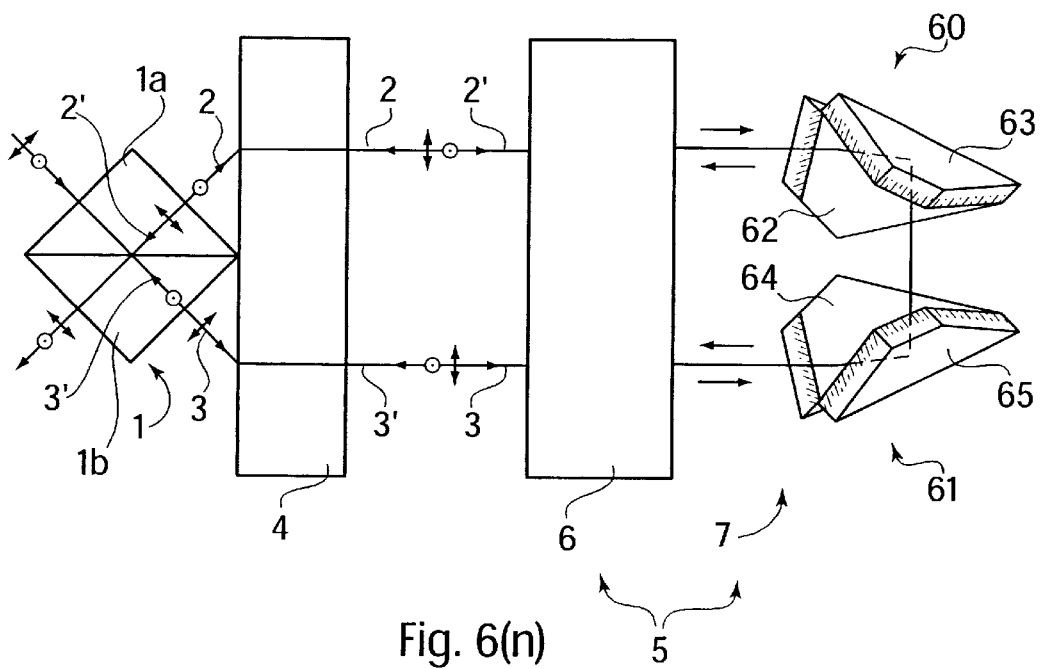
FIG. 6(n) shows a fourteenth exemplary embodiment for the second reflecting device in a solely schematic representation of the electro-optical element and of the first reflecting device for one channel.
Figure 6O:
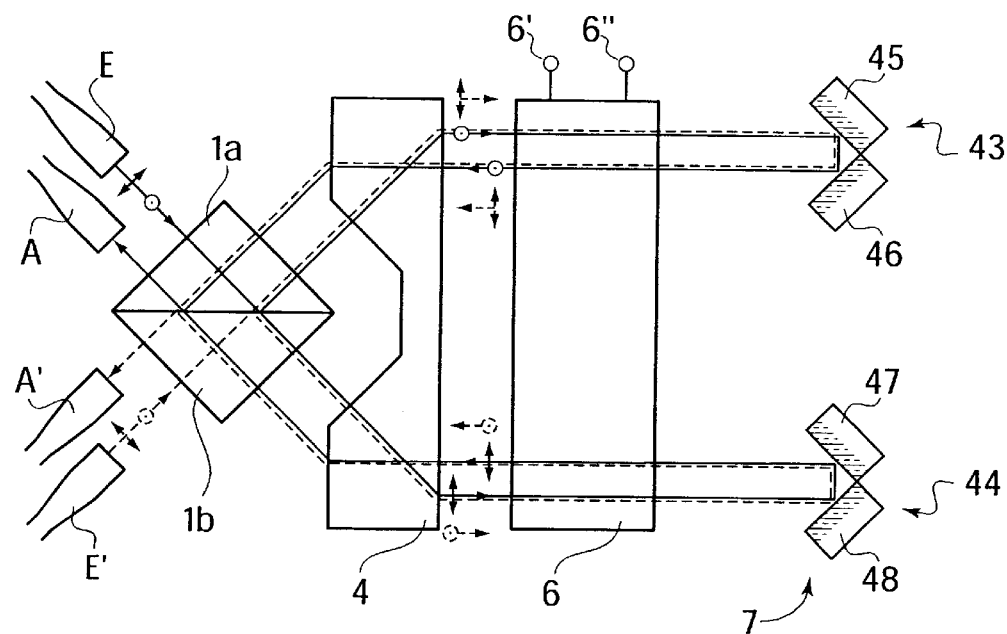
FIG. 6(o) shows a first exemplary embodiment for the second reflecting device in a solely schematic representation of the first reflecting device and of the electro-optical element for two channels.
Figure 6P:
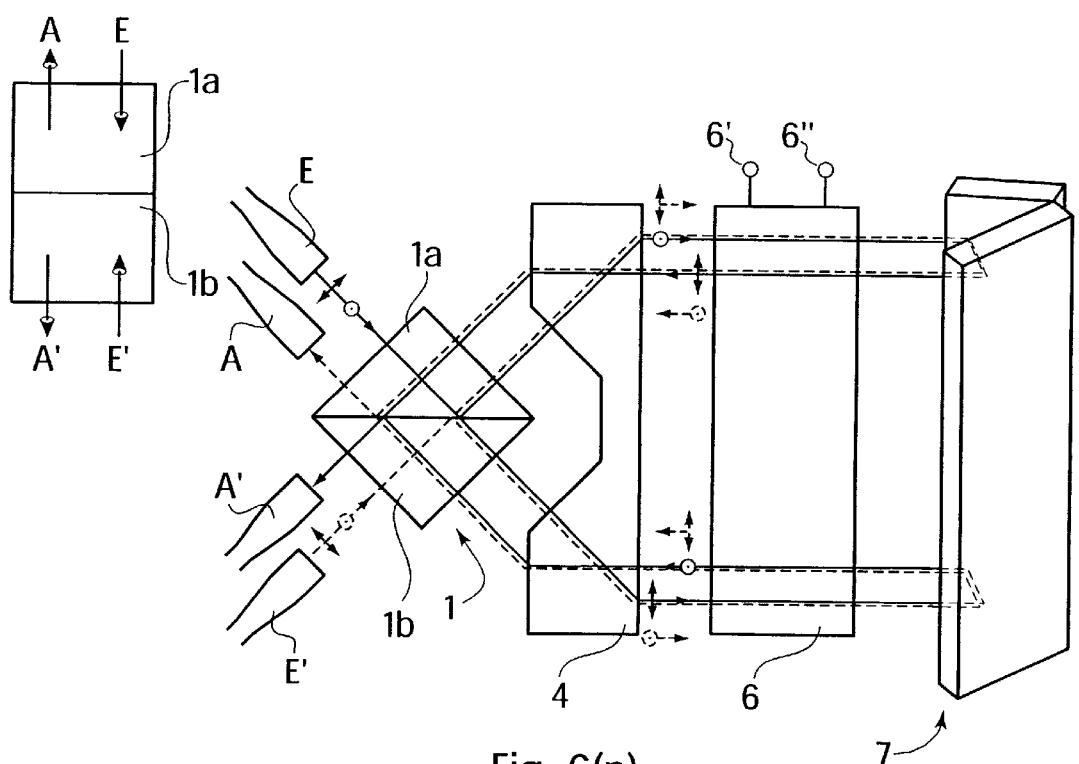
FIG. 6(p) shows a second exemplary embodiment for the second reflecting device in a solely schematic representation of the first reflecting device and of the electro-optical element for two channels.
Figure 6Q:
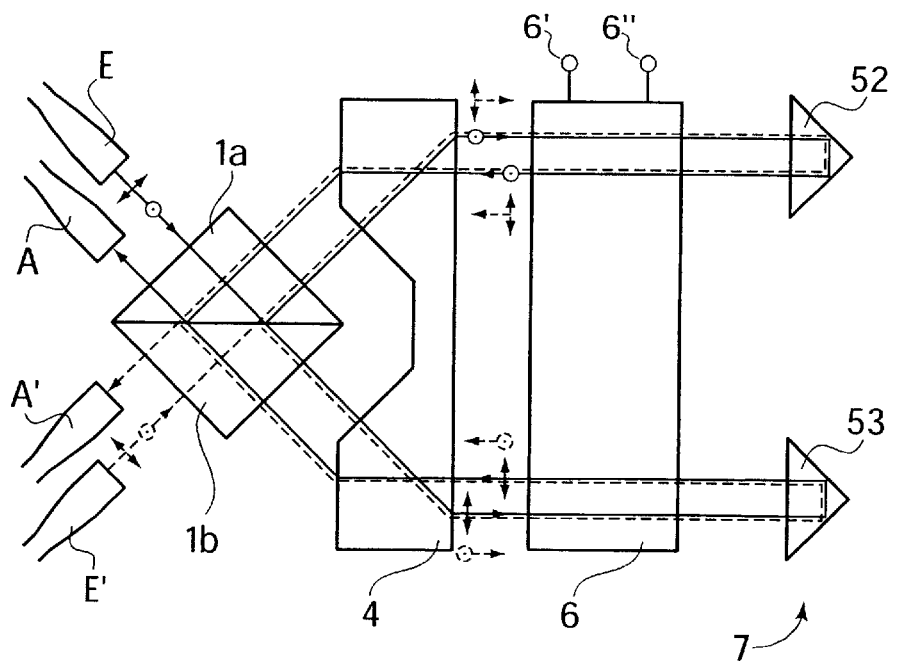
FIG. 6(q) shows a third exemplary embodiment for the second reflecting device in a solely schematic representation of the first reflecting device and of the electro-optical element for two channels.
Figure 6R:
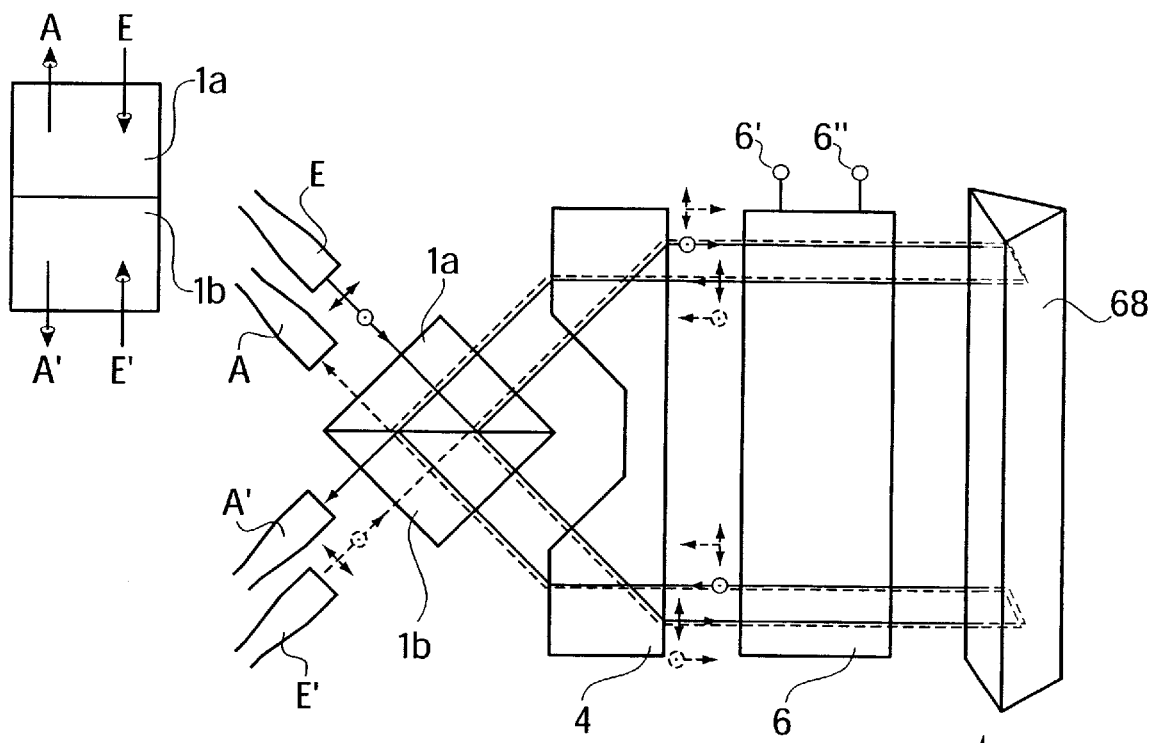
FIG. 6(r) shows a fourth exemplary embodiment for the second reflecting device in a solely schematic representation of the first reflecting device and of the electro-optical element for two channels.
Figure 6S:
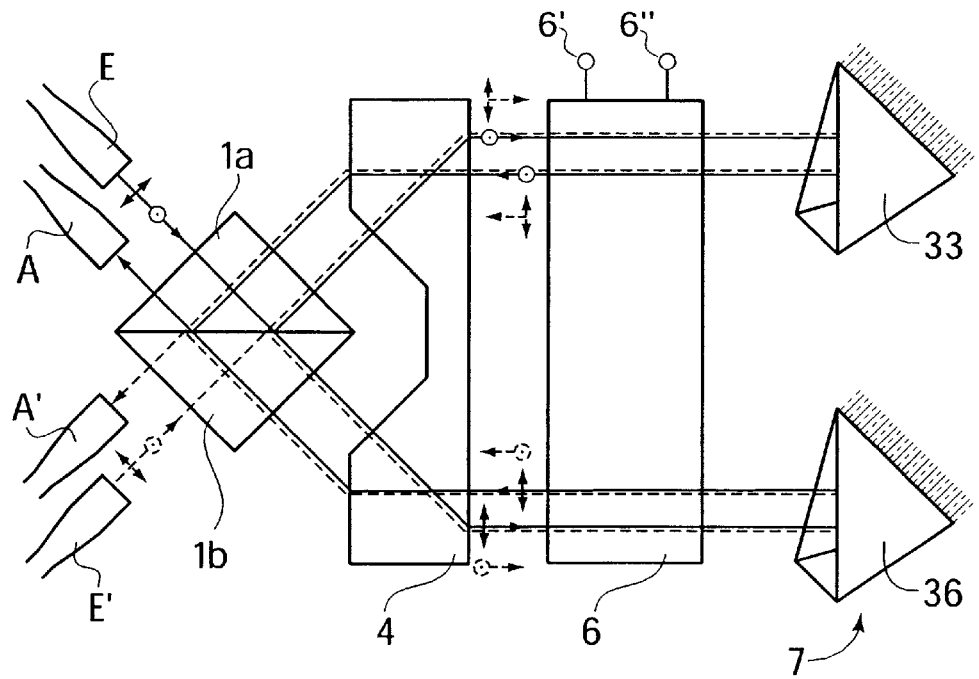
FIG. 6(s) shows a fifth exemplary embodiment for the second reflecting device in a solely schematic representation of the first reflecting device and of the electro-optical element for two channels.
Figure 6T:
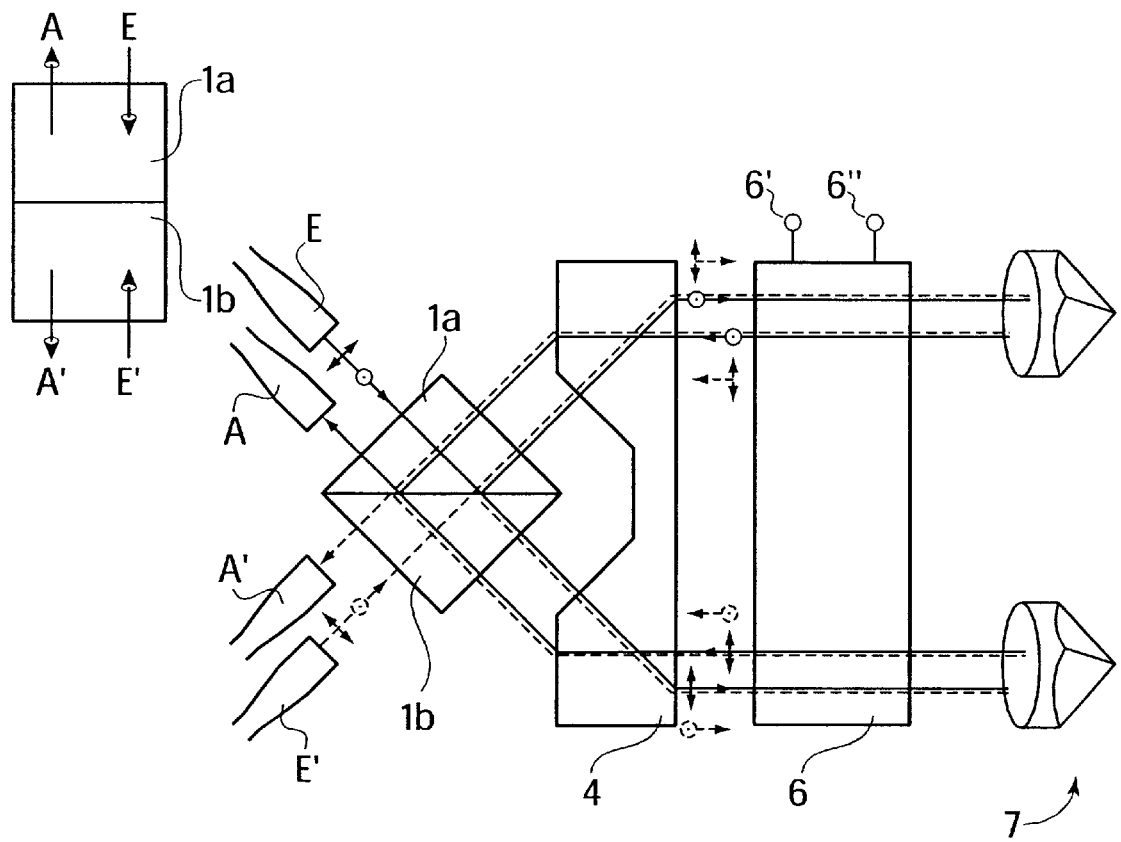
FIG. 6(t) shows a sixth exemplary embodiment for the second reflecting device in a solely schematic representation of the first reflecting device and of the electro-optical element for two channels.
Figure 6U:
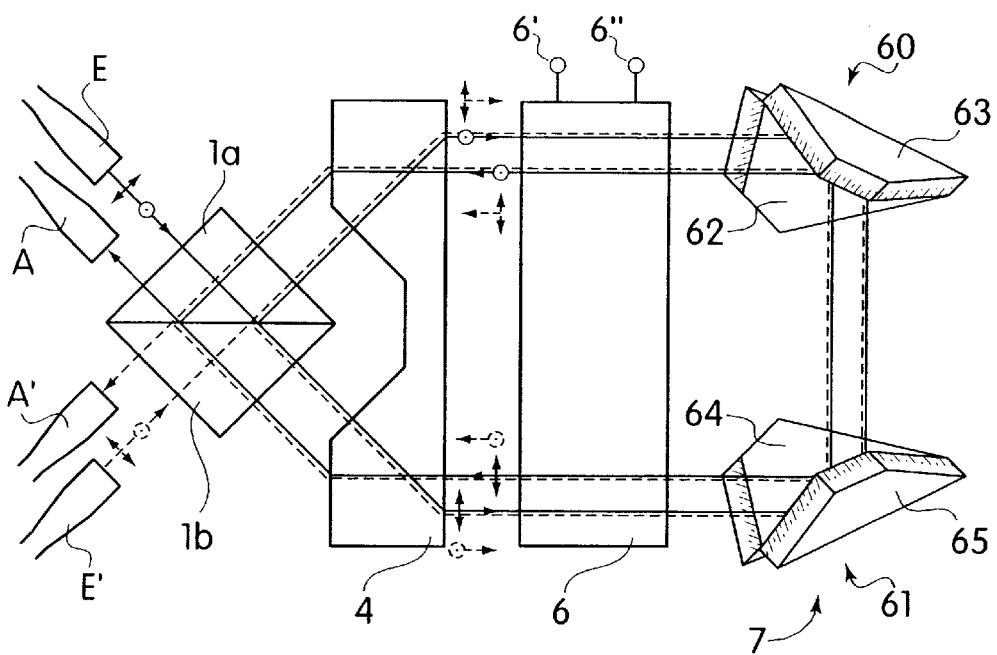
FIG. 6(u) shows a seventh exemplary embodiment for the second reflecting device in a solely schematic representation of the first reflecting device and of the electro-optical element for two channels.
Figure 6V:
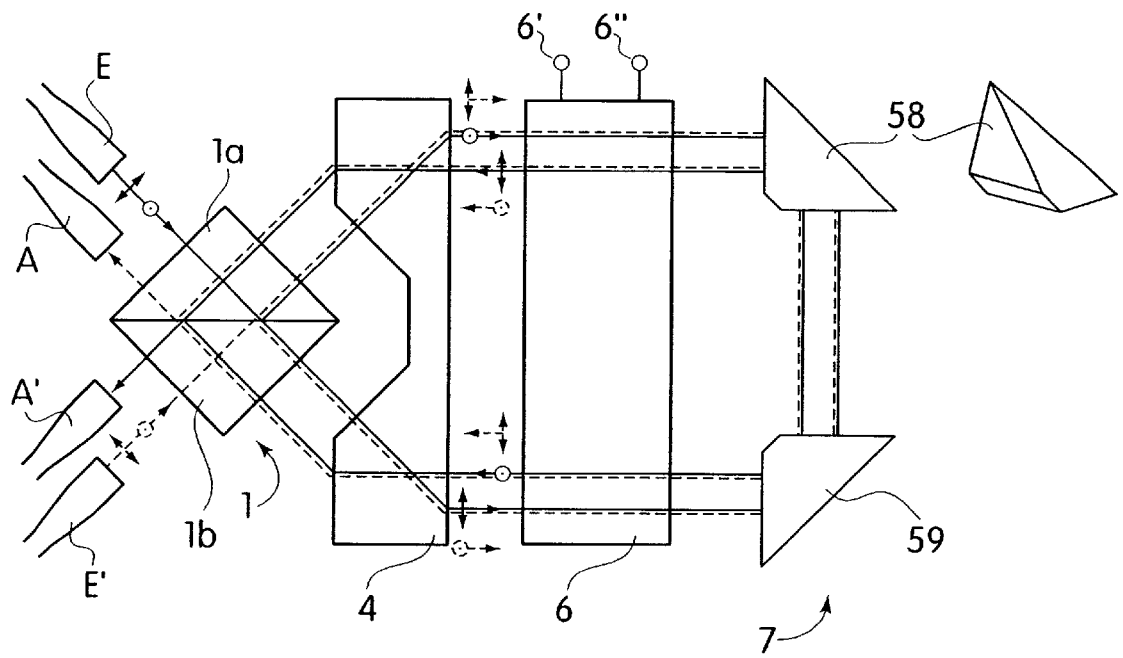
FIG. 6(v) shows an eighth exemplary embodiment for the second reflecting device in a solely schematic representation of the first reflecting device and of the electro-optical element for two channels.
Figure 6W:
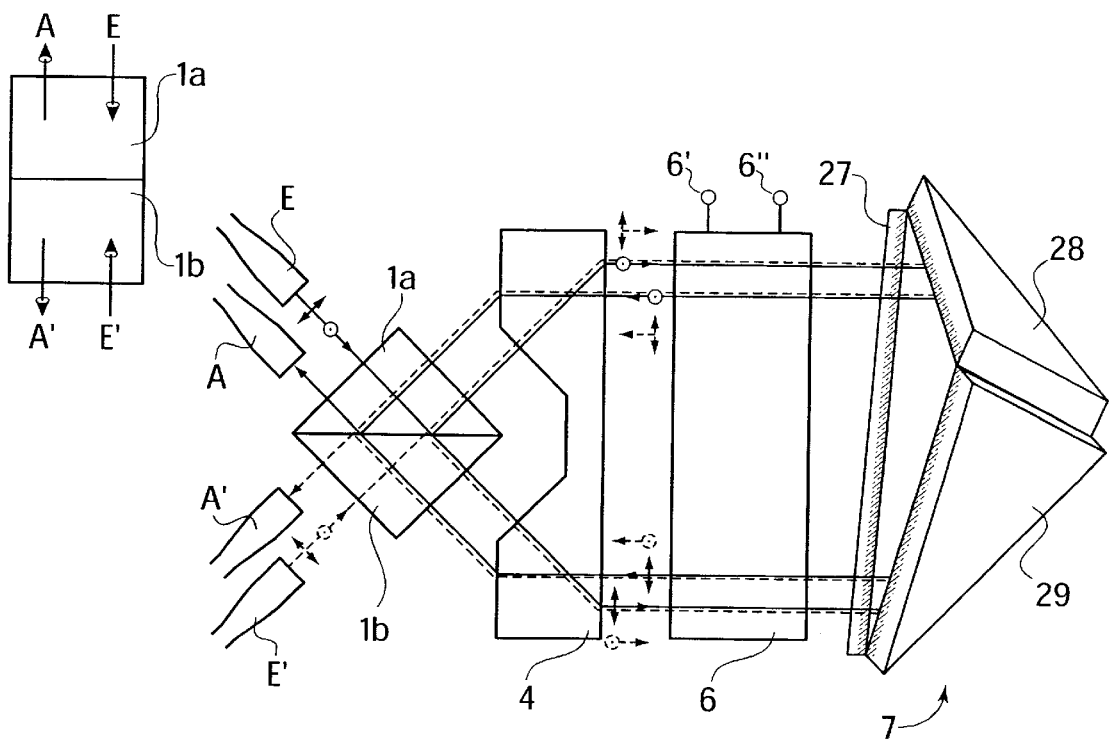
FIG. 6(w) shows a ninth exemplary embodiment for the second reflecting device in a solely schematic representation of the first reflecting device and of the electro-optical element for two channels.
Figure 6X:
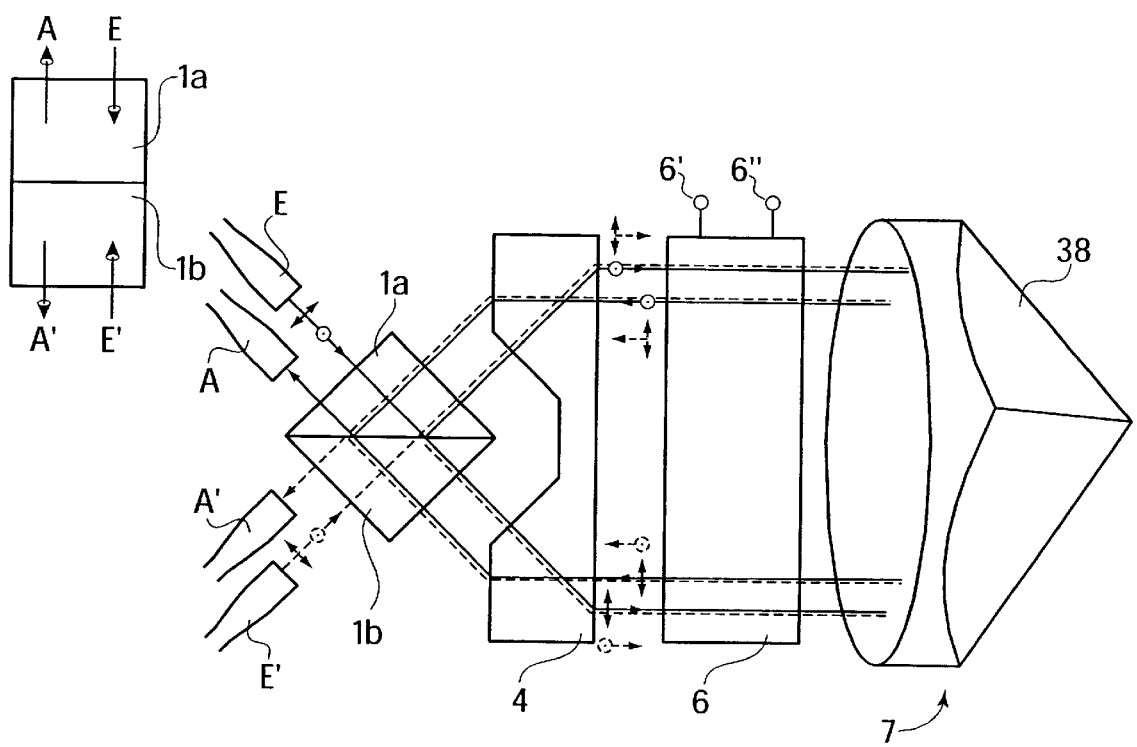
FIG. 6(x) shows a tenth exemplary embodiment for the second reflecting device in a solely schematic representation of the first reflecting device and of the electro-optical element for two channels.
Figure 6Y:
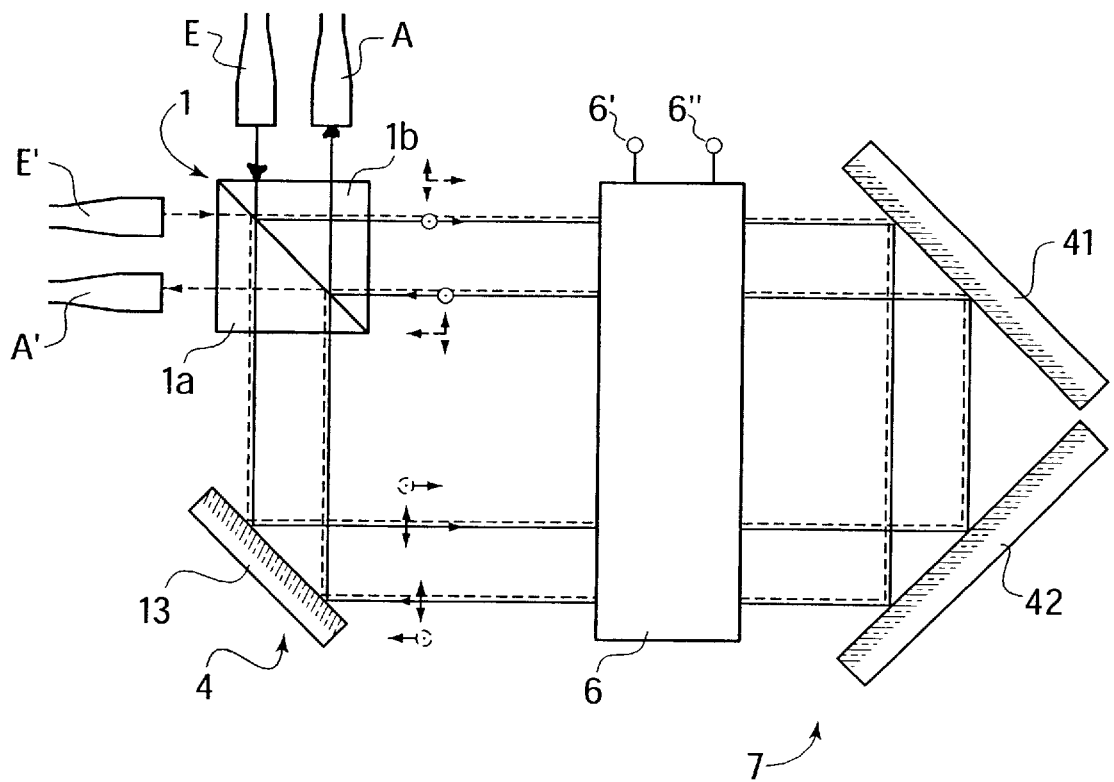
FIG. 6(y) shows an eleventh exemplary embodiment for the second reflecting device in a solely schematic representation of the first reflecting device and of the electro-optical element for two channels.
Figure 6Z:
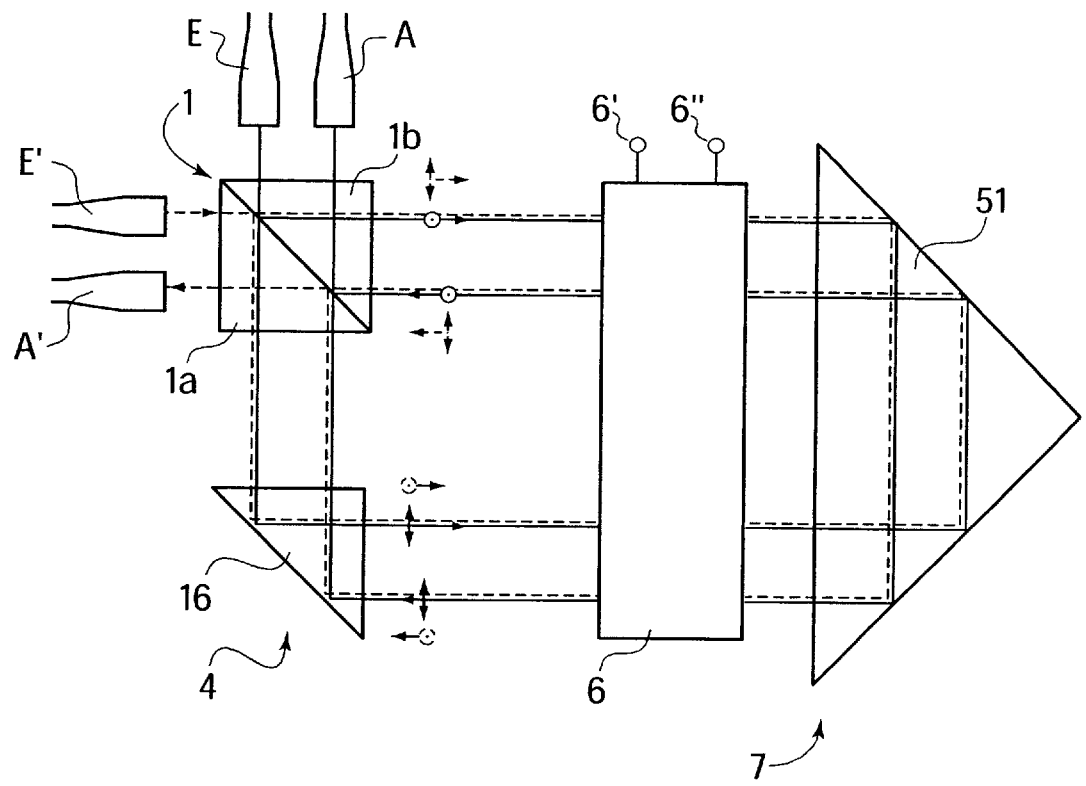
FIG. 6(z) shows a twelfth exemplary embodiment for the second reflecting device in a solely schematic representation of the first reflecting device and of the electro-optical element for two channels.
Figure 6:
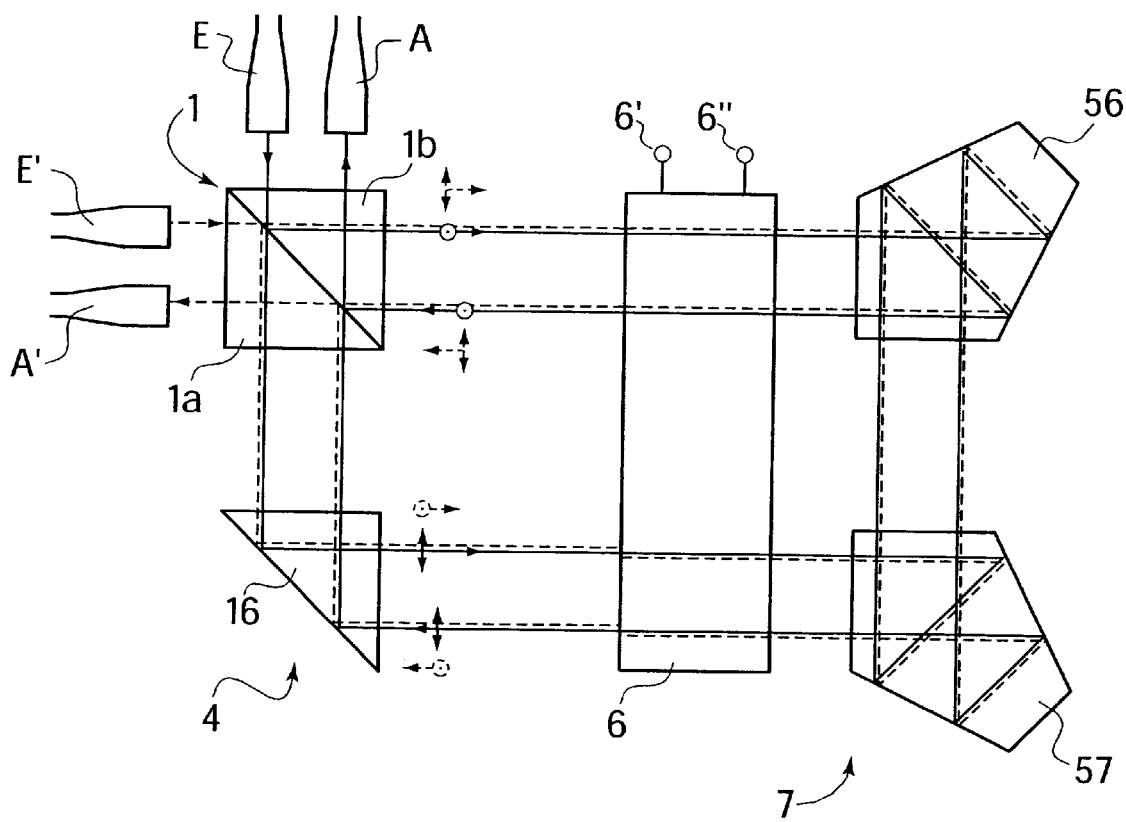
FIG. 6(za) shows a thirteenth exemplary embodiment for the second reflecting device in a solely schematic representation of the first reflecting device and of the electro-optical element for two channels.
Figure 7A:
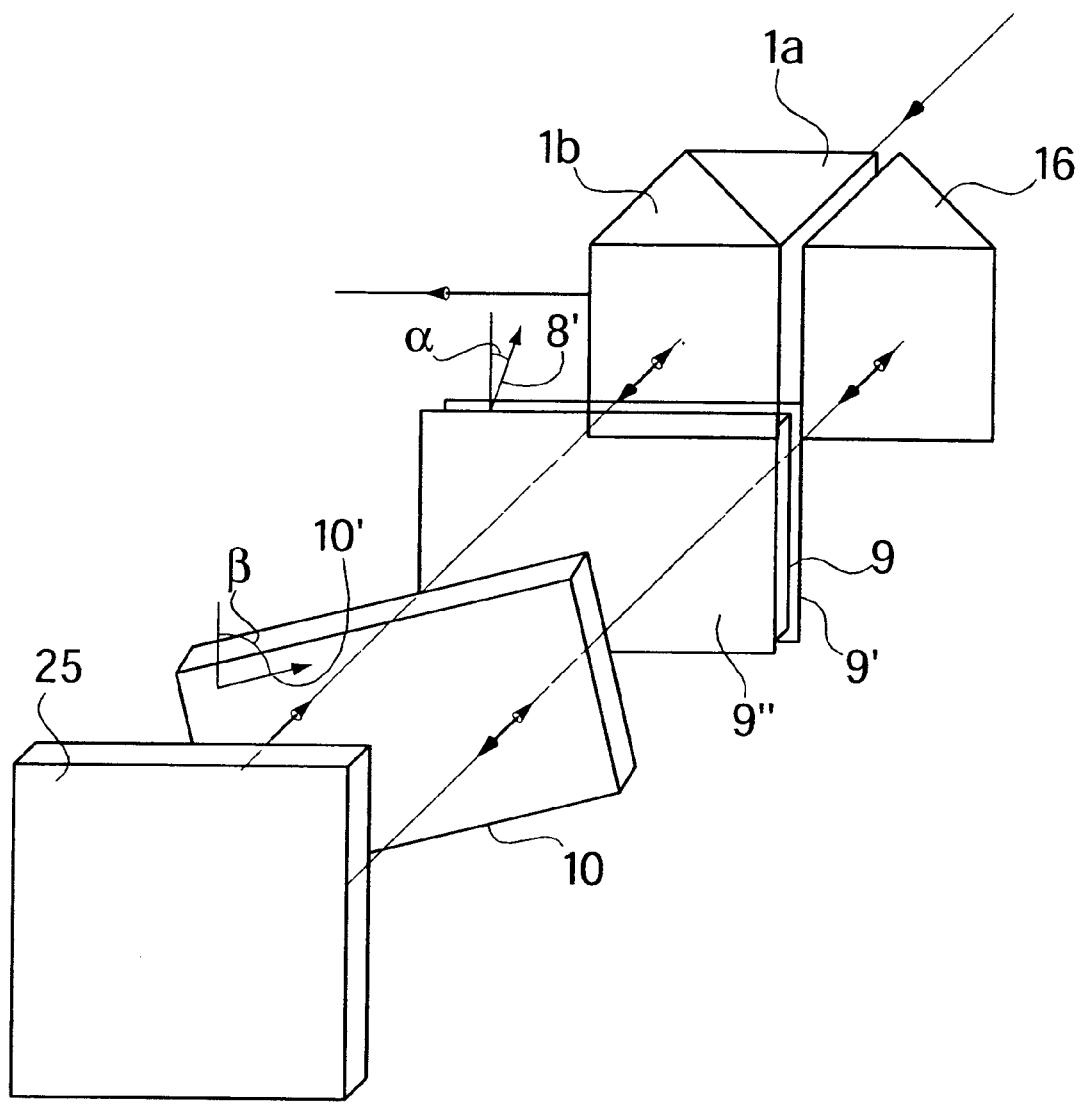
FIG. 7(a) shows a first exemplary embodiment in a perspective representation.
Figure 7B:
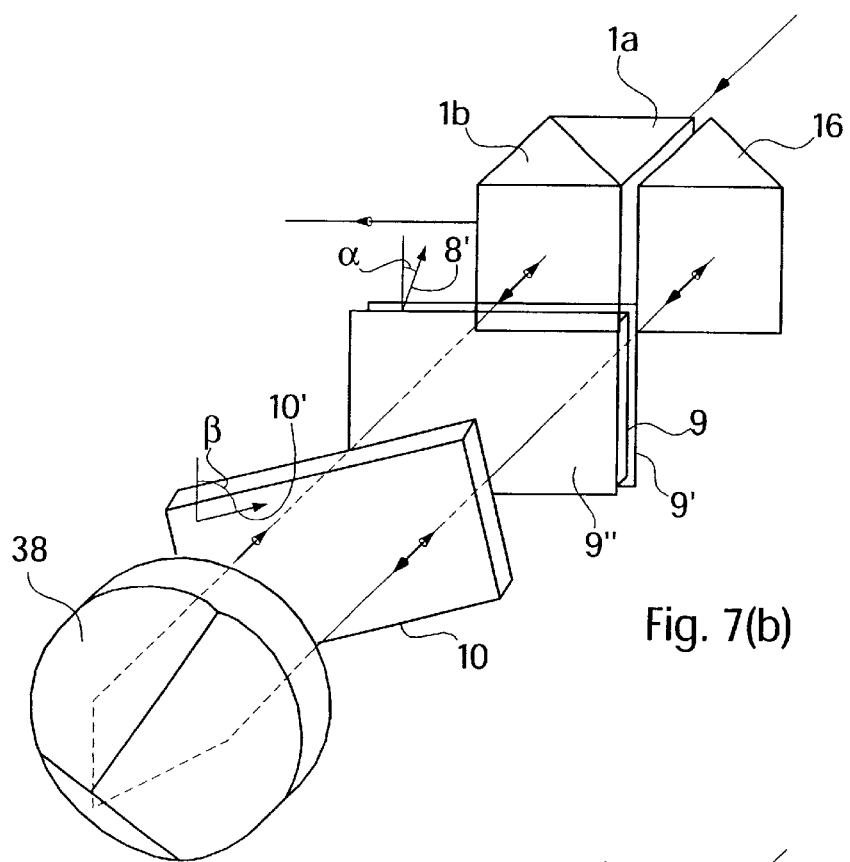
FIG. 7(b) shows a second exemplary embodiment in a perspective representation.
Figure 7C:
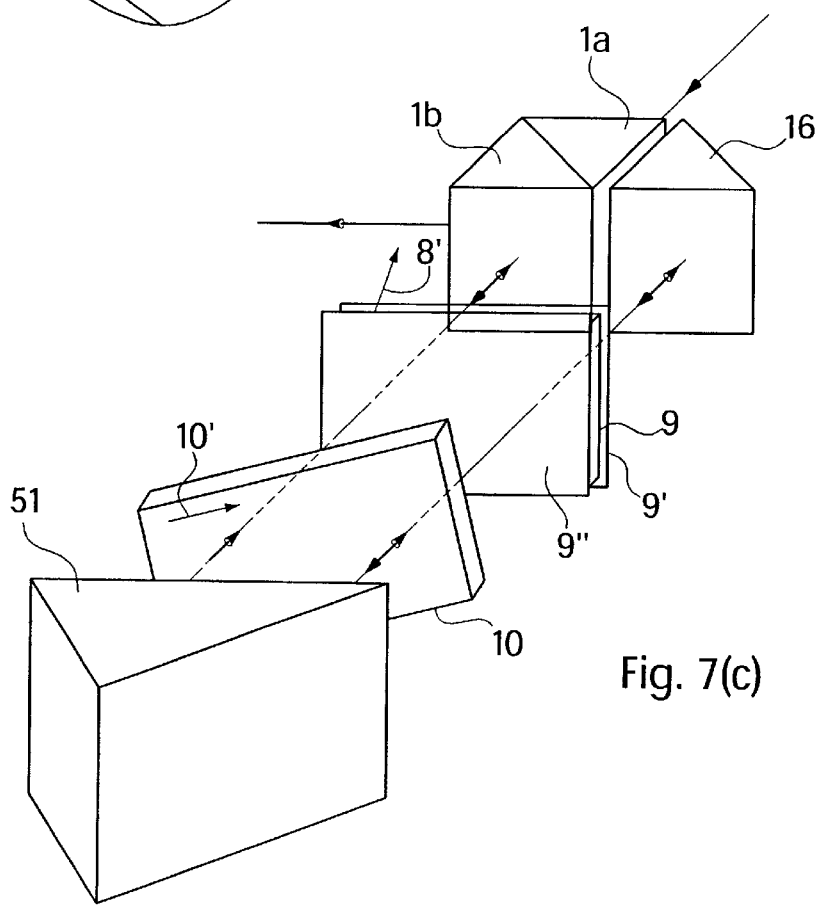
FIG. 7(c) shows a third exemplary embodiment in a perspective representation.
Figure 7D:
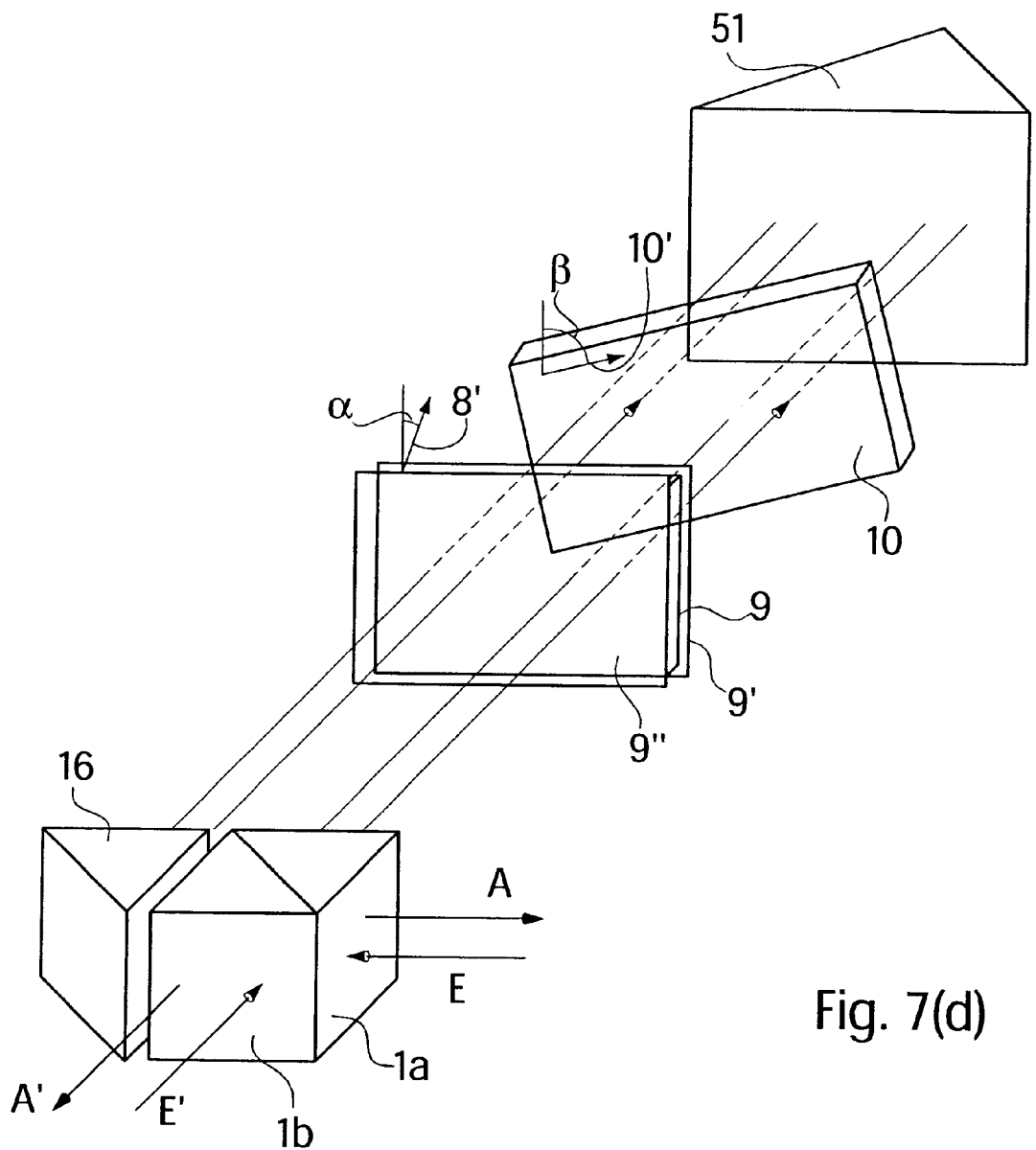
FIG. 7(d) shows a fourth exemplary embodiment in a perspective representation.

The SSFLC-effect (surface stabilized ferroelectric liquid crystals) can be used for two different angles of inclination in chiral, smectic, and ferroelectric phases of the liquid crystal. The FLC material having the angle of inclination 22.50 can be used without a delay plate in the specific embodiments according to FIGS. 6(a) through 6(e). Thickness d of the liquid crystal for both polarities of the voltage applied satisfies the condition δn·d=lambda/4+N·lambda. The orientation of the normal of the smectic positions (direction of friction) is to have an angle of +22.5° or −22.5° with respect to the polarization direction of the s- or p-light bundle 2, 3. For the one field polarity, light emerges from the output face, for the other field polarity it does not. For the exemplary embodiments in FIGS. 6(a) and 7(a), the polarity has a reversed sign in comparison to FIGS. 6(b) through 6(e) and 7(b).

For the exemplary embodiments according to FIGS. 6(f) through 6(n), 7(c), 8(c/d), and 8(e/f), the optical properties of the liquid crystal are different than in the case described above. The FLC positions are to have a delay of (⅜) lambda+N·lambda. The value of the switching angle is only 11.25°. The normal for the smectic position of the FLC material is to have the angle+11.25° or −11.25° or+33.75° or−33.75° with respect to the p-polarization direction of light bundle β. The arrangements of this type can be used for switching times between 10 μs and 20 μs and voltages between 20 volts and 30 volts.

The electroclinic effect and the DHF effect (deformed helix ferroelectrics) are used in arrangements according to the present invention for the optical modulation using intermediate values.

For the exemplary embodiments according to FIGS. 6(a) through 6(e), 7(a), and 7(b), the orientation of the normal of the smectic positions is to form an angle of +45° or −45° with the s- or p-polarization plane. The thickness of the liquid crystal layer is to permit the delay lambda/4+ N·lambda. The light intensity permitted to pass through from face 1a to face 1b of the polarizing beam splitter continually varies from 0% to 100%, if the electrically induced angle of inclination of the slow axis of the indicator varies between 0° and 45°. For the case in which the DHF effect is used, the necessary axis tilt is +/−22.5°, which can be achieved using a few volts of control voltage. The switching time, in this context, is roughly 100 μs. Appropriate liquid crystal cells are described, for example, in: L. A. Beresnev et al: "Deformed Helical Ferroelectric Liquid Crystal Display: a New Electro-optical Mode in Ferro Electrical Liquid Crystals," Liquid Crystals, Volume 5, p. 1171–1179 (1989) and in L. A. Beresnev et al: "Ferroelectric Liquid Crystal Displays," Swiss Patent 3722/87.

In the exemplary embodiments according to FIGS. 6(f) through 6(n), 7(c), 8(c/d), 8(e/f), the angle of inclination of slow axis 8' is only 11.25° in the electrical field. For this purpose, a very rapid electroclinic material having switching times of a few μs is used, as is made known, for example, in U.S. Pat. No. 4,838,663. These exemplary embodiments permit a continual modulation of non-polarized light between 0% and 100% at a control voltage in the range of +/−30 volts.

An advantageous arrangement according to the present invention includes a ferroelectric liquid crystal cell and a lambda/4-plate, which is depicted in FIGS. 4(b), 7(a) through 7(c), 8(c/d), and 8(e/f). In this context, there is an abundance of possibilities to for realizing the orientation of slow axis 8' of liquid crystal layer 8 and of the rapid axis 10' of delay plate 10 around the off- and on-state of the arrangement. This is depicted in FIG. 8(e/f).

In the on-state, polarization directions of light bundles 2, 3 are oriented parallel or perpendicular to the slow axis of the liquid crystal and of delay plate 10. As a result, the light is not changed with respect to its polarization state either in the liquid crystal cell or in the delay plate. Second reflecting device 7 also does not alter the polarization state, so that the light of both polarization directions reaches output face 1b of polarizing beam splitter 1.

In the off-state, the director (indicator orientation) of liquid crystal 9 tilts 22.5° as a result of the effect of the electrical field. Since the delay in the liquid crystal is equal to lambda/2, the liquid crystal cell rotates the polarization direction 2·22.5°=45°. After lambda/4 plate 10, light that is circularly polarized is obtained, which is reflected by second reflecting device 7 so as to be circularly polarized, the direction of rotation being reversed. After the second passage through lambda/4 plate 10, light is obtained that is polarized in light bundle 2''' or 3''' in a linear fashion, and that is polarized (−45°) after the first passage through the liquid crystal cell so as to be orthogonal with respect to the light of light bundles 2'' and 3'. These light bundles are rotated in the second passage through the liquid crystal cell by 2·(45°+22.5°)=(90°+45°) and thus achieve the respective orthogonal orientation 2', 3' of the polarization. Polarizing beam splitter 1 unites the light bundles in face 1b.

In the cases of the electroclinic effect and of the DHF effect, the electrically controlled permeability of the arrangement according to present invention between faces 1a and 1b of polarizing beam splitter 1 for non-polarized light between the values 0% and nearly 100% can continually be changed. Applications include rapid optical limiters or the rapid automatic control of light intensities. In this context, light detectors may be located at the output of the arrangement which exercise a control function on the electrodes of the liquid crystal cell through electrical feedback. Applications, by way of example, are described in Swiss Patent No. 888 102 583 and European Published Patent Application No. 0 335 056, as well as in M. Eve et al: "New Automatic-gain-control System Optical Receivers," Electronics Letter 15, pp. 146–147 (1979).

The electrically adjustable angles of inclination can be halved in the arrangement according to the present invention if two liquid crystal cells are arranged behind one another. In the electroclinic effect, the extremely small angle of inclination of +/−5.6250 is required in order to switch light through at switching times of 1 μs and working voltages of +/−10 V. Rapid electroclinic liquid crystal materials having switching times of 1 μs and, among them in low working voltages, are composed of mixtures of a lamellar matrix, for example of a smectic A- or C-phase and chiral doping molecules having an angle of inclination of Θm, and they are known, for example, from German Published Patent Application 196 24 769. Experiments have shown that time constants of 100 ns at control voltage is of 10 volts to 20 volts at room temperatures can be achieved. FIG. 9(c) indicates intensity I of the controlled light arriving at outputs A, A' as a function of the control voltage. The curves were included in an arrangement according to FIG. 7(d). In the upper diagram, the light comes from input E and in the lower diagram from input E'. It is clear that a complete switchover between outputs A and A' takes place using the liquid crystal cell FLC-392 used here at a voltage differential of roughly 60 V.

What is claimed is:

1. An arrangement for achieving an electrical control of an intensity of a non-polarized light, comprising:
   a beam splitter for splitting a supplied light into a plurality of polarized light bundles that are orthogonal with respect to each other;
   a downstream first reflecting device for parallelizing each one of the plurality of polarized light bundles;
   a plurality of transparent electrodes;
   a plurality of electrically controllable liquid crystal cells that are connected behind one another, wherein:
      the plurality of electrically controllable liquid crystal cells are embedded
   between the plurality of transparent electrodes, and
      the plurality of electrically controllable liquid crystal cells alter a polarization of the plurality of polarized light bundles as a function of a control voltage that is applied to the plurality of transparent electrodes; and
   at least one downstream second reflecting device arranged to reflect the plurality of polarized light bundles in an opposite direction such that the plurality of polarized light bundles pass through the plurality of electrically controllable liquid crystal cells a second time and subsequently are at least partially reunited by the first reflecting device and the beam splitter depending on the polarization and are fed to at least one output location where the electrically controlled light can be extracted.

2. The arrangement according to claim 1, wherein, with respect to the beam splitter, a last one of the plurality of transparent electrodes of the plurality of electrically controllable liquid crystal cells, in a formation of the at least one second reflecting device, exhibits one of a reflecting characteristic and a reflecting coating.

3. The arrangement according to claim 1, further comprising:

a phase delay plate having an optically effective thickness of one quarter of an average wavelength of the light to be controlled and being arranged in a path of the parallelized plurality of polarized light bundles.

4. The arrangement according to claim 1, wherein:

the first reflecting device is configured so as to reduce a design length of the arrangement such that the plurality of polarized light bundles run perpendicular to a plane created by at least one of the plurality of polarized light bundles to be controlled and another one of the plurality of polarized light bundles that is controlled.

5. The arrangement according to claim 1, wherein:

the plurality of electrically controllable liquid crystal cells include nematic liquid crystals having a positive dielectrical anisotropy, a thickness d of each of the nematic liquid crystals satisfies one of the conditions of δn·d=lambda/4+N·lambda, δn·d=⅜·lambda+N·lambda, and δn·d=lambda/2+N·lambda, and N is a whole number and δn is a birefringence of the nematic liquid crystals.

6. The arrangement according to claim 1, wherein:

the plurality of electrically controllable liquid crystal cells include ferroelectric liquid crystals, a thickness d of each one of the ferroelectric liquid crystals satisfies one of the conditions of δn·d=lambda/4+N·lambda, δn·d=⅜ lambda+N·lambda, and δn·d=lambda/2+N·lambda, and N is a whole number and on is a birefringence of the ferroelectric liquid crystals.

7. The arrangement according to claim 1, further comprising:

a plurality of electro-optical elements arranged behind one another in a path of the parallelized plurality of polarized light bundles.

8. The arrangement according to claim 7, wherein:

the plurality of electro-optical elements include a ferroelectric liquid crystal.

9. The arrangement according to claim 8, wherein:

a thickness d of the ferroelectric liquid crystal satisfies the condition δn·d=lambda/4+N lambda.

10. The arrangement according to claim 8, wherein:

a thickness d of the ferroelectric liquid crystal satisfies the condition δn·d=(⅜) lambda+(N·lambda).

11. The arrangement according to claim 8, wherein:

a thickness d of the ferroelectric liquid crystal satisfies the condition δn·d=(lambda/2)+(N·lambda).

12. The arrangement according to claim 1, wherein:

the first reflecting device includes a mirror.

13. The arrangement according to claim 12, wherein:

the mirror corresponds to a dielectrical mirror.

14. The arrangement according to claim 1, wherein:

the first reflecting device is a hollow ridge prism.

15. The arrangement according to claim 1, wherein:

the first reflecting device is a massive ridge prism.

16. The arrangement according to claim 15, wherein:

the massive ridge prism includes a reflecting surface on which is arranged a metal mirror.

17. The arrangement according to claim 1, wherein:

the first reflecting device includes a plurality of mirrors.

18. The arrangement according to claim 17, wherein:

the first reflecting device includes another plurality of mirrors arranged such that the plurality of polarized light bundles run perpendicular to a plane formed by at least one of the plurality of polarized light bundles to be controlled and another one of the plurality of polarized light bundles that is controlled.

19. The arrangement according to claim 1, wherein:

the first reflecting device includes a 90° prism.

20. The arrangement according to claim 19, wherein:

the first reflecting device includes a plurality of other 90° prisms arranged such that the plurality of polarized light bundles run perpendicular to a plane formed by at least one of the plurality of polarized light bundles to be controlled and another one of the plurality of polarized light bundles that is controlled.

21. The arrangement according to claim 20, wherein:

the beam splitter and at least one of the 90° prisms and the plurality of other 90° prisms form one unit.

22. The arrangement according to claim 1, wherein:

the first reflecting device includes a plurality of 90° prisms.

23. The arrangement according to claim 1, wherein:

the first reflecting device and the beam splitter include a first prism and a second prism separated from each other by a polarizing layer.

24. The arrangement according to claim 1, wherein:

the first reflecting device includes a plurality of hollow ridge mirrors.

25. The arrangement according to claim 1, wherein:

the first reflecting device includes a plurality of hollow ridge prisms having total reflection.

26. The arrangement according to claim 1, wherein:

the first reflecting device includes a pentaprism.

27. The arrangement according to claim 1, wherein:

the first reflecting device includes a plurality of hollow ridge mirrors arranged such that the plurality of polarized light bundles run perpendicular to a plane formed by at least one of the plurality of polarized light bundles to be controlled and another one of the plurality of polarized light bundles that is controlled.

28. The arrangement according to claim 1, wherein:

the first reflecting device includes a plurality of hollow ridge prisms having total reflection, the plurality of hollow ridge prisms being arranged such that the plurality of polarized light bundles run perpendicular to a plane formed by at least one of the plurality of polarized light bundles to be controlled and another one of the plurality of polarized light bundles that is controlled.

29. The arrangement according to claim 1, wherein:

the first reflecting device includes a plurality of pentaprisms arranged such that the plurality of polarized light bundles run perpendicular to a plane formed by at least one of the plurality of polarized light bundles to be controlled and another one of the plurality of polarized light bundles that is controlled.

30. The arrangement according to claim 1, wherein:

the at least one second reflecting device includes a mirror.

31. The arrangement according to claim 30, wherein:

the mirror corresponds to a dielectrical mirror.

32. The arrangement according to claim 1, wherein:

the at least one second reflecting device includes a plurality of mirrors arranged as a hollow cube corner corresponding to a retroreflector.

33. The arrangement according to claim 1, wherein:

the at least one second reflecting device includes a plurality of mirrors arranged as a first hollow retroreflector and a second hollow retroreflector.

34. The arrangement according to claim 1, wherein:
the at least one second reflecting device includes a retroreflector formed of a massive prism.

35. The arrangement according to claim 1, wherein:
the at least one second reflecting device includes a plurality of cube-corner prisms.

36. The arrangement according to claim 1, wherein:
the at least one second reflecting device includes a plurality of mirrors forming an angle of 90°.

37. The arrangement according to claim 1, wherein:
the at least one second reflecting device includes a plurality of pairs of mirrors, each pair forming an angle of 90°.

38. The arrangement according to claim 1, wherein:
the at least one second reflecting device includes a 90° prism.

39. The arrangement according to claim 1, wherein:
the at least one second reflecting device includes a plurality of prisms.

40. The arrangement according to claim 1, wherein:
the at least one second reflecting device includes a plurality of pentaprisms.

41. The arrangement according to claim 1, wherein:
the at least one second reflecting device includes a plurality of ridge prisms.

42. The arrangement according to claim 1, wherein:
the at least one second reflecting device includes a plurality of mirrors that form a first hollow ridge reflector and a second hollow ridge reflector.

43. The arrangement according to claim 1, wherein:
the first reflecting device, one of the plurality of electrically controllable liquid crystal cells, and the at least one second reflecting device are arranged such that light that is controlled so as to be an inverse of light capable of being extracted from one face of the beam splitter, emerges on another face of the beam splitter so as to be offset with respect to the non-polarized light to be controlled.

44. The arrangement according to claim 1, wherein:
each of the light bundles of the plurality of polarized light bundles passing through on the same face of the beam splitter has a preselected distance from each other.

45. The arrangement according to claim 1, wherein:
a liquid crystal of the plurality of electrically controllable liquid crystal cells is present in a chiral, inclined phase.

46. The arrangement according to claim 1, wherein:
a liquid crystal of the plurality of electrically controllable liquid crystal cells is present in a chiral, smectic phase.

47. The arrangement according to claim 46, wherein:
the liquid crystal is present in a chiral, smectic A* phase.

48. The arrangement according to claim 1, wherein:
a liquid crystal of the plurality of electrically controllable liquid crystal cells is present in a helical, ferroelectric phase.

49. The arrangement according to claim 1, wherein:
a liquid crystal of the plurality of electrically controllable liquid crystal cells is present in a smectic, ferroelectric phase.

50. A method for achieving an electrical control of an intensity of a non-polarized light, comprising the steps of:
acting on a polarizing beam splitter by the non-polarized light to be controlled via a first face of the polarizing beam splitter such that the non-polarized light is split into a plurality of polarized light bundles that are orthogonal with respect to each other;
configuring a first reflecting device for a reflection of at least one of the plurality of polarized light bundles such that each of the plurality of polarized light bundles runs in parallel;
arranging into a path of the plurality of polarized light bundles at least one electro-optical element that is penetrated by beams of the plurality of polarized light bundles and that changes a polarization of the plurality of polarized light bundles as a function of a supplied control voltage;
causing a second reflecting device to reverse a direction of the plurality of polarized light bundles after the plurality of polarized light bundles leave the at least one electro-optical element, into themselves or offset in parallel, and causing the second reflecting device to send the plurality of polarized light bundles to the at least one electro-optical element for a second time; and
changing the polarization of the plurality of polarized light bundles in the at least one electro-optical element such that a sum of the changes of the polarization of the plurality of polarized light bundles in a passage through the first reflecting element, a subsequent passage through the at least one electro-optical element, a subsequent reflection at the second reflecting element, a second passage through the at least one electro-optical element, and a second passage through the first reflecting element generates an overall change in the reverse direction of the polarization of the plurality of polarized light bundles, wherein the sum of the changes, as a function of the control voltage at the at least one electro-optical element, conveys a light of the plurality of polarized light bundles in the polarized beam splitter to one of the first face of the polarizing beam splitter and to a second face of the polarizing beam splitter.

* * * * *